United States Patent
Guo et al.

(10) Patent No.: US 11,050,478 B2
(45) Date of Patent: Jun. 29, 2021

(54) METHOD AND APPARATUS FOR BEAM REPORTING IN NEXT GENERATION WIRELESS SYSTEMS

(71) Applicant: Samsung Electronics Co., Ltd., Suwon-si (KR)

(72) Inventors: Li Guo, Allen, TX (US); Eko Onggosanusi, Coppell, TX (US); Md Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/212,433

(22) Filed: Dec. 6, 2018

(65) Prior Publication Data

US 2019/0190582 A1 Jun. 20, 2019

Related U.S. Application Data

(60) Provisional application No. 62/607,743, filed on Dec. 19, 2017, provisional application No. 62/614,069, (Continued)

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0617* (2013.01); *H04B 7/0626* (2013.01);
(Continued)

(58) Field of Classification Search
CPC .... H04B 7/0413; H04B 7/088; H04B 7/0626; H04B 7/0617; H04B 7/0695; H04B 17/17;
(Continued)

(56) References Cited

U.S. PATENT DOCUMENTS

2019/0058517 A1* 2/2019 Kang .................. H04B 7/0456
2019/0081675 A1* 3/2019 Jung .................. H04B 7/0617
(Continued)

FOREIGN PATENT DOCUMENTS

WO 2017/024516 A1 2/2017
WO WO-2018232090 A1 * 12/2018 ............. H04B 7/066

OTHER PUBLICATIONS

International Search Report (ISR) for PCT/KR2018/016261; dated Apr. 8, 2019 (Year: 2019).*
(Continued)

*Primary Examiner* — Benjamin H Elliott, IV

(57) ABSTRACT

A method of a user equipment (UE) for multi-beam operation in a wireless communication system is provided. The method comprises receiving, from a base station (BS), configuration information for a search space in which to receive a response to a beam failure recovery request, monitoring at least a channel state information reference signal (CSI-RS) included in a first set of reference signals to detect a beam failure event based on a threshold, measuring at least one of a reference signal received power (RSRP) of the CSI-RS or an RSRP of synchronization signal/physical broadcasting channel (SS/PBCH) blocks in a second set of reference signals when the beam failure event is detected, identifying a new candidate beam based on the measured RSRPs, and transmitting, to the BS, the beam failure recovery request over a physical random access channel (PRACH) based on detection of the beam failure event.

18 Claims, 12 Drawing Sheets

Related U.S. Application Data filed on Jan. 5, 2018, provisional application No. 62/615,699, filed on Jan. 10, 2018, provisional application No. 62/621,755, filed on Jan. 25, 2018, provisional application No. 62/625,152, filed on Feb. 1, 2018, provisional application No. 62/625,110, filed on Feb. 1, 2018, provisional application No. 62/625,666, filed on Feb. 2, 2018, provisional application No. 62/629,438, filed on Feb. 12, 2018, provisional application No. 62/637,493, filed on Mar. 2, 2018, provisional application No. 62/643,937, filed on Mar. 16, 2018, provisional application No. 62/650,492, filed on Mar. 30, 2018, provisional application No. 62/652,635, filed on Apr. 4, 2018, provisional application No. 62/653,702, filed on Apr. 6, 2018, provisional application No. 62/658,014, filed on Apr. 16, 2018, provisional application No. 62/661,121, filed on Apr. 23, 2018, provisional application No. 62/686,379, filed on Jun. 18, 2018, provisional application No. 62/764,942, filed on Aug. 16, 2018, provisional application No. 62/720,678, filed on Aug. 21, 2018, provisional application No. 62/725,738, filed on Aug. 31, 2018, provisional application No. 62/730,852, filed on Sep. 13, 2018, provisional application No. 62/732,316, filed on Sep. 17, 2018, provisional application No. 62/743,109, filed on Oct. 9, 2018, provisional application No. 62/747,911, filed on Oct. 19, 2018, provisional application No. 62/747,942, filed on Oct. 19, 2018, provisional application No. 62/756,861, filed on Nov. 7, 2018.

(51) Int. Cl.

| | | |
|---|---|---|
| *H04L 25/02* | (2006.01) | |
| *H04L 1/00* | (2006.01) | |
| *H04L 27/26* | (2006.01) | |
| *H04W 72/04* | (2009.01) | |
| *H04W 74/08* | (2009.01) | |
| *H04W 76/11* | (2018.01) | |
| *H04B 17/327* | (2015.01) | |
| *H04B 17/17* | (2015.01) | |
| *H04B 7/08* | (2006.01) | |
| *H04B 7/0413* | (2017.01) | |
| *H04W 80/02* | (2009.01) | |

(52) U.S. Cl.
CPC ............ *H04B 7/088* (2013.01); *H04B 17/17* (2015.01); *H04B 17/327* (2015.01); *H04L 1/0003* (2013.01); *H04L 1/0061* (2013.01); *H04L 5/0048* (2013.01); *H04L 25/0226* (2013.01); *H04L 27/2607* (2013.01); *H04W 72/042* (2013.01); *H04W 72/046* (2013.01); *H04W 74/0833* (2013.01); *H04W 76/11* (2018.02); *H04B 7/0413* (2013.01); *H04L 25/0204* (2013.01); *H04L 25/0224* (2013.01); *H04W 80/02* (2013.01)

(58) Field of Classification Search
CPC ... H04B 17/327; H04L 1/0003; H04L 1/0061; H04L 5/0048; H04L 25/0226; H04L 27/2607; H04L 25/0204; H04L 25/0224; H04W 76/11; H04W 72/042; H04W 72/046; H04W 74/0833; H04W 80/02
See application file for complete search history.

(56) References Cited

U.S. PATENT DOCUMENTS

| | | | |
|---|---|---|---|
| 2019/0159100 A1* | 5/2019 | Liou ................... | H04W 72/042 |
| 2019/0174466 A1* | 6/2019 | Zhang .................. | H04L 5/0048 |
| 2019/0190582 A1* | 6/2019 | Guo ..................... | H04L 25/0226 |
| 2019/0215048 A1* | 7/2019 | Cirik ...................... | H04B 7/088 |
| 2019/0215136 A1* | 7/2019 | Zhou ................... | H04B 17/327 |
| 2019/0230545 A1* | 7/2019 | Liou ..................... | H04W 24/10 |
| 2019/0239212 A1* | 8/2019 | Wang ................... | H04L 5/0053 |

OTHER PUBLICATIONS

3GPP TSG RAN WG1 Meeting #87 R1-1611211 Reno, USA, Nov. 14-18, 2016; "Discussion on search space design for DL control channels"; Huawei et al. (Year: 2016).*
"3rd Generation Partnership Project; Technical Specification Group Radio Access Network; Evolved Universal Terrestrial Radio Access (E-UTRA); Physical channels and modulation (Release 14)", 3GPP TS 36.211 V14.0.0, Sep. 2016, 170 pages.
"3rd Generation Partnership Project; Technical Specification Group Radio Access Network; Evolved Universal Terrestrial Radio Access (E-UTRA); Multiplexing and channel coding (Release 14)", 3GPP TS 36.212 V14.0.0, Sep. 2016, 148 pages.
"3rd Generation Partnership Project;Technical Specification Group Radio Access Network; Evolved Universal Terrestrial Radio Access (E-UTRA); Physical layer procedures (Release 14)", 3GPP TS 36.213 V14.0.0, Sep. 2016, 406 pages.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.0.0, Sep. 2016, 96 pages.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 644 pages.
"3rd Generation Partnership Project; Technical Specification Group Radio Access Network; NR; Multiplexing and channel coding (Release 15)", 3GPP TS 38.211 V15.0.0, Dec. 2017, 73 pages.
"3rd Generation Partnership Project; Technical Specification Group Radio Access Network; NR; Multiplexing and channel coding (Release 15)", 3GPP TS 38.212 V15.0.0, Dec. 2017, 82 pages.
"3rd Generation Partnership Project; Technical Specification Group Radio Access Network; NR; Physical layer procedures for control (Release 15)", 3GPP TS 38.213 V15.0.0, Dec. 2017, 56 pages.
"3rd Generation Partnership Project; Technical Specification Group Radio Access Network; NR; Physical layer procedures for data (Release 15)", 3GPP TS 38.214 V15.0.0, Dec. 2017, 71 pages.
"3rd Generation Partnership Project; Technical Specification Group Radio Access Network; NR; Medium Access Control (MAC) protocol specification (Release 15)", 3GPP TS 38.321 V15.0.0, Dec. 2017, 55 pages.
"3rd Generation Partnership Project; Technical Specification Group Radio Access Network NR Radio Resource Control (RRC) protocol specification (Release 15)", 3GPP TS 38.331 V15.0.0, Dec. 2017, 188 pages.
AT&T, "Remaining Details on Mechanisms to Recover from Beam Failure", 3GPP TSG RAN WG1 Meeting 91, Nov. 27-Dec. 1, 2017, 6 pages, R1-1719633.
"3rd Generation Partnership Project; Technical Specification Group Radio Access Network; NR; Physical layer procedures for control (Release 15)", 3GPP TS 38.213 V2.0.0 (Dec. 2017), 56 pages.
ASUSTeK, "Remaining Issues for Beam Failure Recovery Procedure", 3GPP TSG RAN WG1 Meeting 91, Nov. 27-Dec. 1, 2017, 3 pages, R1-1720567.
Qualcomm Incorporated, "Beam recovery procedure", 3GPP TSG RAN WG1 Meeting 91, Nov. 27-Dec. 1, 2017, 8 pages, R1-1720663.
International Search Report dated Apr. 8, 2019 in connection with International Patent Application No. PCT/KR2018/016261, 4 pages.
Extended European Search Report regarding Application No. 18892236.3, dated Dec. 16, 2020, 12 pages.

(56) References Cited

OTHER PUBLICATIONS

"3GPP Draft; List of RAN1 Agreements", RAN1 NR-Adhoc#3, Sep. 2017, 195 pages.
Nokia et al., "NR 4-step RACH procedure", 3GPP TSG RAN WG1 NR Ad-Hoc#2, R1-1710892, Jun. 2017, 9 pages.
Samsung, "Beam failure recovery", 3GPP TSG RAN WG1 Meeting #91, R1-1720291, Dec. 2017, 8 pages.

* cited by examiner

METHOD AND APPARATUS FOR BEAM REPORTING IN NEXT GENERATION WIRELESS SYSTEMS

CROSS-REFERENCE TO RELATED APPLICATION(S) AND CLAIM OF PRIORITY

The present application claims priority to:
U.S. Provisional Patent Application Ser. No. 62/607,743, filed on Dec. 19, 2017;
U.S. Provisional Patent Application Ser. No. 62/614,069, filed on Jan. 5, 2018;
U.S. Provisional Patent Application Ser. No. 62/615,699, filed on Jan. 10, 2018;
U.S. Provisional Patent Application Ser. No. 62/621,755, filed on Jan. 25, 2018;
U.S. Provisional Patent Application Ser. No. 62/625,110, filed on Feb. 1, 2018;
U.S. Provisional Patent Application Ser. No. 62/625,152, filed on Feb. 1, 2018;
U.S. Provisional Patent Application Ser. No. 62/625,666, filed on Feb. 2, 2018;
U.S. Provisional Patent Application Ser. No. 62/629,438, filed on Feb. 12, 2018;
U.S. Provisional Patent Application Ser. No. 62/637,493, filed on Mar. 2, 2018;
U.S. Provisional Patent Application Ser. No. 62/643,937, filed on Mar. 16, 2018;
U.S. Provisional Patent Application Ser. No. 62/650,492, filed on Mar. 30, 2018;
U.S. Provisional Patent Application Ser. No. 62/652,635, filed on Apr. 4, 2018;
U.S. Provisional Patent Application Ser. No. 62/653,702, filed on Apr. 6, 2018;
U.S. Provisional Patent Application Ser. No. 62/658,014, filed on Apr. 16, 2018;
U.S. Provisional Patent Application Ser. No. 62/661,121, filed on Apr. 23, 2018;
U.S. Provisional Patent Application Ser. No. 62/686,379, filed on Jun. 18, 2018;
U.S. Provisional Patent Application Ser. No. 62/764,942, filed on Aug. 16, 2018;
U.S. Provisional Patent Application Ser. No. 62/720,678, filed on Aug. 21, 2018;
U.S. Provisional Patent Application Ser. No. 62/725,738, filed on Aug. 31, 2018;
U.S. Provisional Patent Application Ser. No. 62/730,852, filed on Sep. 13, 2018;
U.S. Provisional Patent Application Ser. No. 62/732,316, filed on Sep. 17, 2018;
U.S. Provisional Patent Application Ser. No. 62/743,109, filed on Oct. 9, 2018;
U.S. Provisional Patent Application Ser. No. 62/747,911, filed on Oct. 19, 2018;
U.S. Provisional Patent Application Ser. No. 62/747,942, filed on Oct. 19, 2018; and
U.S. Provisional Patent Application Ser. No. 62/756,861, filed on Nov. 7, 2018.
The content of the above-identified patent documents are incorporated herein by reference.

TECHNICAL FIELD

The present application relates generally to signal reporting. More specifically, this disclosure relates to beam reporting scheme in a next generation wireless communication system.

BACKGROUND

In a wireless communication network, a network access and a radio resource management (RRM) are enabled by physical layer synchronization signals and higher (MAC) layer procedures. In particular, a user equipment (UE) attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra-reliable low latency (URLLC), massive machine type communication (mMTC), each corresponding to a different coverage requirement and frequency bands with different propagation losses is desirable.

SUMMARY

Embodiments of the present disclosure provide beam reporting scheme in an advanced wireless communication system.

In one embodiment, a user equipment (UE) in a wireless communication system is provided. The UE comprises a transceiver configured to receive, from a base station (BS), configuration information for a search space in which to receive a response to a beam failure recovery request. The UE further comprises a processor operably connected to the transceiver, the processor configured to monitor at least a channel state information reference signal (CSI-RS) included in a first set of reference signals to detect a beam failure event based on a threshold, measure at least one of a reference signal received power (RSRP) of the CSI-RS or an RSRP of a synchronization signal/physical broadcasting channel (SS/PBCH) block in a second set of reference signals when the beam failure event is detected, and identify a new candidate beam based on the measured RSRPs. The transceiver of the UE is further configured to transmit, to the BS, the beam failure recovery request over a physical random access channel (PRACH) based on detection of the beam failure event.

In another embodiment, a base station (BS) in a wireless communication system is provided. The BS comprises a processor configured to determine at least a channel state information reference signal (CSI-RS) included in a first set of reference signals that is used for detecting a beam failure event, by a user equipment (UE), based on a threshold. The BS further comprises a transceiver operably connected to the processor, the transceiver configured to transmit, to the UE, configuration information for a search space in which to transmit a response to a beam failure recovery request, and receive, from the UE, the beam failure recovery request over a physical random access channel (PRACH) based on detection of the beam failure event. At least one of a reference signal received power (RSRP) of the CSI-RS or an RSRP of a synchronization signal/physical broadcasting channel (SS/PBCH) block in a second set of reference signals is measured at the UE when a beam failure event is detected, and wherein a new candidate beam is identified, by the UE, based on the measured RSRPs.

In yet another embodiment, a method of a user equipment (UE) for beam reporting in a wireless communication system is provided. The method comprises receiving, from a base station (BS), configuration information for a search space in which to receive a response to a beam failure recovery request, monitoring at least a channel state information reference signal (CSI-RS) included in a first set of reference signals to detect a beam failure event based on a threshold, measuring at least one of a reference signal received power (RSRP) of the CSI-RS or an RSRP of a synchronization signal/physical broadcasting channel (SS/PBCH) block in a second set of reference signals when the beam failure event is detected, identifying a new candidate beam based on the measured RSRPs, and transmitting, to the BS, the beam failure recovery request over a physical random access channel (PRACH) based on detection of the beam failure event.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v14.0.0, "E-UTRA, Physical channels and modulation;" 3GPP TS 36.212 v14.0.0, "E-UTRA, Multiplexing and Channel coding;" 3GPP TS 36.213 v14.0.0, "E-UTRA, Physical Layer Procedures;" 3GPP TS 36.321 v14.0.0, "E-UTRA, Medium Access Control (MAC) protocol specification;" 3GPP TS 36.331 v14.0.0, "E-UTRA, Radio Resource Control (RRC) Protocol Specification;" 3GPP TS 38.211 v15.0.0, "NR, Physical channels and modulation;" 3GPP TS 38.212 v15.0.0, "NR, Multiplexing and Channel coding;" 3GPP TS 38.213 v15.0.0, "NR, Physical Layer Procedures for Control;" 3GPP TS 38.214 v15.0.0, "NR, Physical Layer Procedures For Data;" 3GPP TS 38.321 v15.0.0, "NR, Medium Access Control (MAC) protocol specification;" and 3GPP TS 38.331 v15.0.0, "NR, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
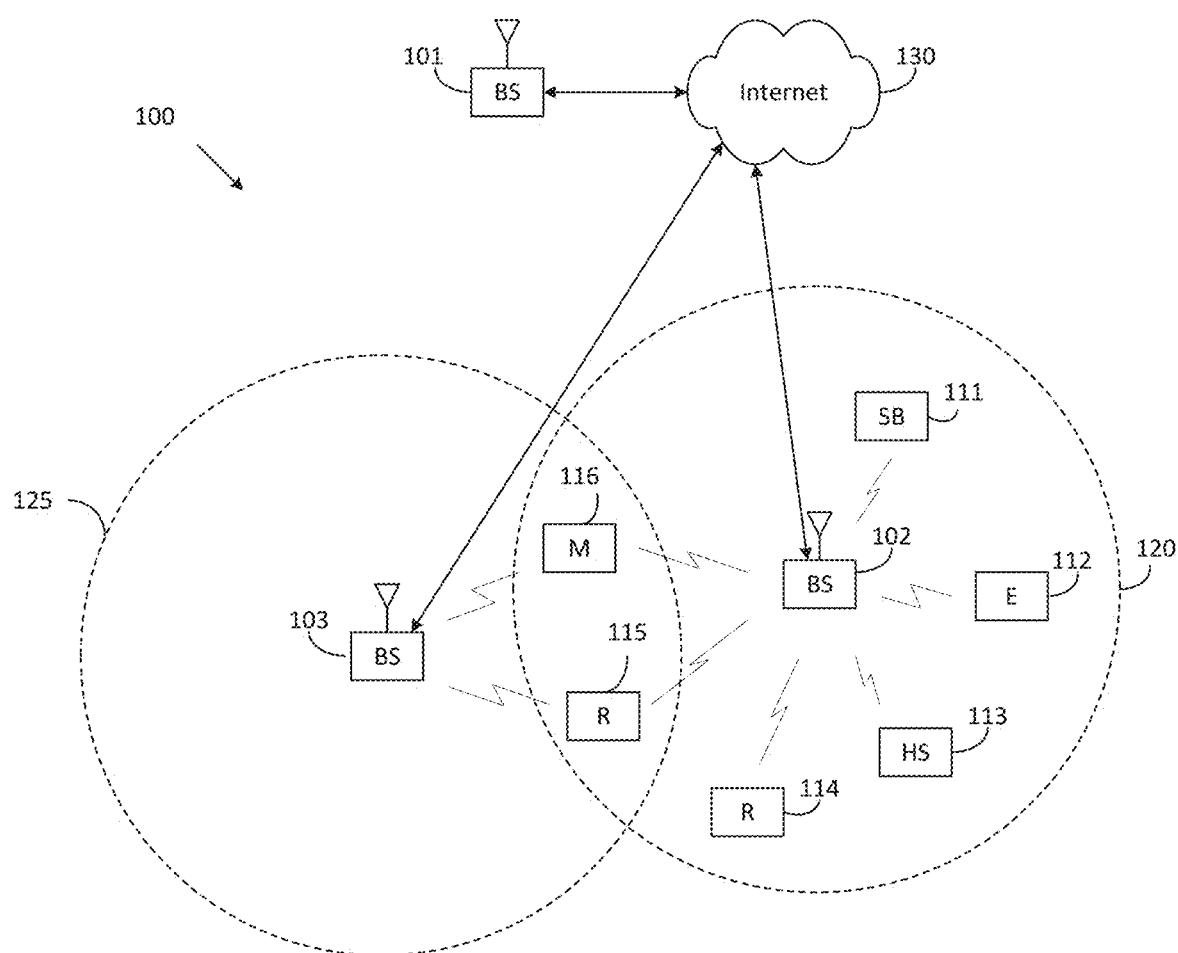
FIG. 1 illustrates an example wireless network according to embodiments of the present disclosure.
Figure 2:
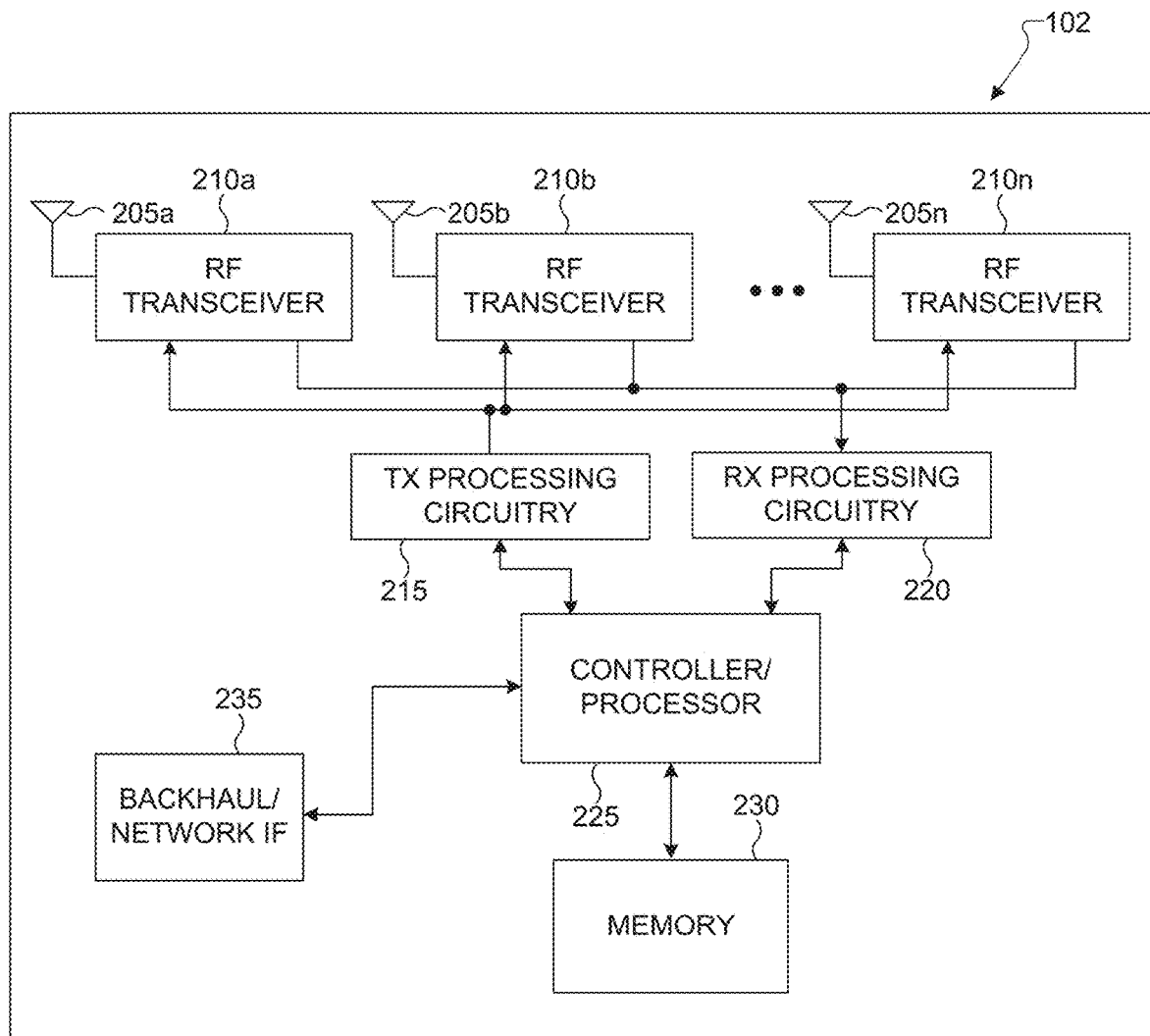
FIG. 2 illustrates an example eNB according to embodiments of the present disclosure.
Figure 3:
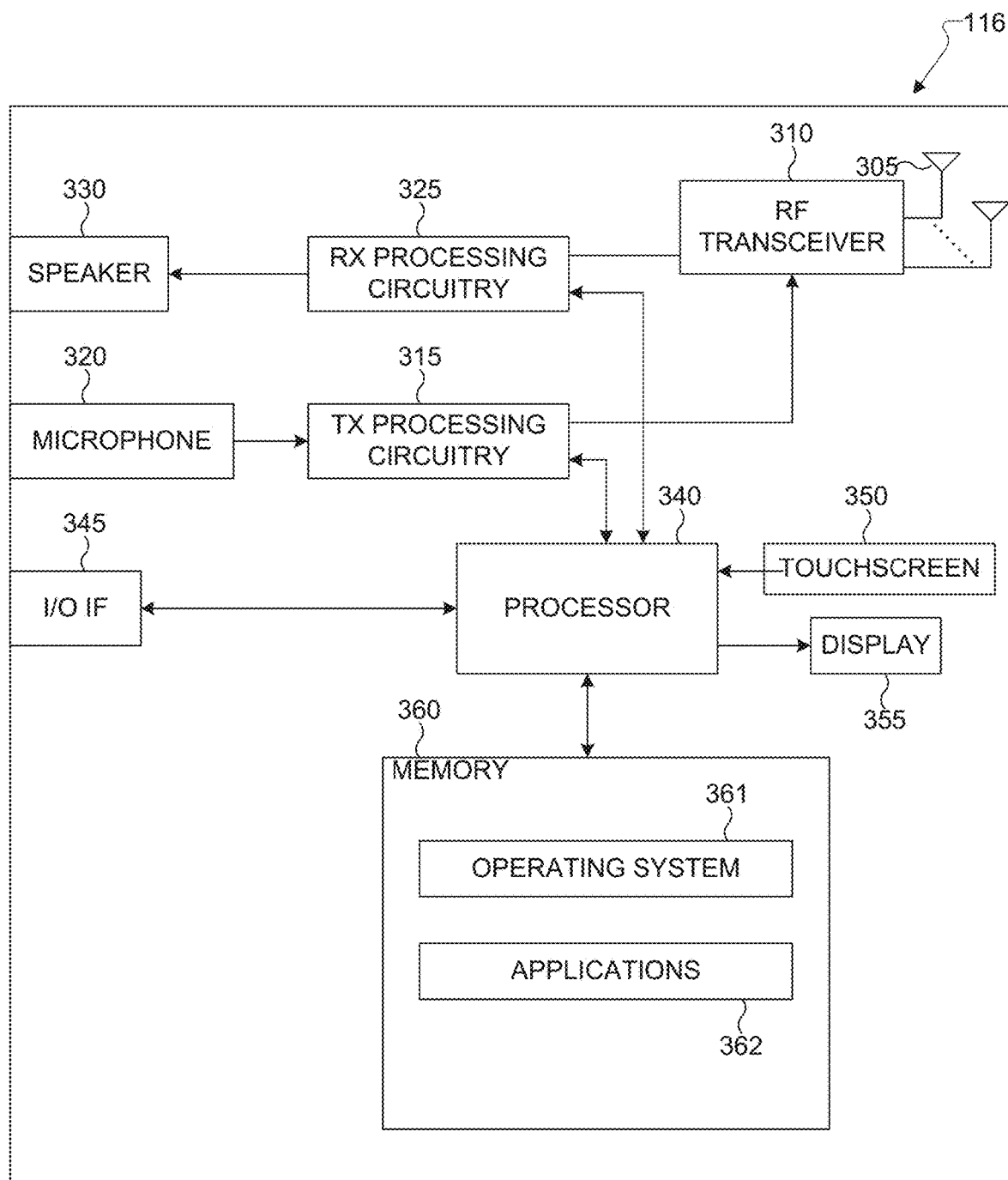
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient beam reporting in an advanced wireless communication system. In certain embodiments, and one or more of the eNBs 101-103 includes circuitry, programming, or a combination thereof, for receiving efficient beam reporting in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
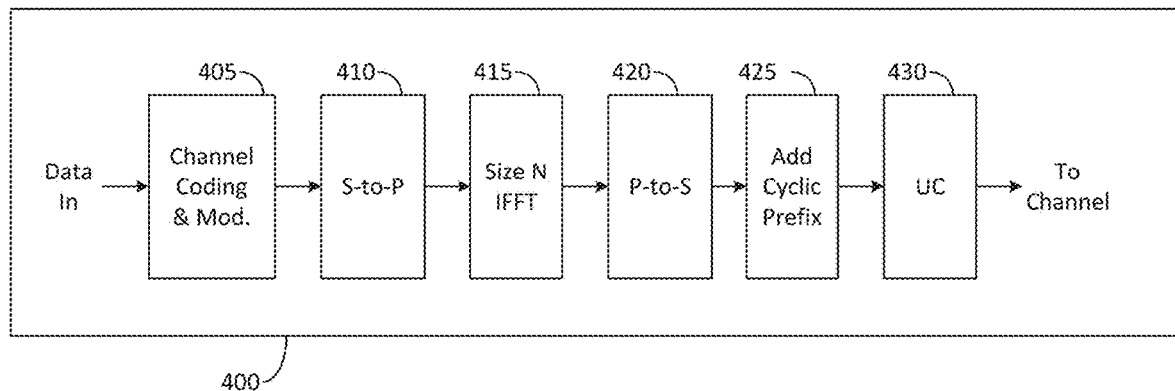
FIG. 4A illustrates a high-level diagram of an orthogonal frequency division multiple access transmit path according to embodiments of the present disclosure.
Figure 4B:
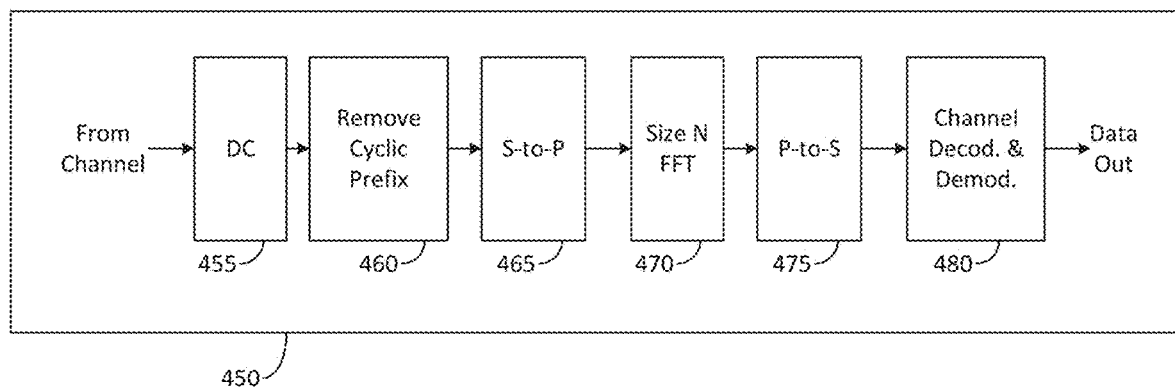
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $R_{SRS}=0$ otherwise.

Figure 5:
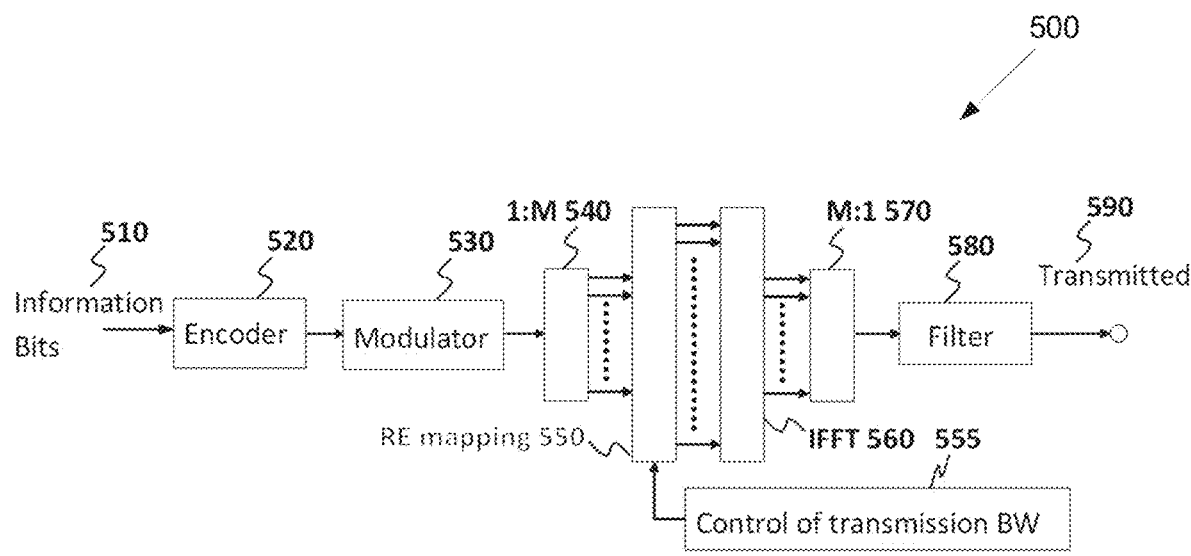
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
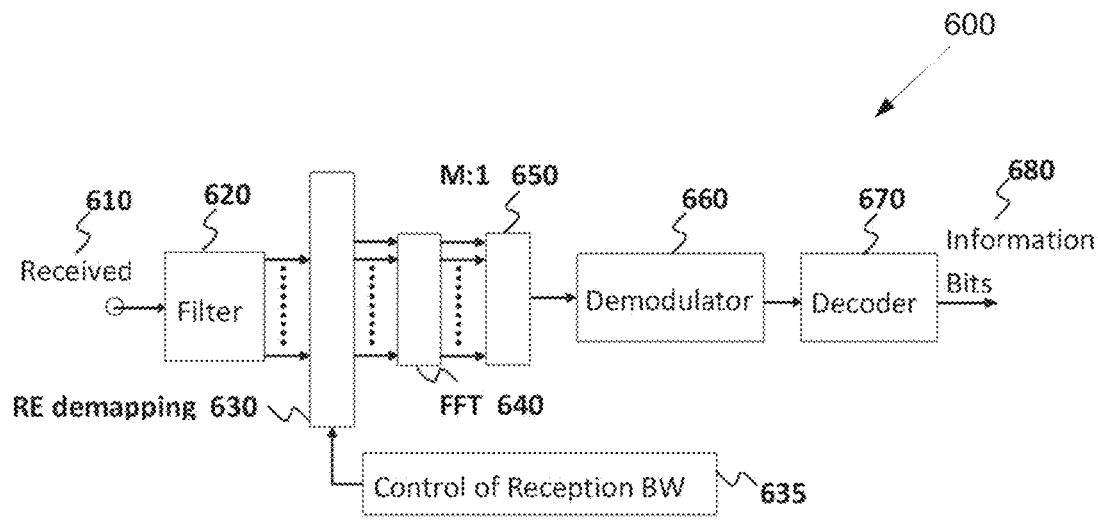
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
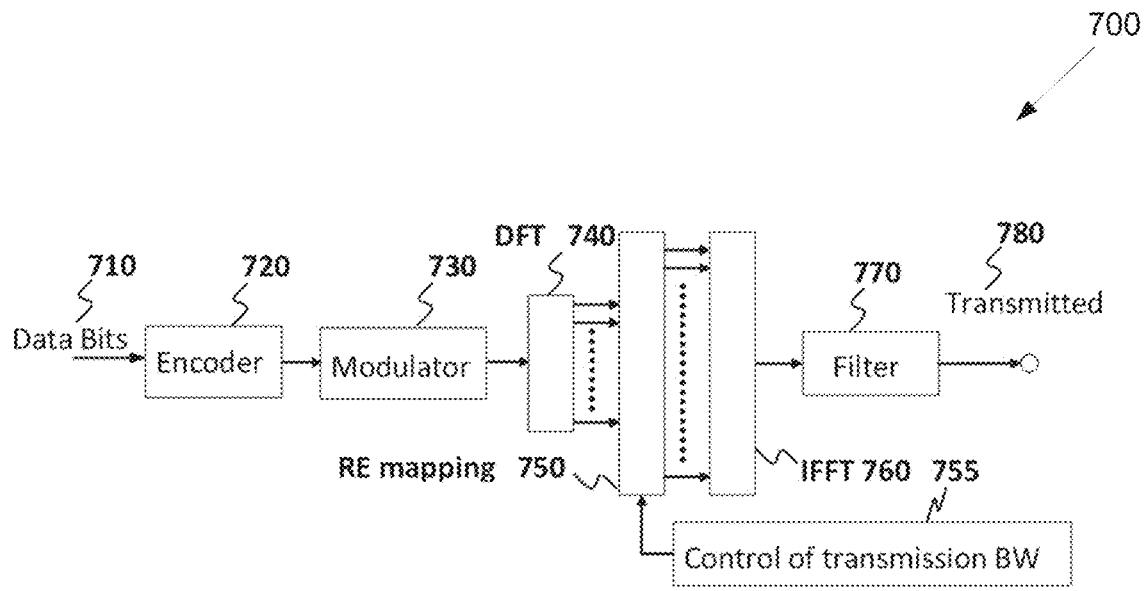
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
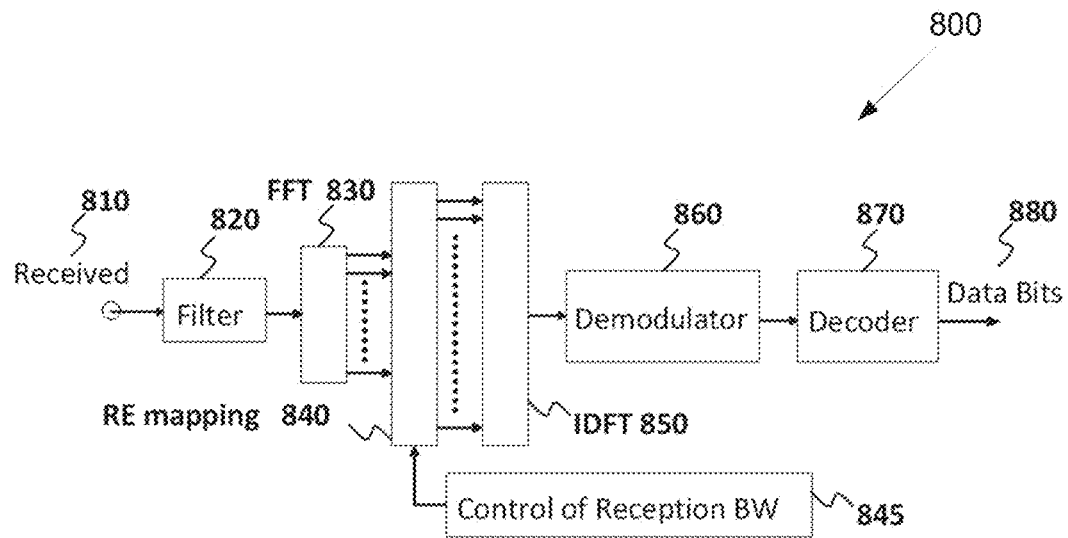
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband" (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one scheme has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
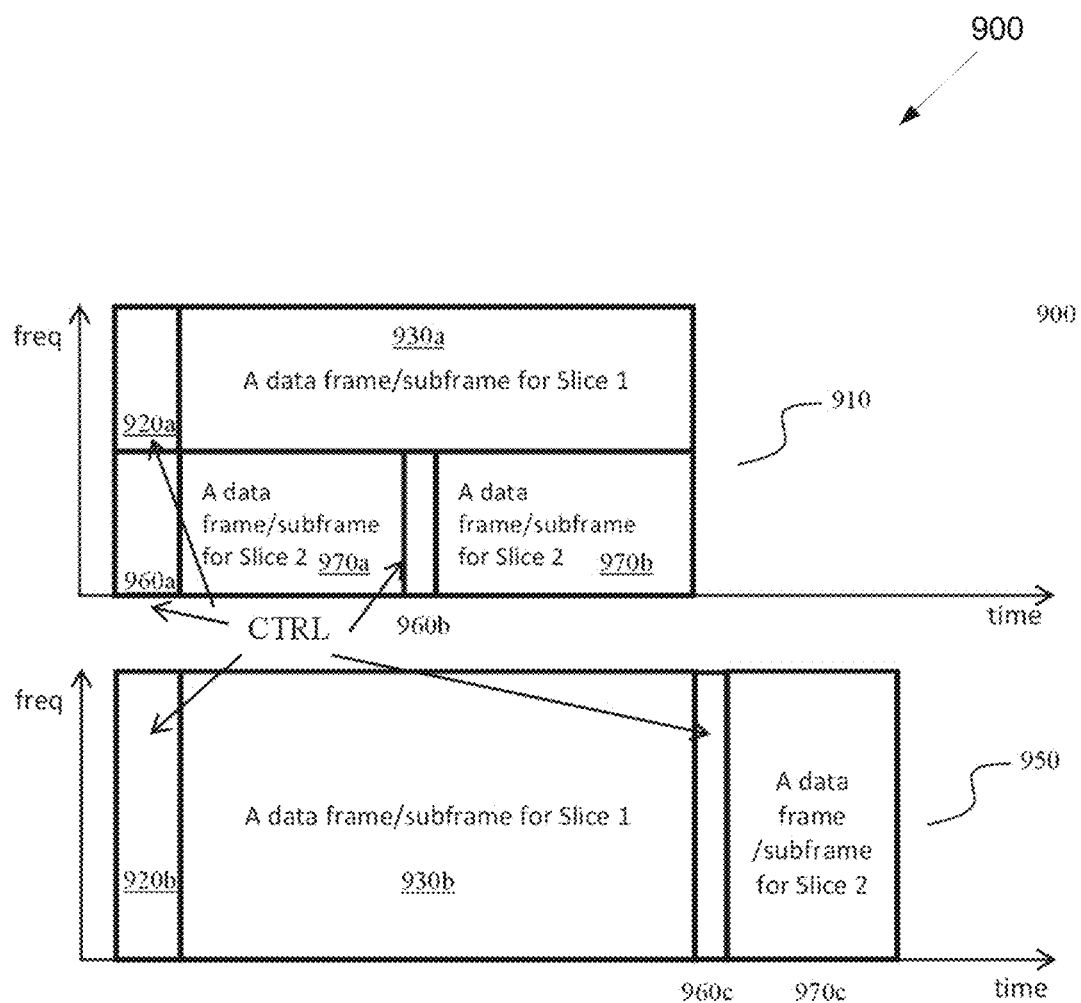
FIG. 9 illustrates an example multiplexing of two slices according to embodiments of the present disclosure.

FIG. 9 illustrates an example multiplexing of two slices 900 according to embodiments of the present disclosure. The embodiment of the multiplexing of two slices 900 illustrated in FIG. 9 is for illustration only. FIG. 9 does not limit the scope of this disclosure to any particular implementation of the multiplexing of two slices 900.

Two exemplary instances of multiplexing two slices within a common subframe or frame are depicted in FIG. 9. In these exemplary embodiments, a slice can be composed of one or two transmission instances where one transmission instance includes a control (CTRL) component (e.g., 920a, 960a, 960b, 920b, or 960c) and a data component (e.g., 930a, 970a, 970b, 930b, or 970c). In embodiment 910, the two slices are multiplexed in frequency domain whereas in embodiment 950, the two slices are multiplexed in time domain. These two slices can be transmitted with different sets of numerology.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
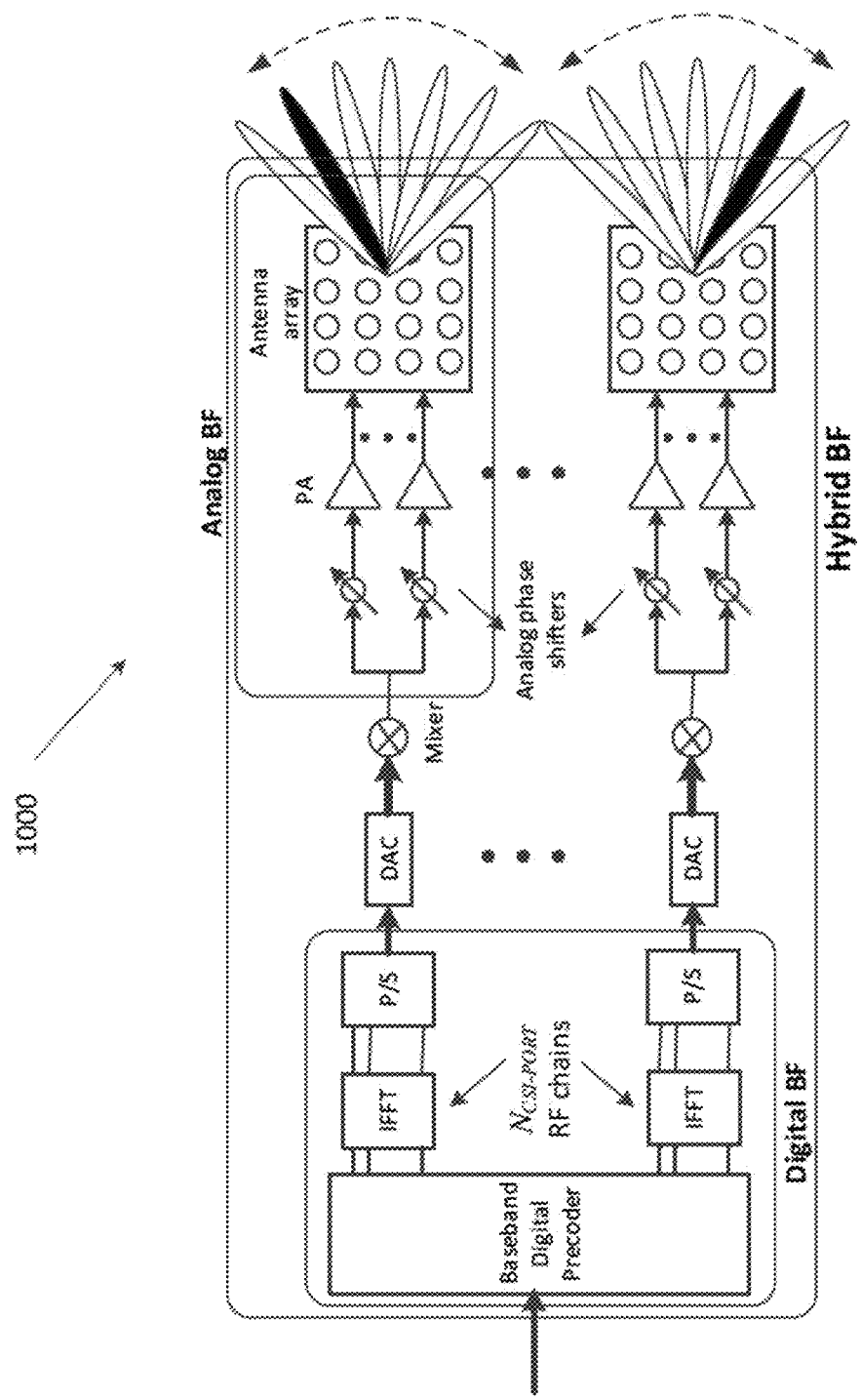
FIG. 10 illustrates an example antenna blocks according to embodiments of the present disclosure.

FIG. 10 illustrates an example antenna blocks 1000 according to embodiments of the present disclosure. The embodiment of the antenna blocks 1000 illustrated in FIG. 10 is for illustration only. FIG. 10 does not limit the scope of this disclosure to any particular implementation of the antenna blocks 1000.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters. One CSI-RS port can then correspond to one sub-array which produces a narrow analog beam through analog beamforming. This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

In a 3GPP LTE communication system, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems such as 3GPP NR (new radio access or interface), efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE specification. In this case, seamless mobility is a desirable feature.

Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable.

Figure 11:
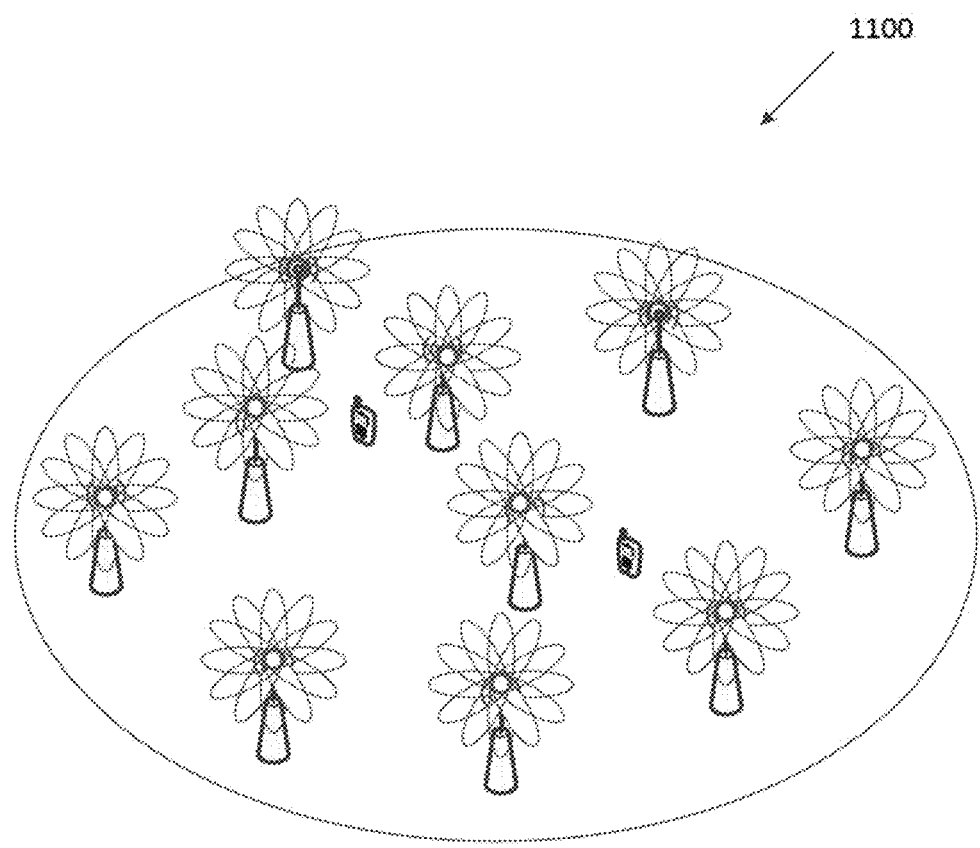
FIG. 11 illustrates an example UE mobility scenario according to embodiments of the present disclosure.

FIG. 11 illustrates an example UE mobility scenario 1100 according to embodiments of the present disclosure. The embodiment of the UE mobility scenario 1100 illustrated in FIG. 11 is for illustration only. FIG. 11 does not limit the scope of this disclosure to any particular implementation of the UE mobility scenario 1100.

For instance, the framework may be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework may be applicable whether beam sweeping (as illustrated in FIG. 11) is used or not.

Third, different frequency bands and use cases impose different coverage limitations. For example, mmWave bands impose large propagation losses. Therefore, some form of coverage enhancement scheme is needed. Several candidates include beam sweeping (as shown in FIG. 10), repetition, diversity, and/or multi-TRP transmission. For mMTC where transmission bandwidth is small, time-domain repetition is needed to ensure sufficient coverage.

A UE-centric access which utilizes two levels of radio resource entity is described in FIG. 11. These two levels can be termed as "cell" and "beam". These two terms are exemplary and used for illustrative purposes. Other terms such as radio resource (RR) 1 and 2 can also be used. Additionally, the term "beam" as a radio resource unit is to be differentiated with, for instance, an analog beam used for beam sweeping in FIG. 10.

As shown in FIG. 11, the first RR level (termed "cell") applies when a UE enters a network and therefore is engaged in an initial access procedure. In 1110, a UE 1111 is connected to cell 1112 after performing an initial access procedure which includes detecting the presence of synchronization signals. Synchronization signals can be used for coarse timing and frequency acquisitions as well as detecting the cell identification (cell ID) associated with the serving cell. In this first level, the UE observes cell boundaries as different cells can be associated with different cell IDs. In FIG. 11, one cell is associated with one TRP (in general, one cell can be associated with a plurality of TRPs).

Since cell ID is a MAC layer entity, initial access involves not only physical layer procedure(s) (such as cell search via synchronization signal acquisition) but also MAC layer procedure(s).

The second RR level (termed "beam") applies when a UE is already connected to a cell and hence in the network. In this second level, a UE 1111 can move within the network without observing cell boundaries as illustrated in FIG. 11. That is, UE mobility is handled on beam level rather than cell level, where one cell can be associated with N beams (N can be 1 or >1). Unlike cell, however, beam is a physical layer entity. Therefore, UE mobility management is handled solely on physical layer. An example of UE mobility scenario based on the second level RR is given in FIG. 11.

After the UE 1111 is associated with the serving cell 1112, the UE 1111 is further associated with beam 1151. This is achieved by acquiring a beam or radio resource (RR) acquisition signal from which the UE can acquire a beam identity or identification. An example of beam or RR acquisition signal is a measurement reference signal (RS). Upon acquiring a beam (or RR) acquisition signal, the UE 1111 can report a status to the network or an associated TRP. Examples of such report include a measured beam power (or measurement RS power) or a set of at least one recommended "beam identity (ID)" or "RR-ID". Based on this report, the network or the associated TRP can assign a beam (as a radio resource) to the UE 1111 for data and control transmission. When the UE 1111 moves to another cell, the boundary between the previous and the next cells is neither observed nor visible to the UE 1111. Instead of cell handover, the UE 1111 switches from beam 1151 to beam 1152. Such a seamless mobility is facilitated by the report from UE 711 to the network or associated TRP—especially when the UE 1111 reports a set of M>1 preferred beam identities by acquiring and measuring M beam (or RR) acquisition signals.

In the present disclosure, a "beam" can correspond to an RS resource or one port in RS or one port+one time unit in RS, whether the beam is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

In some embodiment, when a UE detects a beam failure event, the UE can be requested to transmit beam recovery request and then monitor for the beam recovery response from a TRP. If no proper response for the beam recovery request is received within configured time duration $T_0$, the UE can be configured to re-send the beam recovery request until a proper beam recovery response is received by the UE or the maximal number of beam recovery request transmission is achieved.

In the present disclosure, a "beam" can correspond to an RS resource, whether the beam is a sounding reference signal (SRS), CSI-RS, beam RS, measurement RS, or any other type of RS.

In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

In the present disclosure, the schemes of beam indication for downlink control/data channel and uplink control and data channels are provided.

In some embodiments, some bits in a downlink DCI can be used to indicate spatial QCL assumption between downlink RS and DMRS antenna port(s) of one or more downlink PDSCH allocation(s). From the information of spatial QCL assumption, one UE can calculate a receive beam that is used to receive the NR-PDSCH transmission. In the downlink DCI, that few bits of spatial QCL assumption can be an identity of a BPL (beam pair link), an identity of beam tag, an identity of one CSI-RS resource, an identity of one NR-SRS block time index, an identity of Rx beam set, an identity of Rx beam, an identity of NR-SRS resource.

In one example, a downlink DCI can signal the information of Rx beam for the corresponding PDSCH that is scheduled by that downlink DCI. The UE can be requested to first decode one DCI. From the decoded DCI, the UE can obtain the following information: the allocation information of PDSCH: the slot and PRB location, the MCS information; and the spatial QCL assumption for DMRS antenna ports of this allocated PDSCH.

In CSI configuration framework, the UE can be configured with higher layer parameter ReportQuantity set to be "CRI/RSRP" or "SSBRI/RSRP". When the UE is configured with "CRI/RSRP", the UE can be requested to report N different CRIs and their corresponding L1-RSRP based one measuring K configured CSI-RS resources. An example of K value is 16, 32 or 64. When the UE is configured with "SSBRI/RSRP", the UE can be requested to report N different SSBRIs and their corresponding L1-RSRP values. The example of N can be 1, 2, 3, and 4.

For periodic CRI/RSRP and SSBRI/RSRP reporting, UL channel long PUCCH or short PUCCH can be used. In short PUCCH channel, PUCCH format 2 can be used for periodic CRI/RSRP and SSBRI/RSRP reporting. In long PUCCH channel, PUCCH format 3 and 4 can be used for periodic CRI/RSRP and SSBRI/RSRP reporting.

In some embodiments, a UE can be requested to transmit one beam report with N reported CRIs or SSBRIs and their corresponding N L1-RSRP and differential L1-RSRPs in one PUCCH reporting instance regardless of the value of N. The UE can determine the bit size of beam report payload size. For example, the bit size of beam report with N reported CRIs or SSBRIs can be $N \times B0 + B1 + (N-1) \times B2$, where B0 can be bit size of one CRI value or SSBRI value, B1 can be the bit size of one L1-RSRP and B2 can be the bit size of one differential L1-RSRP. An example of B1 is 7. An example of B2 is 4. The UE can determine the transmission behavior based on the bit size of beam report payload and the bit capacity of a single PUCCH reporting instance.

If the bit size of beam report payload is less than or equal to that can be accommodated in a single PUCCH reporting instance, the UE can transmit/report the whole beam report with N selected CRIs or SSBRIs and their corresponding N L1-RSRP and differential L1-RSRPs in the configured single PUCCH reporting instance.

Otherwise, (or If the bit size of beam report payload is larger than that can be accommodated in a single PUCCH reporting instance), the UE can report only a subset of the beam report with N selected CRIs or SSBRIs and their corresponding N L1-RSRP and differential L1-RSRP. The subset the UE can report can be: Alt #1, the M CRIs or SSBRIs of N CRIs or SSBRIs with the largest L1-RSRP. M can be the largest number of that the bit size of report with M CRIs or SSBRIs and M L1-RSRP/differential L1-RSRP is no more than that can be accommodated in a single PUCCH reporting instance; Alt #2, the subset (M out of N) is reported by the UE, The UE can also report which subset is reported. In one example, an additional signaling with $\lceil \log_2 (_M^N) \rceil$ bits can be signaled from the UE to indicate which subset is reported; and Alt 3, the subset is configured to the UE, for example, via higher layer (RRC) or more dynamic MAC CE based or DCI based signaling.

In one embodiment, a UE can be requested to transmit one beam report with N reported CRIs or SSBRIs and their corresponding N L1-RSRP and differential L1-RSRPs in one PUCCH reporting instance regardless of the value of N. The UE can determine the bit size of beam report payload size. For example, the bit size of beam report with N reported CRIs or SSBRIs can be $N \times B0 + B1 + (N-1) \times B2$, where B0 can be bit size of one CRI value or SSBRI value, B1 can be the bit size of one L1-RSRP and B2 can be the bit size of one differential L1-RSRP. An example of B1 is 7. An example of B2 is 4.

The UE can determine the transmission behavior based on achieved code rate that is calculated by assuming the whole beam report payload with N CRIs/SSBRIs is sent in a single configured PUCCH reporting instance. If the achieved code rate is less than (or equal to) some threshold, the UE can transmit and report the whole beam report with N CRIs or SSBRIs and their corresponding N L1-RSRP/differential L1-RSRP in a single configured PUCCH instance. If the achieved code rate is larger than or equal to some thresholds, the UE can only transmit a subset of the beam report with those N selected CRIs/SSBRIs and their corresponding L1-RSRP/differential L1-RSRP. The selection of a subset can be according one of the schemes described above.

In some embodiments, a UE can be requested to transmit one beam report with N reported CRIs or SSBRIs and their corresponding N L1-RSRP and differential L1-RSRPs. When the size of beam report is large, the UE can be requested to split the beam report into two parts and report these two parts into two "adjacent" beam reporting instances like pair.

In one embodiment, the UE can be configured with one single periodic beam reporting configuration. When the beam report is split into two parts, the UE can report these two parts in two adjacent PUCCH reporting instances.

In one embodiment, the UE can be configured with two PUCCH reporting configuration: a first reporting configuration and a second reporting configuration. The UE can partition one beam report into two parts. The UE can transmit part 1 in PUCCH reporting instance of a first reporting configuration and can transmit part 2 in PUCCH reporting instance of a second reporting configuration.

In one embodiment, the UE can be configured with a slot offset, T1, and periodicity for a first reporting configuration and the UE can be configured with a slot offset, $\Delta T$, for a second reporting with respect to a first reporting configuration. The UE can assume a second reporting configuration has the same periodicity as a first reporting configuration and the transmission of one PUCCH reporting instance in a second reporting configuration is ΔT slots after one PUCCH reporting instance in a first reporting configuration.

In one embodiment, a UE can be configured with two periodic reporting configurations and the UE can also be configured to report N selected CRIs/SSBRIs and their corresponding N L1-RSRP and differential L1-RSRPs. For each beam report with N CRIs/SSBRIs, the UE can report this beam report on two PUCCH reporting instances of a first reporting configuration and a second reporting configuration. The UE can split the beam report into two parts and then report one part into one PUCCH reporting instance of a first reporting configuration and report another part into one PUCCH reporting instance of a second reporting configuration In some embodiments, a UE can be requested to transmit one beam report with N reported CRIs or SSBRIs and their corresponding N L1-RSRPs in one or two PUCCH instances. The UE can be requested to determine whether transmit one beam report in one or two PUCCH instance based on the information of bit size of beam report payload size. If the bit size of beam report payload is large, the UE can be requested to partition the beam report contents into two parts and transmit these two parts in two PUCCH instances. If the bit size of beam report payload is small, the UE can be requested to transmit the whole content of one beam report instance with N reported CRIs or SSBRIs and their corresponding N L1-RSRPs in one PUCCH instance. Here one PUCCH instance can also be called as PUCCH slot. Here the PUCCH channel can be a short PUCCH. The PUCCH channel can be a long PUCCH.

In one embodiment, the UE can be requested to determine the reporting scheme for periodic beam reporting as follows. In one example, if some condition is met, the UE can split one beam reporting into two parts. One part is transmitted in one PUCCH instance and these two parts can be sent in two PUCCH instances. The condition can be based on one or more of the following: the number of reports beams, (i.e., the number of reported CRIs, the number of reported SSBRIs); the bitwidth used for one beam ID, the bidwidth used for one CRI, the bitwidth used for one SSBRIs; the total payload size of one beam report if this beam report is sent as one part in one PUCCH instance. The total number of bits of one beam report if this beam report is sent as one part in one PUCCH instance. The total number of bits can be calculated by the total number of bits used for N beam IDs (CRIs, or SSBRIs), bits for one L1-RSRP and bits for N−1 differential RSRP; and/or the code rate if one beam report is sent as one part in one PUCCH instance.

In one example, if the condition is not met, the UE can send the beam report as one part in one PUCCH instance.

In one embodiment, the UE can be requested to determine the transmission scheme based on the number of reported beams. In one example, if the number of reported beams in beam reporting is 1 or 2, the UE can be requested to report them in one report, including the identification information of two beams (for example, the CRIs, or SSBRIs) and one L1-RSRP and one differential L1-RSRP. In another example, if the number of reported beams in beam reporting is >2, the UE can be requested to split the report into two parts and those two parts are transmitted in two PUCCH instances. In one example, the UE has beam reporting with N=4 beams. The UE can split the beam report into two parts. Each part has two Tx beams (e.g., CRIs, or SSBRIs) and one L1-RSRP and one differential L1-RSRP. These two parts can be sent in two PUCCH instances.

In one embodiment, a UE can be requested to report N selected CRIs or SSBRIs and the information of their corresponding N L1-RSRP values in periodic "CRI/RSRP" or "SSBRI/RSRP" reporting. The UE can be requested to determine whether to split the beam report into two parts according to the number of reported CRIs/SSBRIs, N.

If the value N is 1 or 2, the UE can be requested to report those N selected CRIs and their corresponding L1-RSRP and/or differential L1-RSRP value is one PUCCH instance. And if the value is 3 or 4, the UE can be requested to follow one or more of the followings If the value of N is 3, the UE can be requested to transmit those N selected CRIs (or SSBRIs) and their corresponding L1-RSRP and/or differential L1-RSRP value in two PUCCH instances. The UE can select to report CRI #i, CRI #j and CRI #k. The UE can report the information of CRI #i and CRI #j in n-th PUCCH instance for the configured periodic beam reporting. The UE can report the following information in n-th PUCCH instance: {CRI #i, the L1-RSRP of CRI #i, the CRI #j, the differential L1-RSRP of CRI #j by assuming the L1-RSRP of CRI #i is reference RSRP}. Then the UE can report the information CRI #k in (n+1)-th PUCCH instance. The UE can report the following information in (n+1)-th PUCCH instance:{CRI #k, L1-RSRP of CRI #k}.

In one example, the UE can report the following information in n-th PUCCH instance: {CRI #i, the L1-RSRP of CRI #i} and the UE can report the following information in (n+1)-th PUCCH instance {CRI #j, L1-RSRP of CRI #j, CRI #k, the differential L1-RSRP of CRI #k by using the L1-RSRP of CRI #j as the reference RSRP}.

If the value of N is 4, the UE can be requested to transmit those N selected CRIs (or SSBRIs) and their corresponding L1-RSRP and/or differential L1-RSRP value in two PUCCH instances. The UE can select to report CRI #i, CRI #j, CRI #k and CRI #m. The UE can report the information of CRI #i and CRI #j in n-th PUCCH instance for the configured periodic beam reporting. The UE can report the following information in n-th PUCCH instance: {CRI #i, the L1-RSRP of CRI #i, the CRI #j, the differential L1-RSRP of CRI #j by assuming the L1-RSRP of CRI #i as the reference RSRP}. Then the UE can report the information CRI #k and CRI #m in (n+1)-th PUCCH instance. The UE can report the following information in (n+1)-th PUCCH instance: {CRI #k, L1-RSRP of CRI #k, CRI #m, the differential L1-RSRP of CRI #m by using the L1-RSRP of CRI #k as the reference RSRP}.

The CRI in above scheme can be replaced with SSBRI without changing design.

In one embodiment, a UE can be requested to report N selected CRIs or SSBRIs and the information of their corresponding N L1-RSRP values in periodic "CRI/RSRP" or "SSBRI/RSRP" reporting. The UE can determine whether to split the beam report into two parts based on the number of reported CRIs (or SSBRIs) and the bitwidth used for CRIs/SSBRIs.

In one example, if the value N is 1 or 2, the UE can be requested to report those N selected CRIs and their corresponding L1-RSRP and/or differential L1-RSRP value is one PUCCH instance. And if the value is 3 or 4, the UE can be requested to follow one or more of the followings. In one example, if the value of N is 3, the UE can be requested to transmit those N=3 selected CRIs (or SSBRIs) and their corresponding L1-RSRP and/or differential L1-RSRP value in one or two PUCCH instances. The UE may determine whether it is one or two PUCCH instances according to the bitwidth used for CRI or SSBRI. If the bitwidth used for CRI or SSBRI is less than a first threshold, the UE can send those N=3 selected CRIs (or SSBRIs) and their corresponding L1-RSRP and differential L1-RSRP value in one PUCCH instances. If the bitwidth used for CRI or SSBRI is larger than or equal to a first threshold, the UE can send those N=3 selected CRIs (SSBIRs) and their corresponding L1-RSRP and differential L1-RSRP value in two PUCCH instances.

In such example, a first threshold is 4 bits and the UE can select to report CRI #i, CRI #j and CRI #k. If the bitwidth used for CRI (or SSBRI) is >=4, The UE can report the information of CRI #i and CRI #j in n-th PUCCH instance for the configured periodic beam reporting. The UE can report the following information in n-th PUCCH instance: {CRI #i, the L1-RSRP of CRI #i, the CRI #j, the differential L1-RSRP of CRI #j by assuming the L1-RSRP of CRI #i is reference RSRP}. Then the UE can report the information CRI #k in (n+1)-th PUCCH instance. The UE can report the following information in (n+1)-th PUCCH instance:{CRI #k, L1-RSRP of CRI #k}. If the bitwidth used for CRI (or SSBRI) is <4, the UE can report {CRI #i, the L1-RSRP of CRI #i, the CRI #j, the differential L1-RSRP of CRI #j by assuming the L1-RSRP of CRI #i is reference RSRP, the CRI #k, the differential L1-RSRP of CRI #k by assuming the L1-RSRP of CRI #i is reference RSRP} in one PUCCH instance.

In another example, if the value of N is 4, the UE can be requested to transmit those N selected CRIs (or SSBRIs) and their corresponding L1-RSRP and/or differential L1-RSRP value in one or two PUCCH instances. The UE may determine whether it is one or two PUCCH instances according to the bitwidth used for CRI or SSBRI. If the bitwidth used for CRI or SSBRI is less than a second threshold, the UE can send those N=4 selected CRIs (or SSBRIs) and their corresponding L1-RSRP and differential L1-RSRP value in one PUCCH instances. If the bitwidth used for CRI or SSBRI is larger than or equal to a second threshold, the UE can send those N=4 selected CRIs (SSBIRs) and their corresponding L1-RSRP and differential L1-RSRP value in two PUCCH instances.

In such example, a second threshold can be 3 bits. The UE can select to report CRI #i, CRI #j, CRI #k and CRI #m. The UE can report the information of CRI #i and CRI #j in n-th PUCCH instance for the configured periodic beam reporting. If the bitwidth used for CRI (or SSBRI) is >=3 bits, The UE can report the following information in n-th PUCCH instance: {CRI #i, the L1-RSRP of CRI #i, the CRI #j, the differential L1-RSRP of CRI #j by assuming the L1-RSRP of CRI #i as the reference RSRP}. Then the UE can report the information CRI #k and CRI #m in (n+1)-th PUCCH instance. The UE can report the following information in (n+1)-th PUCCH instance: {CRI #k, L1-RSRP of CRI #k, CRI #m, the differential L1-RSRP of CRI #m by using the L1-RSRP of CRI #m as the reference RSRP}.

In yet another example, if the bitwidth used for CRI (or SSBRI) is <3 bits, the UE can report the following in one PUCCH instance: {CRI #i, the L1-RSRP of CRI #i, the CRI #j, the differential L1-RSRP of CRI #j by assuming the L1-RSRP of CRI #i as the reference RSRP, the CRI #k, the differential L1-RSRP of CRI #k by assuming the L1-RSRP of CRI #i as the reference RSRP, the CRI #m, the differential L1-RSRP of CRI #j by assuming the L1-RSRP of CRI #k as the reference RSRP}.

In one embodiment, a UE can be requested to report N selected CRIs or SSBRIs and the information of their corresponding N L1-RSRP values in periodic "CRI/RSRP" or "SSBRI/RSRP" reporting. The UE can determine whether to split the beam report with N CRIs (or SSBRIs) into two parts or not based on the total payload size of N CRIs and their corresponding L1-RSRP/differential L1-RSRP values. The UE can be requested to determine whether to send the payload of N selected CRIs (or SSBRIs) and their L1-RSRP information in one or two PUCCH instances according the payload size. If the payload size is <a third threshold, the UE can be requested to send the payload of N selected CRIs (or SSBRIs) and their corresponding L1-RSRP/differential L1-RSRP in one PUCCH instance. If the payload size is >=a third threshold, the UE can be requested to partition the payload of N selected CRIs (or SSBRIs) and their corresponding L1-RSRP/differential L1-RSRP into two parts and send them in two PUCCH instances.

In the fourth embodiment, a UE can be requested to report N selected CRIs or SSBRIs and the information of their corresponding N L1-RSRP values in periodic "CRI/RSRP" or "SSBRI/RSRP" reporting. The UE can determine whether to split the beam report with N CRIs (or SSBRIs) into two parts or not based on the value of a first code rate. A first code rate can be the code rate if the beam report with N CRIs (or SSBRIs) and their corresponding L1-RSRP/differential RSRP is placed in one PUCCH instance. A first code rate can be the code rate if the beam report is sent as one part. If a first code rate is larger than or equal to a forth threshold, the UE can split the beam report into two parts and each part can be transmitted in one PUCCH instance and two parts are sent in two PUCCH instances. If a first code rate is less than a forth threshold, the UE can transmit the beam report in one part in one PUCCH instance. In one example, a forth threshold can be 0.35, 0.45, 0.6 or 0.8.

In one example of N=2, the UE can be requested to report two selected CRIs and information on their L1-RSRP. A first code rate is calculated as the code rate of that sending {CRI #i, L1-RSRP of CRI #i, CRI #j, differential L1-RSRP of CRI #j} as one part in one PUCCH instance. The UE can determine the transmission of beam reporting based on the value of a first code rate. In such example, if a first code rate is >=a forth threshold, the UE can split the beam report into two parts: {CRI #i, L1-RSRP of CRI #i} and {CRI #j, L1-RSRP of CRI #j} and send {CRI #i, L1-RSRP of CRI #i} in one PUCCH instance and send {CRI #j, L1-RSRP of CRI #j} in another PUCCH instance. In such example, if a first code rate is >=a forth threshold, the UE can send the beam report: {CRI #i, L1-RSRP of CRI #i, CRI #j, differential L1-RSRP of CRI #j} in one PUCCH instance.

In one example of N=3, the UE can be requested to report three selected CRIs and information on their L1-RSRP. A first code rate is calculated as the code rate of that sending {CRI #i, L1-RSRP of CRI #i, CRI #j, differential L1-RSRP of CRI #j, CRI #k, differential L1-RSRP of CRI #k} as one part in one PUCCH instance. The UE can determine the transmission of beam reporting based on the value of a first code rate.

In such example, if a first code rate is >=a forth threshold, the UE can split the beam report into two parts: {CRI #i, the L1-RSRP of CRI #i, the CRI #j, the differential L1-RSRP of CRI #j by assuming the L1-RSRP of CRI #i is reference RSRP} and {CRI #k, L1-RSRP of CRI #k}. Then the UE can report these two parts in two PUCCH instance. The UE can report the following information in n-th PUCCH instance: {CRI #i, the L1-RSRP of CRI #i, the CRI #j, the differential L1-RSRP of CRI #j by assuming the L1-RSRP of CRI #i is reference RSRP}. Then the UE can report the information CRI #k in (n+1)-th PUCCH instance. The UE can report the following information in (n+1)-th PUCCH instance:{CRI #k, L1-RSRP of CRI #k}. In another example, the UE can split the beam report into two parts as {CRI #i, the L1-RSRP of CRI #i} and {CRI #j, L1-RSRP of CRI #j, CRI #k, the differential L1-RSRP of CRI #k by using the L1-RSRP of CRI #j as the reference RSRP}. Then the UE can report the following information in n-th PUCCH instance: {CRI #i, the L1-RSRP of CRI #i} and the UE can report the following information in (n+1)-th PUCCH instance {CRI #j, L1-RSRP of CRI #j, CRI #k, the differential L1-RSRP of CRI #k by using the L1-RSRP of CRI #j as the reference RSRP}.

In such example, if a first code rate is <a forth threshold, the UE can report the whole beam report as one part in one PUCCH instance.

In another example of N=3, the UE can be requested to report four selected CRIs and information on their L1-RSRP. A first code rate is calculated as the code rate of that sending {CRI #i, L1-RSRP of CRI #i, CRI #j, differential L1-RSRP of CRI #j, CRI #k, differential L1-RSRP of CRI #k, CRI #m, differential L1-RSRP of CRI #m} as one part in one PUCCH instance. The UE can determine the transmission of beam reporting based on the value of a first code rate.

In such example, if a first code rate is >=a forth threshold, the UE can split the beam report into two parts: {CRI #i, the L1-RSRP of CRI #i, the CRI #j, the differential L1-RSRP of CRI #j by assuming the L1-RSRP of CRI #i as the reference RSRP} and {CRI #k, the L1-RSRP of CRI #k, the CRI #m, the differential L1-RSRP of CRI #m by assuming the L1-RSRP of CRI #k as the reference RSRP}. The UE can report the following information in n-th PUCCH instance: {CRI #i, the L1-RSRP of CRI #i, the CRI #j, the differential L1-RSRP of CRI #j by assuming the L1-RSRP of CRI #i as the reference RSRP}. Then the UE can report the information CRI #k and CRI #m in (n+1)-th PUCCH instance. The UE can report the following information in (n+1)-th PUCCH instance: {CRI #k, L1-RSRP of CRI #k, CRI #m, the differential L1-RSRP of CRI #m by using the L1-RSRP of CRI #k as the reference RSRP}.

In one embodiment, the UE can be requested to report one bit in each PUCCH instance to indicate whether that PUCCH instance is the first PUCCH instance or the second PUCCH instance among the pair of PUCCH instances for transmitting one beam report.

In semi-persistent beam reporting, the UE can receive an activation message or selection message from higher layer and then the UE would begin the report beam reporting with N beams (N beam IDs and their corresponding L1-RSRP or differential L1-RSRP). The UE can continue reporting periodically until an inactivation message is received from higher layer. A semi-persistent beam reporting can be transmitted on PUSCH, long PUCCH and short PUCCH.

All embodiments described above for a periodic beam reporting can be applied here for semi-persistent beam reporting on PUCCH channels.

Two beam reporting can collide if the time occupancy of physical channels scheduled to carry the CRI/RSRP or SSBRI/RSRP reports overlap in at least one OFDM symbol and are transmitted on the same carrier. In some embodiment, when a UE is configured to transmit two CRI/RSRP or SSBRI/RSRP reports, one or more of the following rules can be apply on PUSCH channels and/or PUCCH channels for CRI/RSRP or SSBRI/RSRP reports. Here the CRI/RSRP or SSBRI/RSRP can also be called beam report.

In one embodiment, the UE can determine the priority of beam reports between colliding beam reporting according to the time properties of beam reporting: periodic, semi-persistent and aperiodic. In one example of, if an aperiodic beam report (CRI/RSRP or SSBRI/RSRP report) collides with a periodic beam report (CRI/RSRP or SSBRI/RSRP report), then the aperiodic beam report (CRI/RSRP or SSBRI/RSRP report) has priority and the periodic beam report (CRI/RSRP or SSBRI/RSRP report) may not be sent by the UE.

In another example, if an aperiodic beam report (CRI/RSRP or SSBRI/RSRP report) collides with a periodic beam report (CRI/RSRP or SSBRI/RSRP report), then the periodic beam report (CRI/RSRP or SSBRI/RSRP report) has priority and the aperiodic beam report (CRI/RSRP or SSBRI/RSRP report) may not be sent by the UE.

In yet another example, if an aperiodic beam report (CRI/RSRP or SSBRI/RSRP report) collides with a semi-persistent beam report (CRI/RSRP or SSBRI/RSRP report), then the aperiodic beam report (CRI/RSRP or SSBRI/RSRP report) has priority and the semi-persistent beam report (CRI/RSRP or SSBRI/RSRP report) may not be sent by the UE.

In yet another example, if an aperiodic beam report (CRI/RSRP or SSBRI/RSRP report) collides with a semi-persistent beam report (CRI/RSRP or SSBRI/RSRP report), then the semi-persistent beam report (CRI/RSRP or SSBRI/RSRP report) has priority and the aperiodic beam report (CRI/RSRP or SSBRI/RSRP report) may not be sent by the UE.

In yet another example, if a semi-persistent beam report (CRI/RSRP or SSBRI/RSRP report) collides with a periodic beam report (CRI/RSRP or SSBRI/RSRP report), then the semi-persistent beam report (CRI/RSRP or SSBRI/RSRP report) has priority and the periodic beam report (CRI/RSRP or SSBRI/RSRP report) may not be sent by the UE.

In yet another example, if a semi-persistent beam report (CRI/RSRP or SSBRI/RSRP report) collides with a periodic beam report (CRI/RSRP or SSBRI/RSRP report), then the periodic beam report (CRI/RSRP or SSBRI/RSRP report) has priority and the semi-persistent beam report (CRI/RSRP or SSBRI/RSRP report) may not be sent by the UE.

In one embodiment, the UE can determine the priority of beam reports among colliding beam reports according to the reporting contents. In one example, if a beam report with CRI/RSRP report collides with another beam report with SSBRI/RSRP report, the beam report with CRI/RSRP report can have priority and the beam report with SSBRI/RSRP report may not be sent by the UE.

In another example, if a beam report with CRI/RSRP report collides with another beam report with SSBRI/RSRP report, the beam report with SSBRI/RSRP report can have priority and the beam report with CRI/RSRP report may not be sent by the UE.

In yet another example, if a beam report N1 reported CRIs or SSBRIs collides with another beam report with N2 reported CRIs or SSBRIs, then the report with more reported CRIs or SSBRIs has priority. In one example, assuming N1>N2, then the UE can transmit the beam report with N1 reported CRIs or SSBRIs and the beam report with N2 reported CRIs or SSBRIs cannot be sent by the UE.

In yet another example, if a beam report N1 reported CRIs or SSBRIs collides with another beam report with N2 reported CRIs or SSBRIs, then the report with less reported CRIs or SSBRIs has priority. In one example, assuming N1<N2, then the UE can transmit the beam report with N1 reported CRIs or SSBRIs and the beam report with N2 reported CRIs or SSBRIs cannot be sent by the UE.

In one embodiment, if one beam report scheduled on PUCCH channel collide with one beam report scheduled on PUSCH channel, then the UE can merge these two beam report and report both in PUSCH channel.

In one embodiment, the UE can be requested to report N1 CRIs or SSBRIs in a first beam report scheduled in PUCCH channel and to report N2 CRIs or SSBRIs in a second beam report scheduled in PUSCH channel. If these two beam reports collide, the UE can send both beam report in PUSCH channel.

In one embodiment, if two beam reports scheduled in PUCCH channel collide, the UE can be requested to merge them into one part and transmit them in on PUCCH channel if the implementation code rate is not above some threshold.

In one embodiment, the UE can be requested to report N1 CRIs or SSBRIs in a first beam report scheduled in PUCCH channel and to report N2 CRIs or SSBRIs in a second beam report scheduled in PUCCH channel. When these two beam reports collide, the UE can be configured to determine whether to drop one beam report or merge two beam reports into one part according to the code rate and/or payload size if merging the beam reports. If the merged beam report's code rate in one PUCCH channel is less than some threshold, the UE can merge these two colliding beam report in one part and send them in one PUCCH channel.

If the merged beam report's code rate in one PUCCH channel is larger than or equal to some threshold, the UE can drop one beam report and only send one beam report according one or more of the schemes described above. If the merged beam report's payload size is less than some threshold, the UE can merge these two colliding beam report in one part and send them in one PUCCH channel. If the merged beam report payload size is larger than or equal to some threshold, the UE can drop one beam report and only send one beam report according one or more of the schemes described above.

In one embodiment, the UE can be configured with one normal beam reporting and one group-based beam reporting. When one normal beam reporting collide with one group-based beam reporting, the UE can be configured to assume that the normal beam reporting has higher priority and only transmit the normal beam reporting. In one example, when one normal beam reporting collides with one group-based beam reporting, the UE can be configured to assume that the group-based beam reporting has higher priority and only transmit the group-based beam reporting. In one example, when one normal beam reporting collides with one group-based beam reporting, the UE can be configured to multiplex normal beam reporting and group-based beam reporting into one report and send the merged report.

In one embodiment, the UE can be configured with a first CSI reporting configuration with higher layer parameter ReportQuantity set to "CRI/RSRP" or "SSBRI/RSRP" and higher layer parameter group-based-beam-reporting set to "OFF," and a second CSI reporting configuration with higher layer parameter ReportQuantity set to "CRI/RSRP" or "SSBRI/RSRP" and higher layer parameter group-based-beam-reporting set to "On." When a first CSI report configured through a first CSI reporting configuration collides with a second CSI report configured through a second CSI reporting configuration, the UE can be configured to assume that a first CSI report has higher priority and a second CSI report may not be sent by the UE. When a first CSI report configured through a first CSI reporting collides with a second CSI report configured through a second CSI reporting configuration, the UE can be configured to assume a second CSI report has higher priority and a first CSI report may not be sent by the UE.

In one embodiment, when a CSI report with higher layer parameter ReportQuantity set to "CRI/RSRP" or "SSBRI/RSRP" and higher layer parameter group-based-beam-reporting set to "OFF" collides with a CSI report with higher layer parameter ReportQuantity set to "CRI/RSRP" or "SSBRI/RSRP" and higher layer parameter group-based-beam-reporting set to "On," the UE can be configured to assume the CSI report with higher layer parameter group-based-beam-reporting set to "OFF" has higher priority and the CSI report with higher layer parameter group-based-beam-reporting set to "On" may not be sent by the UE.

In one embodiment, when a CSI report with higher layer parameter ReportQuantity set to "CRI/RSRP" or "SSBRI/RSRP" and higher layer parameter group-based-beam-reporting set to "OFF" collides with a CSI report with higher layer parameter ReportQuantity set to "CRI/RSRP" or "SSBRI/RSRP" and higher layer parameter group-based-beam-reporting set to "On," the UE can be configured to assume the CSI report with higher layer parameter group-based-beam-reporting set to "On" has higher priority and the CSI report with higher layer parameter group-based-beam-reporting set to "Off" may not be sent by the UE.

In some embodiments, the UE can be configured to do joint RSRP measurement on SS/PBCH block and CSI-RS resource and then report the measurement results. Such embodiments are useful because the SS/PBCH block transmission is narrow band. When one CSI-RS resource are transmitted with the same transmit beam as one SS/PBCH block but with wider bandwidth, the UE can use both SS/PBCH block and CSI-RS resource to measure the RSRP of one transmit beam.

In one embodiment, the UE can be configured to jointly measure RSRP on SS/PBCH and CSI-RS and then report the L1-RSRP and corresponding SS/PBCH block index. When the UE is configured with joint RSRP measurement and reporting on SS/PBCH block and CSI-RS resource, the UE can be requested to measure joint RSRP based SS/PBCH block and CSI-RS resource that are transmitted on the same OFDM symbol(s) and/or that are spatial QCLed. The UE can be requested to select SS/PBCH blocks or CSI-RS resources based on the jointly measured RSRP. The UE can be requested to report the selected SS/PBCH block indices or CSI-RS resource indicators and the corresponding jointly measured L1-RSRP.

In one embodiment, when the UE is configured to do joint RSRP measurement and reporting on SS/PBCH and CSI-RS, the UE can be requested to do one or more the followings. In one example, for one SS/PBCH block configured for the UE to measure RSRP, the UE can be request to measure joint L1-RSRP on that SS/PBCH block and the CSI-RS resources transmitted on the same OFDM symbols as that SS/PBCH blocks. The CSI-RS resources may be spatial quasi co-located with that SS/PBCH block.

In another example, in the RSRP measurement, the UE may scale the transmission power of the CSI-RS resource with the power offset between SS/PBCH block and CSI-RS resource. In one example, the UE may scale the transmission power of the CSI-RS resource with a value provided by higher layer parameter Pc_SS configured to CSI-RS resource.

In yet another example, the UE can be requested to select one or more SS/PBCH blocks based on jointly measured L1-RSRP.

In yet another example, the UE can be requested to report one or more selected SS/PBCH blocks and their corresponding jointly measured L1-RSRP.

In one embodiment, when the UE is configured with to do joint RSRP measurement and reporting on SS/PBCH and CSI-RS, the UE can be requested to do one or more the followings. In one example, for one CSI-RS resource configured for the UE to measure RSRP, the UE can be request to measure joint L1-RSRP on that CSI-RS resource and the SS/PBCH block transmitted on the same OFDM symbols as that CSI-RS resource. The CSI-RS resources may be spatial quasi co-located with that SS/PBCH block.

In another example, in the RSRP measurement, the UE may scale the transmission power of the CSI-RS resource with the power offset between SS/PBCH block and CSI-RS resource. In one example, the UE may scale the transmission power of the CSI-RS resource with a value provided by higher layer parameter Pc_SS configured to CSI-RS resource. In one example, the UE may scale the transmission power of that SS/PBCH block with a value provided by higher layer parameter Pc_SS configured the corresponding CSI-RS resource.

In yet another example, the UE can be requested to select one or more CSI-RS resources based on jointly measured L1-RSRP.

In yet another example, the UE can be requested to report one or more selected CSI-RS resource and their corresponding jointly measured L1-RSRP.

In one embodiment, a UE can be configured with a higher layer parameter ReportQuantity set to "CRI/SSBRI/RSRP," to indicate the UE to do joint SS/PBCH and CSI-RS RSRP measurement and reporting. In one embodiment, a UE can be configured with a higher layer parameter ReportQuantity set to "SSBRI/CRI/RSRP," to indicate the UE to do joint SS/PBCH and CSI-RS RSRP measurement and reporting. The value of ReportQuantity can be used to indicate whether CRI or SSBRI may be reported for joint RSRP measurement. In one example, ReportQuantity set to "CRI/SSBRI/RSRP" indicates the UE may select CSI-RS resources and report CRIs. In one example, ReportQuantity set to "SSBRI/CRI/RSRP" indicates the UE may select SS/PBCH blocks and report SSBRI (SS/PBCH block indicator).

In one example the value of ReportQuantity set to "CRI/Joint-RSRP" and "SSBRI/Joint-RSRP" can indicate joint L1-RSRP measurement to the UE. In one example, ReportQuantity set to "CRI/Joint-RSRP" indicates the UE may do joint L1-RSRP measurement on CSI-RS resource and SS/PBCH block that are transmitted on the same OFDM symbols and then select CSI-RS resources and report CRIs and the corresponding jointly measured L1-RSRP. In one example, ReportQuantity set to "SSBRI/Joint-RSRP" indicates the UE may do joint L1-RSRP measurement on CSI-RS resource and SS/PBCH block that are transmitted on the same OFDM symbols and then select SS/PBCH blocks and report SSBRIs and the corresponding jointly measured L1-RSRP.

In some embodiments, a UE can be configured with a set of CSI-RS resources and the set can be configured with an indication of that the Tx beams (or can be called spatial transmit filter) applied to different CSI-RS resources in that set are same. With such configuration, the UE can be requested to apply different Rx beam (or can be called spatial receive filter) on those CSI-RS resource to implement the function of sweeping Rx beams with respect to one particular beams.

In one embodiment, a UE can be configured with a set of CSI-RS resources. The CSI-RS resource set can be configured with the higher layer parameter CSI-RS-ResourceRep set to "On." With such configuration, the UE can be configured to ignore the Spatial QCL assumption configured to the CSI-RS resource in that set. In one example, with such configuration, the UE can be configured to ignore the spatial QCL assumption indicated by higher layer parameter QCL-InfoPeriodicCSI-RS configured to the CSI-RS resources in that set if one or more CSI-RS resources in that set are configured with higher layer parameter QCL-InfoPeriodicCSI-RS.

In one embodiment, a UE can configured with a CSI-RS set $q_0$ with one or more CSI-RS resources and the UE is configured with a higher layer parameter CSI-RS-ResourceRep set to "On" for the set $q_0$. When any CSI-RS resource in set $q_0$ is configured as spatial QCL source to some downlink channel (for example PDCCH, PDSCH) or signals (for example another CSI-RS resource), the UE can be requested to: use the spatial receive filter that is obtained by measure the whole CSI-RS set $q_0$; and/or use the spatial receive filter that is obtained by measuring all the triggered CSI-RS resources in the set $q_0$.

When any CSI-RS resource in set $q_0$ is configured as spatial relation source to any uplink channel, for example PUCCH, or uplink signal, for example SRS resource, the UE can be requested to: use the spatial transmit filter that is same the spatial receive filter that is obtained by measuring the whole CSI-RS resource set $q_0$; and/or use the spatial transmit filter that is same to the spatial receive filter that is obtained by measuring all the triggered CSI-RS resources in the set $q_0$.

In one example, a transmission configuration index associated with any one CSI-RS resource in set $q_0$ can indicate the same spatial QCL assumption as another transmission configuration index associated with any other CSI-RS resource in set $q_0$. This example is valid because all the CSI-RS resource in set $q_0$ are supposed to be transmitted with the same Tx beam and thus the UE may use the "best" Rx beam that is learnt by measuring the CSI-RS resource in set $q_0$ to receive the signal or channel that is transmitted with the Tx beam carried by the CSI-RS resources in $q_0$.

In one embodiment, a UE can be configured with a CSI-RS set $q_0$ with one or more CSI-RS resources. When the set $q_0$ is configured with the higher layer parameter CSI-RS-ResourceRep set to "On," the UE can be configured with QCL assumption per set and the UE can be requested to apply spatial QCL assumption when receiving CSI-RS resources in the set $q_0$ according the QCL assumption configured to the set $q_0$.

In one embodiment, the UE can be configured to measure one or more CSI-RS resource and/or SS/PBCH blocks indicated by the gNB and then report back the RSRP measurement of indicated CSI-RS resource and/or SS/PBCH block. In one embodiment, the UE can be configured with one or more CSI-RS resources and/or SS/PBCH blocks to measure the L1-RSRP. The UE can be also configured with one or more CSI-RS resource indices and/or SS/PBCH block indices and the UE can be requested to report the L1-RSRP measurement of those indicated CSI-RS resources and/or SS/PBCH blocks in beam report.

In one embodiment, one reporting setting ReportConfig can contain a parameter ReportRSID to specify the information of one or multiple CSI-RS resources and/or SS/PBCH blocks for a UE to report the L1-RSRP measurement of those specified CSI-RS resources and/or SS/PBCH blocks. In one example, the parameter ReportRSID can be a bitmap to indicate which reference resources in the associated CSI-RS resource set and/or SS/PBCH blocks the UE may report L1-RSRP for them. When ReportRSID is configured, the UE include the CRIs and their L1-RSRP or differential L1-RSRP for the CSI-RS resources that are indicated in ReportRSID. When ReportRSID is configured, the UE include the SSBRIs (SS/PBCH resource indicator) and their L1-RSRP or differential L1-RSRP for the CSI-RS resources that are indicated in ReportRSID.

The aforementioned embodiment is useful for the gNB to configure the UE to monitor some particular Tx beam (for example, one beam used for PDCCH channel) and report the quality. Such reporting is useful for the NW to monitor some particular beams.

In one embodiment, the UE can be request to report differential L1-RSRP of one CSI-RS resource or SS/PBCH block with a reference to the largest L1-RSRP reported in one same CSI report.

In one embodiment, the 4-bit differential L1-RSRP can take the values as listed in TABLE 1A.

TABLE 1A

The value of 4-bit differential L1-RSRP

| The value of 4-bit | Differential L1-RSRP range |
|---|---|
| 0000 | 0 dB ≥ differential L1-RSRP > −2 dB |
| 0001 | −2 dB ≥ differential L1-RSRP > −4 dB |
| ... | ... |
| 1111 | −30 dB ≥ differential L1-RSRP |

In TABLE 1A, the value 1111 can be defined as "out-of-range" for differential L1-RSRP and that indicates one L1-RSRP is more than 30 dB lower than the reference L1-RSRP. In one embodiment, the 4-bit differential L1-RSRP can take the values as listed in TABLE 1B.

TABLE 1B

The value of 4-bit differential L1-RSRP

| The value of 4-bit | Differential L1-RSRP range |
|---|---|
| 0000 | −30 dB ≥ differential L1-RSRP |
| 0001 | −28 dB ≥ differential L1-RSRP > −30 dB |
| ... | ... |
| 1110 | −2 dB ≥ differential L1-RSRP > −4 dB |
| 1111 | 0 dB ≥ differential L1-RSRP > −2 dB |

In TABLE 1B, the value 0000 can be defined as "out-of-range" for differential L1-RSRP and that indicates one L1-RSRP is more than 30 dB lower than the reference L1-RSRP. In one embodiment, the step-size of differential RSRP can depend on the value of bits. In one example, the 4-bit differential L1-RSRP can take values as listed in TABLE 1C.

TABLE 1C

The value of 4-bit differential L1-RSRP

| The value of 4-bit | Differential L1-RSRP range |
|---|---|
| 0000 | 0 dB ≥ differential L1-RSRP > −2 dB |
| 0001 | −2 dB ≥ differential L1-RSRP > −4 dB |
| ... | ... |
| 0111 | −14 dB ≥ differential L1-RSRP > −16 dB |
| 1000 | −16 dB ≥ differential L1-RSRP > −20 dB |
| ... | ... |
| 1111 | −44 dB ≥ differential L1-RSRP |

As shown in TABLE 1C, the step size is 2 dB for bit values 0000~0111 and the step size is 4 dB for bit values 1000~1111.

In one embodiment, the step-size can depend on the differential RSRP value. In one example, when the differential RSRP is 0 dB~−16 dB, the step size is 2 dB and when the differential RSRP value is less than −16 dB, the step size is 4 dB. This example can also be illustrated as in TABLE 1C.

In a beam report configured with N>1 reported beams, the UE is requested to report 7-bit L1-RSRP of the CSI-RS resource (CRI) or SSB with the largest L1-RSRP and 4-bit differential RSRP of all other N−1 reported CSI-RS resources (CRI) or SSBs. The differential RSRP is calculated with reference to the largest L1-RSRP reported in the same reporting instance. The L1-RSRP report is represented by a 7-bit value and such a 7-bit value can represent a limited range of L1-RSRP. One example of 7-bit RSRP range is −140 dbm to −44 dbm. If the reported L1-RSRP is larger than −44 dBm, the UE can only report the 7-bit value that represents RSRP>=−44 dBm. If the L1-RSRP of other reported CSI-RS or SSB is also larger than the largest value that can be represented by the L1-RSRP reporting range, it may be some difficulty here. One solution for this is to allow a UE to report a special 4-bit value to indicate that the L1-RSRP of this CSI-RS resource or SSB is larger than the largest value that can be represented by the L1-RSRP reporting range.

In one embodiment, the UE can be requested to report a special value for 4-bit differential L1-RSRP for one CSI-RS resource or SSB if the L1-RSRP of that reported CSI-RS or SSB is out of range of the reporting range of RSRP to indicate that the L1-RSRP of this reported CSI-RS resource or SSB is equal to or larger than the largest L1-RSRP values in the reporting range of L1-RSRP. For example, the reporting range of RSRP is defined to be −140 dBm to −44 dbm. If the L1-RSRP of one reported CSI-RS or SSB is out of the reporting range of RSRP, the UE may report a special value of 4-bit differential L1-RSRP to indicate that.

In one embodiment, the reporting range of RSRP is defined to be from X1 dBm to X2 dBm. The example of X1 can be −140 and one example of X2 can be −44. When the L1-RSRP of one reported CSI-RS or SSB is >=X2 dBm, the UE can be requested to report a first "out-of-range" value to indicate that the L1-RSRP of that CSI-RS or SSB is >=X2 dBm. In one example, the UE can report the value of 0000 to indicate that the L1-RSRP of corresponding CSI-RS resource (CRI) or SS/PBCH block (SSB) is >=X2 dBm, one example X2 can be −44 dBm. In one example, the UE can report the value of 1111 to indicate that the L1-RSRP of corresponding CSI-RS resource (CRI) or SS/PBCH block (SSB) is >=X2 dBm, one example X2 can be −44 dBm.

In one example, if the UE is configured with the higher layer parameter group-based-beam-reporting set to "OFF," the UE is not required to update measurements for more than 64 [CSI-RS and or SSB] resources, and the UE may report in a single report nrofReportedRS (higher layer configured) different [CRI and SSBRI (SSB Resource Indicator)] for each report setting. If the higher layer parameter nrofReportedRS is configured to be one, the reported L1-RSRP value is defined by a 7-bit value in the range [−140, −44] dBm with 1 dB step size. If the higher layer parameter nrofReportedRS is configured to be larger than one, the UE may use largest L1-RSRP and differential L1-RSRP based reporting, where the largest value of L1-RSRP uses a 7-bit value and the differential L1-RSRP uses a 4-bit value.

The differential L1-RSRP values are computed with 2 dB step size with a reference to the largest L1-RSRP value which is part of the same L1-RSRP reporting instance. If the largest L1-RSRP is larger than the largest L1-RSRP value of the specified or configured reporting range of L1-RSRP, the differential L1-RSRP values are computed with a reference to the largest L1-RSRP value of the reporting range of L1-RSRP. If the L1-RSRP of CRI or SSBRI other than the one with largest L1-RSRP is equal to or larger than the largest L1-RSRP value of the reporting range of L1-RSRP, the UE may report the value of "out-of-range" for a differential L1-RSRP value. In one example, the value of "out-of-range" can be 0000. In one example, the value of "out-of-range" can be 1111. In one example, the value of "out-of-range" can be one value specified in the specification.

In one embodiment, the reporting range of RSRP is defined to be from X1 dBm to X2 dBm. The example of X1 can be −140 and one example of X2 can be −44. When the L1-RSRP of one reported CSI-RS or SSB is <=X1 dBm, the UE can be requested to report a second "out-of-range" value to indicate that the L1-RSRP of that CSI-RS or SSB is <=X1 dBm. In one example, the UE can report the value of 0000 to indicate that the L1-RSRP of corresponding CSI-RS resource (CRI) or SS/PBCH block (SSB) is <=X1 dBm, one example X1 can be −140 dBm. In one example, the UE can report the value of 1111 to indicate that the L1-RSRP of corresponding CSI-RS resource (CRI) or SS/PBCH block (SSB) is <=X1 dBm, one example X1 can be −140 dBm.

In one embodiment, the reporting range of RSRP is defined to be from X1 dBm to X2 dBm. The example of X1 can be −140 and one example of X2 can be −44. When the L1-RSRP of one reported CSI-RS or SSB is <X1 dBm, the UE can be requested to report a second "out-of-range" value to indicate that the L1-RSRP of that CSI-RS or SSB is <X1 dBm. In one example, the UE can report the value of 0000 to indicate that the L1-RSRP of corresponding CSI-RS resource (CRI) or SS/PBCH block (SSB) is <X1 dBm, one example X1 can be −140 dBm.

In one example, the UE can report the value of 1111 to indicate that the L1-RSRP of corresponding CSI-RS resource (CRI) or SS/PBCH block (SSB) is <X1 dBm, one example X1 can be −140 dBm.

In one embodiment, what one bit-value of differential L1-RSRP represents can depend on the reported value of largest L1-RSRP in one same beam report. In one example, the bit-width for L1-RSRP is 7 bits and the reporting range of L1-RSRP is from −140 dBm to −44 dBm. The bit-width for differential L1-RSRP is 4 bits and what is meant by differential L1-RSRP bit value 1111 can be determined as follows. In one example, if the reported largest L1-RSRP value is ≥−44 dBm, the 4-bit value of differential L1-RSRP field being 1111 can represent that the L1-RSRP of the corresponding reported beam (CRI or SSBRI) is out of range, for example, ≥−44 dBm.

In another example, if the reported largest L1-RSRP value is <−44 dBm, the 4-bit value of differential L1-RSRP field being 1111 can represent the differential RSRP value of the corresponding reported beam (CRI or SSBRI) with a reference to the largest L1-RSRP in the same beam report, for example 1111 can represent differential L1-RSRP is ≤−30 dB.

In yet another example, the UE can be requested to choose between TABLE 2A and 2B for differential L1-RSRP according to the value of largest L1-RSRP in one report: for example, if the reported largest L1-RSRP value is ≥−44 dBm, the UE can choose table 2b for the differential L1-RSRP; and for example, if the reported largest L1-RSRP value is <−44 dBm, the UE can choose TABLE 2A for the differential L1-RSRP.

TABLE 2A

The value of 4-bit differential L1-RSRP

| The value of 4-bit | Differential L1-RSRP range |
| --- | --- |
| 0000 | 0 dB ≥ differential L1-RSRP > −2 dB |
| 0001 | −2 dB ≥ differential L1-RSRP > −4 dB |
| ... | ... |
| 1111 | −30 dB ≥ differential L1-RSRP |

TABLE 2B

The value of 4-bit differential L1-RSRP

| The value of 4-bit | Differential L1-RSRP range |
| --- | --- |
| 0000 | 0 dB ≥ differential L1-RSRP > −2 dB |
| 0001 | −2 dB ≥ differential L1-RSRP > −4 dB |
| ... | ... |
| 1110 | −28 dB ≥ differential L1-RSRP > −30 dB |
| 1111 | Indication of "Out-of-Range," or indicating the L1-RSRP is larger or equal to the largest dBm value that can be represented by for example 7-bit. |

In one embodiment, a first particular value of a differential L1-RSRP report field for one reported Tx beam in a beam report can be used to represent that the L1-RSRP of the corresponding Tx beam is equal to or lower than the lowest L1-RSRP value of the L1-RSRP reporting range. In one embodiment, a first particular value of a differential L1-RSRP report field for one reported Tx beam in a beam report can be determined as follows.

In one example, if the largest L1-RSRP reported in one same beam report is larger than or equal to some threshold X dBm, then a first particular value of a differential L1-RSRP report field can represent that the measured L1-RSRP of the corresponding Tx beam is equal to or lower than the lowest L1-RSRP value of the L1-RSRP reporting range.

In another example, if the largest L1-RSRP reported in one same beam report is lower than threshold X dBm, then a first particular value of a differential L1-RSRP report field can represent the differential L1-RSRP of the corresponding reported Tx beam with a reference to the largest L1-RSRP reported in the same beam report.

In one embodiment, a UE can be configured to measure the L1-RSRP of a set of RS (reference signal) resources. The RS can be CSI-RS or SS/PBCH blocks. The UE can be configured to report N=4 selected RS IDs and their corresponding L1-RSRP measurements. Assume the selected RS ID for reporting are RS ID $\{i_1, i_2, i_3, i_4\}$ and the L1-RSRP of those four beams are L1-RSRP of RS $i_1$≥L1-RSRP of RS $i_2$≥L1-RSRP of RS $i_3$≥L1-RSRP of RS $i_4$. Assume 7-bit value is used for L1-RSRP report and 4-bit value with 2 dB step is used for differential L1-RSRP. As configured, the UE can report a 7-bit L1-RSRP for RS ID $i_1$ and 4-bit differential L1-RSRP of each of RS ID $i_2$, $i_3$, and $i_4$. Assume the RSRP reporting range for 7-bit L1-RSRP is −140 dBm to −44 dBm. The UE can be configured to report each differential L1-RSRP value as follows.

In one example, if the L1-RSRP reported for RS ID $i_1$ is larger or equal to $X_1$ dBm, (one example for X1 can be −110 dBm), then the value of 4-bit differential L1-RSRP of RS ID $i_2/i_3/i_4$ being $X_2$ (one example for $X_2$ can be 1111, 0000) can represent that the measured L1-RSRP of RS ID $i_2/i_3/i_4$ is lower than the lowest value of L1-RSRP reporting range.

In another example, if the L1-RSRP reported for RS ID $i_1$ is less than $X_1$ dBm (one example for $X_1$ can be −110 dBm as shown above), then the value of 4-bit differential L1-RSRP of RS ID $i_2/i_3/i_4$ being $X_2$ (one example for $X_2$ can be 1111, 0000) can represent that the differential L1-RSRP of RS ID $i_2/i_3/i_4$ with a reference to the L1-RSRP of RS ID $i_1$.

In another example, the value of $X_1$ and $X_2$ can be specified in specification or can be configured by higher layer signaling.

In one scheme, a UE can be requested to calculate and report the differential L1-RSRP in one CRI/RSRP (or SSBRI/RSRP) report according to the followings. Assume the reporting range for a 7-bit L1-RSRP is −44 dBm to −140 dBm. If the largest L1-RSRP reported in one beam RSRP report is ≥−44 dBm, then the UE may use TABLE 2B to calculate and report the differential RSRP. If the largest L1-RSRP reported in one beam RSRP report is <−110 dBm, then the UE may use TABLE 2C to calculate the differential RSRP. If the largest L1-RSRP reported in one beam RSRP report is >−44 dBm and ≥−110 dBm, then the UE may use TABLE 2A to calculate the differential RSRP.

TABLE 2C

The value of 4-bit differential L1-RSRP

| The value of 4-bit | Differential L1-RSRP range |
|---|---|
| 0000 | 0 dB ≥ differential L1-RSRP > −2 dB |
| 0001 | −2 dB ≥ differential L1-RSRP > −4 dB |
| ... | ... |
| 1110 | −28 dB ≥ differential L1-RSRP > −30 dB |
| 1111 | Indicating the L1-RSRP is less than or equal to the smallest dBm value that can be represented by for example 7-bit, for example, −140 dBm |

In one embodiment, a UE can be configured to report N>=1 Tx beam IDs and their corresponding L1-RSRP report. The Tx beam ID can be CRI (CSI-RS indicator) or a SS/PBCH block indicator (SSBRI). If N=1, the UE can report one Tx beam ID and the corresponding L1-RSRP value. If N>1, the UE can report the L1-RSRP of the Tx beam ID with largest L1-RSRP measurement among all the reported N Tx beam IDs and the UE can report differential L1-RSRP for all other N−1 reported Tx beam IDs. The UE can calculate the reported L1-RSRP and differential L1-RSRP as follows. Here assume the reporting range for L1-RSRP is from −140 dBm to −44 dBm.

The UE can report a 7-bit L1-RSRP for the largest L1-RSRP among all N reported Tx beam IDs according to TABLE 3A.

TABLE 3A

| Reported value | | |
|---|---|---|
| Reported value | Measured quantity value | Unit |
| RSRP_00 | RSRP < −140 | dBm |
| RSRP_01 | −140 ≤ RSRP < −139 | dBm |
| RSRP_02 | −139 ≤ RSRP < −138 | dBm |
| ... | ... | ... |
| RSRP_95 | −46 ≤ RSRP < −45 | dBm |
| RSRP_96 | −45 ≤ RSRP < −44 | dBm |
| RSRP_97 | −44 ≤ RSRP | dBm |

If the number of reported Tx beams, N, is larger than 1 or the indication for group-based beam report is "on," then the UE may calculate the differential L1-RSRP for each reported Tx beam (other than the Tx beam with the largest L1-RSRP) as follows. In one example, if the measured L1-RSRP of one Tx beam is <−140 dBm, the UE reports Diff_RSRP_00 in TABLE 3B. In another example, if the measured L1-RSRP of one Tx beam is >=−44 dBm, then UE reports Diff_RSRP_15 in TABLE 3B. In another example, the UE report the differential L1-RSRP as follows in TABLE 3B. In yet another example, if the largest measured L1-RSRP is not reported by RSRP_97, the "difference" in TABLE 3B is computed with a reference to the largest measured L1-RSRP value. If the largest measured L1-RSRP is reported as RSRP_97 in beam report, the "difference" in TABLE 3B is computed with a reference to −44 dBm. In other word, the reported value of largest measured L1-RSRP is used as reference in the calculation of differential L1-RSRP.

TABLE 3B

| Reported value | |
|---|---|
| Reported value | Measured quantity value |
| Diff_RSRP_00 | RSRP < −140 dBm |
| Diff_RSRP_01 | Difference => 26 dB |
| Diff_RSRP_02 | 24 dB <= Difference < 26 dB |
| ... | ... |
| Diff_RSRP_14 | 0 dB <= Difference < 2 dB |
| Diff_RSRP_15 | RSRP >= −44 dBm |

In one embodiment, a UE is not expect to receive a PDSCH and multiple CSI-RS resources configured in CSI-RS resource set with higher layer parameter CSI-RS-ResourceRep set to "ON" in one same slot i. The technical reason for this scheme is that the CSI-RS with CSI-RS-ResourceRep="ON" is generally used to implement the function of UE Rx beam sweeping, i.e., P-3 function in beam management. To receive such CSI-RS resources, the UE usually applied different Rx beams on different OFDM symbol so that he can measure the quality of different Rx beam with respect to one particular Tx beam. But on the other hand, to receive a PDSCH, the UE may use one beam (the best Rx beam) to buffer the signal. Therefore, the UE behavior to receive CSI-RS for P3 and the UE behavior to receive a PDSCH contradict to each other.

In one embodiment, a UE is not expect to receive a PDSCH and multiple CSI-RS resources configured in CSI-RS resource set with higher layer parameter CSI-RS-ResourceRep set to "ON" in one same slot i. If a UE is configured with a PDSCH and multiple CSI-RS resources with higher layer parameter CSI-RS-ResourceRep set to "ON" in slot i, the UE can choose one of the following actions: drop the PDSCH and only receive CSI-RS resources; drop the CSI-RS resources and only receive the PDSCH; and/or UE's implementation.

In one embodiment, a UE does not expect an aperiodic CSI-RS resource to be triggered with a time offset less than time threshold reported in UE capability if the QCL configuration to the aperiodic CSI-RS resource contains spatial QCL configuration. The technical reason for the embodiment is because if the QCL configuration for the CSI-RS resource contains spatial QCL configuration, then the UE needs to switch to proper Rx beam to buffer symbols. But before the time threshold reported by UE capability, the UE is not able to finish the DCI decoding and thus the UE does not know which CSI-RS resource(s) are triggered and thus the UE does not know which Rx beam may be used to buffer the symbols. Therefore, the CSI-RS resource with time offset less than that time threshold cannot be triggered.

In one embodiment, when aperiodic CSI-RS is used with aperiodic reporting, the CSI-RS offset is configured per resource set by the higher layer parameter AperiodicNZP- CSI-RS-TriggeringOffset. If the associated trigger state contains "QCL-TypeD" parameter in the corresponding TCI states, the UE does not expect any trigger state containing "QCL-TypeD" parameter in the corresponding TCI states to be configured with the higher layer parameter AperiodicNZP-CSI-RS-TriggeringOffset less than the threshold Threshold-Sched-Offset.

In one embodiment, a UE does NOT expect an aperiodic CSI-RS resource set to be triggered with a time offset less than time threshold reported in UE capability if this CSI-RS resource is configured with higher layer parameter CSI-RS-ResourceRep set to "ON." The technical reason for the embodiment is because, the CSI-RS with CSI-RS-ResourceRep set to "ON" is used for P-3 function and the UE is supposed to sweep Rx beam across OFDM symbols to measure the quality of different Rx beams with respect to one same Tx beam. But before the time threshold reported by UE capability, the UE is not able to finish the DCI decoding and thus the UE does not know which CSI-RS resource(s) are triggered and thus the UE does not know which Rx beam may be used to buffer the symbols. Therefore, the CSI-RS resource with time offset less than that time threshold cannot be triggered.

In one embodiment, for an aperiodic CSI-RS resource triggered with a time offset less than time threshold reported in UE capability, the UE may use the QCL configuration of one control channel, i.e., CORESET to receive the CSI-RS resource. In one scheme, if an aperiodic CSI-RS resource is triggered with a time offset less than time threshold reported in UE capability, the UE may assume to use the QCL configuration indicated by the TCI state used for PDCCH quasi co-location indication of the lowest CORESET-ID in the latest slot in which one or more CORESETs are configured for the UE.

In one embodiment, one set of SRS resources for UL beam management may be configured with a same bandwidth. That is useful for UE to apply the same transmit power on those SRS resources for UL beam management. Same transmit power can ensure the gNB to measure the beam quality of multiple transmit beams without any bias. If different transmit power applied on different SRS resources, the gNB might consider the beam carried by one SRS resource with larger transmit power as a "better" beam even though in fact that beam might not be the best beam.

In one scheme, a UE can be configured with one or more set of SRS resources and each SRS resource set can be configured with a higher layer parameter SRS-SetUse that indicate the use case of the SRS resources in that set. When the higher layer parameter SRS-SetUse is set to "BeamManagement" for one SRS resource set, all the SRS resources in that set may be configured with the same bandwidth. If one SRS set is configured to be used for UL beam management, the gNB may configure the same bandwidth to all the SRS resources in the same set. When the higher layer parameter SRS-SetUse is set to "BeamManagement" for one SRS resource set, the UE may expect that all the SRS resources in that set have the same bandwidth.

In one embodiment, a UE can be configured with a SRS resource set and the SRS resource set can be configured with a trigger timing offset X. The value of X can be in terms of slots. When one DCI sent at slot n triggers the transmission of this SRS resource set, the UE can be requested to transmit the SRS resources in this set at slot n+X.

In one embodiment, a UE can be configured with a first SRS resource set. The trigger timing offset of a first SRS resource set can be configured through a higher layer parameter SRS-triggerOffset. When a first SRS resource set is triggered though L-bit SRS request field in one DCI sent at slot n, the UE can be requested to transmit the SRS resources in a first SRS resource set at slot n+ SRS-triggerOffset.

A UE can be configured with one or more SRS resource sets used for UL beam management. The SRS set applicability for UL beam management is configured through a higher layer parameter SRS-SetUse. When the higher layer parameter SRS-SetUse is set to "BeamManagement," the SRS set is used for UL beam management. Generally, in 5G systems, a UE would apply some transmit beamformer (can also be called spatial domain transmission filter) when transmitting a SRS resource. There are two different schemes for the UE to compute the spatial domain transmission filter for one SRS resource. One scheme is that the gNB can configure the spatial domain transmission filter for one SRS resource.

The gNB can configure one higher layer parameter SRS-SpatialRelationInfo to one SRS resource and the UE can be requested to compute the spatial domain transmission filter for that SRS resource based on the configured SpatialRelationInfo. In other word, the parameter SpatialRelationInfo configures a Tx beamformer (can also be called Tx beamforming direction) for one SRS resource. Another scheme is that the UE determines the Tx beamforming direction for one SRS resource by itself. The value of SpatialRelationInfo can be a CSI-RS resource, a SRS resource or a SS/PBCH block.

To support the UL beam management, various beam sweeping operations on SRS resources are needed.

In one embodiment, a UE can be configured with a SRS set with N SRS resources. One or a subset of SRS resources in that set can be configured/indicated with Tx beamformers. For one SRS resource configured/indicated with Tx beamformer in that set, the UE can be requested to apply the Tx beamformor on that SRS resource as configured by the gNB. For one SRS resource not configured/indicated with Tx beamformer, the UE can be requested to apply Tx beamformer that is computed/determined based the Tx beamformor configured to one SRS resource (that has one configured/indicated Tx beamformer) in the same SRS resource set. The UE can be requested to apply Tx beamformer that is computed/determined by using the Tx beamformor configured to one SRS resource (that has one configured/indicated Tx beamformer) in the same SRS resource set as reference beamforming direction.

In one embodiment, a UE can be configured with one SRS set with N≥1 SRS resources. This set can be configured with a higher layer parameter SRS-SetUse that is set to "BeamManagement," which can indicate that this SRS set is used for beam management. A first SRS resource in that set is configured with higher layer parameter SpatialRelationInfo and other N−1 SRS resources are not configured with higher layer parameter SpatialRelationInfo. With this configuration, the UE can be requested to transmit the SRS resources as follows.

In one example, for the transmission of a first SRS resource, the UE can be requested to apply a spatial domain transmission filter on a first SRS resource as follows: if the SpatialRelationInfo configured to a first SRS is set to SS/PBCH block or CSI-RS resource, the UE may transmit a first SRS resource with the same spatial domain transmission filter used for the reception of SS/PBCH block or CSI-RS resource configured in the parameter SpatialRelationInfo; and if the SpatialRelationInfo configured to a first SRS is set to a SRS resource, the UE may transmit a first SRS resource with the same spatial domain transmission filter used for the transmission of SRS resource configured in the parameter SpatialRelationInfo.

In another example, for the transmission of SRS resource other than a first SRS resource in the same set, the UE can be requested to apply a spatial domain transmission filter on that SRS resource as follows: the UE may transmit that SRS resource with a second spatial domain transmission filter that is generated based on the spatial domain transmission filter applied on a first SRS resource. The UE may generate a second spatial domain transmission filter by using the spatial domain transmission filter applied on a first SRS resource as reference. The UE can assume a second spatial domain transmission filter might be different from the spatial domain transmission filter applied on a first SRS resource.

In yet another example, for all the other N−1 SRS resource other than a first SRS in the same set, the UE can be requested to apply spatial domain transmission filter on them as follows: the UE can transmit those N−1 SRS resources with N−1 different spatial domain transmission filters that are generated based on the spatial domain transmission filter applied on a first SRS resource; and the UE can transmit those N−1 SRS resources with N−1 different spatial domain transmission filters that are generated by using the spatial domain transmission filter applied on a first SRS resource as reference.

In one embodiment, a UE can be configured with one SRS set with N≥1 SRS resources. This set can be configured with a higher layer parameter SRS-SetUse that is set to "BeamManagement," which can indicate that this SRS set is used for beam management. Inside this SRS set, one or more SRS resources are configured with higher layer parameter SpatialRelationInfo and other SRS resources in that set are not configured with higher layer parameter SpatialRelationInfo. The UE can be requested to transmit the SRS resources in this set as follows.

In one example, for one SRS resource configured with SpatialRelationInfo, the UE can be requested to apply a spatial domain transmission filter on this SRS resource as follows: if the SpatialRelationInfo configured to a first SRS is set to SS/PBCH block or CSI-RS resource, the UE may transmit a first SRS resource with the same spatial domain transmission filter used for the reception of SS/PBCH block or CSI-RS resource configured in the parameter SpatialRelationInfo; and if the SpatialRelationInfo configured to a first SRS is set to a SRS resource, the UE may transmit a first SRS resource with the same spatial domain transmission filter used for the transmission of SRS resource configured in the parameter SpatialRelationInfo.

In another example, for one SRS resource not configured with a higher layer parameter SpatialRelationInfo, the UE can be requested to apply a spatial domain transmission filter that the UE can generate based on the spatial domain transmission filter on one SRS resource that is configured with a higher layer parameter SpatialRelationInfo in the same SRS resource set. In one example, the UE can be requested to apply a spatial domain transmission filters that the UE can generate based on the spatial domain transmission filters on one or more or all among those SRS resources that are configured with higher layer parameter SpatialRelationInfo in the same SRS resource set.

In yet another example, for those SRS resources not configured with higher layer parameter SpatialRelationInfo, the UE can be requested to generate spatial domain transmission filters for them based on the spatial domain transmission filter on one or more or all among those SRS resources that are configured with higher layer parameter SpatialRelationInfo in the same SRS resource set. For those SRS resources not configured with higher layer parameter SpatialRelationInfo, the UE can be requested to apply different spatial domain transmission filters on them.

In one embodiment, when a higher layer parameter SpatialRelationInfo is configured on a SRS set basis, the UE can be requested to generate spatial domain transmission filters for those SRS resources in that SRS set based on the SpatialRelationInfo configured for that SRS set and the UE can be requested to apply different spatial domain transmission filters on those SRS resources in that SRS resource set. By doing that, the Tx beam refinement operation can be supported.

In one embodiment, one UE can be configured with a SRS resource set configured with higher layer parameter SRS-SetUse set to "BeamManagement." When higher layer parameter SpatialRelationInfo is configured one a SRS set basis for this set, the UE can be requested to transmit the SRS resource in that set as follows. In one example, if the SRS set configured with higher layer parameter SpatialRelationInfo set to SS/PBCH block or CSI-RS resource, the UE can be requested to generate multiple different spatial domain transmission filters based on the spatial domain transmission filter used for the reception of the SS/PBCH block or CSI-RS resource configured through SpatialRelationInfo and then the UE may transmit the SRS resources in that set with those generated spatial domain transmission filters.

In another example, if the SRS set configured with higher layer parameter SpatialRelationInfo set to a SRS resource, the UE can be requested to generate multiple different spatial domain transmission filters based on the spatial domain transmission filter used for the transmission of the SRS resource configured through SpatialRelationInfo and then the UE may transmit the SRS resources in that set with those generated spatial domain transmission filters.

In one embodiment, one UE can be configured with a SRS resource set configured with higher layer parameter SRS-SetUse set to "BeamManagement." When higher layer parameter SRS-AssocCSIRS is configured one a SRS set basis for this set, the UE can assume this SRS set may be used for Tx beam sweeping operation and the Tx beamformers on those SRS resources may be generated based on SRS-AssocCSIRS.

In one example, when one UE is configured with a SRS set and this SRS set is configured with a higher layer parameter SRS-SetUse set to "BeamManagement" and a higher layer parameter SRS-AssocCSIRS, the UE can assume to apply different spatial domain transmission filters on different SRS resources in that set and the UE may generate spatial domain transmission filters by using SRS-AssocCSIRS as reference. When one UE is configured with a SRS set and this SRS set is configured with a higher layer parameter SRS-SetUse set to "BeamManagement" and a higher layer parameter SRS-AssocCSIRS, the UE can be requested to transmit the SRS resource in that set as follows.

In one example, the UE may assume to apply different spatial domain transmission filters on different SRS resources in that set.

In another example, the UE may generate those different spatial domain transmission filters by using the spatial domain filter used for the reception of CSI-RS resource configured in SRS-AssocCSIRS as reference.

In another example, the UE may generate those different spatial domain transmission filters, where the spatial domain filter used for the reception of CSI-RS resource configured in SRS-AssocCSIRS is used as reference.

In one embodiment, a SRS resource set can be configured with a higher layer parameter to indicate the information of how the UE may formulate the Tx beamformer (i.e., spatial domain transmission filters) for the SRS resource in that set. The configured higher layer parameter can indicate the UE to use the spatial domain transmission filter on the SRS resources as configured by parameter SpatialRelationInfo. The configured higher layer parameter can also indicate the UE to generate gNB-transparent spatial domain transmission filter (i.e., Tx beamformer) for the SRS resource. When the UE is indicated to generate gNB-transparent spatial domain transmission filter and parameter SpatialRelationInfo is also configured, the UE may generate the spatial domain transmission filter with a reference to the spatial domain filter indicated by the parameter SpatialRelationInfo.

In one embodiment, a higher layer parameter SRS-SertUse for a SRS resource set is set to a value to indicate that the UE may generate gNB-transparent Tx beamformer. The UE may transmit the SRS resources in that set with the spatial domain transmission filter that is generated by UE itself. If a parameter SpatialRelationInfo is configured for the SRS resource set, the UE may generate the spatial domain transmission filters with a reference to the spatial domain filter indicated by the parameter SpatialRelationInfo.

In one embodiment, a higher layer parameter Y for SRS resource set can be configured to indicate whether the UE may apply same or different Tx beamformer (i.e., spatial domain transmission filter) on the SRS resources in one set. A parameter SpatialRelationInfo can also be configured for the SRS resource set.

When higher layer parameter Y indicates that the UE may apply same Tx beamformer on the SRS resources, the UE may transmit any SRS resource in that set with the same spatial domain transmission filter used (1) for the reception of CSI-RS resource or SS/PBCH block indicated in SpatialRelationInfo or (2) for the transmission of SRS resource indicated in SpatialRelationInfo.

When higher layer parameter Y indicates that the UE may apply different Tx beamformer on those SRS resources, the UE may generate multiple different spatial domain transmission filters with a reference to the spatial domain filter used for (1) the reception of CSI-RS resource or SS/PBCH block indicated in SpatialRelationInfo or (2) for the transmission of SRS resource indicated in SpatialRelationInfo. The UE then may transmit the SRS resources with those generated spatial domain transmission filters.

In Procedure U-3, the UE may generate multiple different Tx beamforming directions and then apply them to SRS resources. Those Tx beamforming directions can be generated with reference to a coarse beamforming direction. U-3 can be supported with the above schemes. Another scheme to support U-3 function in NR is that a SRS resource set for beam management can be configured with a parameter to indicate the scheme of how the UE may generate the Tx beamformers for those SRS resources in that set. A higher layer parameter SRS-SetUse can be re-used here. The SRS-SetUse being set to "U3-beamManagemen" and SpatialRelationInfo are configured for a SRS resource set with L SRS resources. With this setup, the UE can assume to apply L different spatial domain transmission filters on those L SRS resources and those L different spatial domain transmission filters may be formulated with a reference to the Tx beamforming direction indicated by SpatialRelationInfo configured to that set.

When one SRS resource set is configured with SRS-SetUse="U3-BeamManagement," a SpatialRelationInfo is configured for the whole set. The UE may transmit the SRS resources in that set with different spatial domain transmission filters which are formulated with a reference to the parameter SpatialRelationInfo configured to that SRS resource set. In one scheme, when one SRS resource set is configured with higher layer parameter SRS-SetUse="U3-BeamManagement," a higher layer parameter SpatialRelationInfo is configured to the SRS resource set, the UE may transmit the SRS resources in that set as follows.

In one example, when the parameter SpatialRelationInfo configures a SS/PBCH block or CSI-RS resource, the UE may formulate multiple different spatial domain transmission filters with a reference to the spatial domain filter used for reception of the SS/PBCH block or CSI-RS resource configured in SpatialRelationInfo.

In one example, when the parameter SpatialRelationInfo configures a SRS resource, the UE may formulate multiple different spatial domain transmission filters with a reference to the spatial domain transmission filter used for transmission of the SRS resource configured in SpatialRelationInfo.

In a SRS set for UL beam management, If none of the SRS resources are configured with SRS-SpatialRelationInfo, the UE may transmit those SRS resources with different Tx beams; If some of the SRS resources are not configured with SRS-SpatialRelationInfo, the UE may transmit those SRS resources without SRS-SpatialRelationInfo through different Tx beams that are generated with a reference to the SRS-SpatialRelationInfo configured to some SRS resource(s) in the same set.

UE may apply same Tx beam on different OFDM symbols in one SRS resource.

UE may expect same bandwidth size configured for all SRS-resources in one SRS set for UL beam management.

A higher layer parameter is configured for a SRS set for UL beam management to indicate the U3 function and a set-level SRS-SpatialRelationInfo is configured to this set to indicate the reference beam direction for local sweeping.

In one embodiment, a UE can be requested to not select any RS in beam failure detection RS as a new candidate beam. In one example, a UE can be configured with a set of RS resources (CSI-RS resources, SS/PBCH blocks) as beam failure RS and a set of RS resources (CSI-RS resources, SS/PBCH blocks) as new beam identification RS. After beam failure is declared, the UE can be requested not select any RS resource in the set of new beam RS resource which is also in the set of beam failure RS resources as a new candidate beam.

In one embodiment, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines $\bar{q}_0$ to include SS/PBCH blocks and periodic CSI-RS configurations with same values for higher layer parameter TCI-StatesPDCCH as for control resource sets that the UE is configured for monitoring PDCCH.

The UE may provide to higher layers information identifying a periodic CSI-RS configuration index or SS/PBCH block index $q_{new}$ from the set $\bar{q}_1$, which is not in set the set $\bar{q}_0$. The CSI-RS resource or SS/PBCH block identified by the $q_{new}$ provided by UE to higher layers may not in the set $\bar{q}_0$. The CSI-RS resource or SS/PBCH block identified by the $q_{new}$ provided by UE to higher layers may not be part of the set $\bar{q}_0$. The UE may not provide to higher layers information identifying a periodic CSI-RS configuration index or SS/PBCH block index $q_{new}$ from the set $\bar{q}_1$, which is also in the set $\bar{q}_0$. The UE may not be requested to transmit beam failure recovery request preamble on a uplink channel resource that is associated with a CSI-RS resource or SS/PBCH block contained in $\bar{q}_0$.

In some embodiment, the UE may start the beam failure recovery timer when beam failure is declared. The UE may stop the beam failure recovery timer when one gNB response is received. After sending one beam failure recovery request, the UE may monitor control resource configured by beam-failure-recovery-response-CORESET, i.e. the dedicated CORESET configured for gNB response to beam failure recovery request. When the UE detects DCI in beam-failure-recovery-response-CORESET, the UE may stop the beam failure recovery timer.

In one embodiment, the UE may not expect to be configured with sets $q_0$ and A that have overlap on one or more than on CSI-RS resources and/or SS/PBCH blocks. The UE may not be configured with sets $\bar{q}_0$ and $\bar{q}_1$ that have overlap on one or more than on CSI-RS resources and/or SS/PBCH blocks. In one scheme, the UE can be configured with $\bar{q}_0$ for beam failure detection RS and $\bar{q}_1$ for new beam identification RS and the sets $\bar{q}_0$ and $\bar{q}_1$ may not have overlap one or more than on CSI-RS resources and/or SS/PBCH blocks.

In one embodiment, a SRS resource set can be configured with a slot offset per set. When the UE is configured/indicated to transmit the SRS resources in one SRS resource set, the UE may determine the slot location of triggered SRS resources based on the configured slot offset per set, the number of SRS resources and the index of those SRS resources in that set.

In one embodiment, a UE can be configured with a SRS set with one or multiple SRS resources. This SRS resource set can be configured with a per-set slot offset k>=0. When one signaling is sent at slot n to trigger the transmission of SRS resources in this set, the UE may transmit those SRS resources according to the number of SRS resources as follows: if the number of SRS resources to be transmitted is <=a first threshold $L_0$, the UE may transmit all those SRS resources at slot n+k; and if the number of SRS resources to be transmitted is >a first threshold $L_0$, the UE may transmit some of those SRS resources at slot n+k and transmit others of those SRS resources at slot(s) after slot n+k.

In one embodiment, a UE can be configured with a SRS set with N>=1 SRS resources. This SRS resource set can be configured with a per-set slot offset k>=0. When one signaling is sent at slot n to trigger the transmission of SRS resources in this set, the UE may transmit those SRS resources as follows. In one example, if the number of SRS resources to be transmitted is <=$L_0$ (for example $L_0$=3), the UE may transmit all the triggered SRS resources at slot n+k. In one example, if the number of SRS resources to be transmitted is >$L_0$ (for example $L_0$=3):the UE may transmit the first $L_0$ SRS resources in the set at slot n+k and the UE may transmit the rest of the SRS resources in the set at slot n+k+1; and/or the UE may transmit the first $L_0$ SRS resource in the set at slot n+k and the UE may transmit the reset of the SRS resources in the set at the first UL slot at or after slot n+k+1.

In one example, a UE can be configured to transmit SRS resources as follows. In one example, a UE can be configured with a SRS resource set with 6 SRS resources and this SRS resource set can be configured with a per-set slot offset k>=0. When one signaling is sent at slot n to trigger the transmission of SRS resources in this set, the UE may transmit those SRS resources as follows: the UE may transmit the first $N_0$=3 SRS resource in the set at slot n+k and the UE may transmit the second 3 SRS resources in the set at slot n+k+1; and the UE may transmit the first $N_0$=3 SRS resource in the set at slot n+k and the UE may transmit the second 3 SRS resources in the set at the first UL slot at or after slot n+k+1.

In one example, a UE can be configured with a SRS resource set with 3 SRS resources and this SRS resource set can be configured with a per-set slot offset k>=0. When one signaling is sent at slot n to trigger the transmission of SRS resources in this set, the UE may transmit those 3 SRS resources at slot n+k.

In one embodiment, a UE can be configured to not expect to be configured with a SRS resource set in which some of the SRS resources are configured with Tx beam information and other SRS resources are not configured with Tx beam information. In other words, a UE may expect that in one configured SRS resource set, either all the SRS resources in that set are configured with Tx beam information or none of the SRS resources in that set are configured with Tx beam information.

In one example, a UE can be configured with a SRS resource set configured with higher layer parameter SRS-SetUse="BeamManagement." The UE does not expect that some of the SRS resources contained in SRS resource set configured with higher layer parameter SRS-SetUse="BeamManagement" are configured with higher layer parameter SRS_SpatialRelationInfo and other SRS resources contained in the same set are not configured with higher layer parameter SRS_SpatialRelationInfo. The UE may expect that all the SRS resources contained in in SRS resource set configured with higher layer parameter SRS-SetUse="BeamManagement" are configured with higher layer parameter SRS_SpatialRelationInfo or none of the SRS resources contained in in SRS resource set configured with higher layer parameter SRS-SetUse="BeamManagement" are configured with higher layer parameter SRS_SpatialRelationInfo.

For one SRS resource set configured with higher layer parameter SRS-SetUse="BeamManagement:" if none of the SRS resources are configured with higher layer parameter SRS-SpatialRelationInfo, the UE may transmit those SRS resources with different spatial domain transmission filters; and if a subset of the SRS resources are configured with higher layer parameters SRS-SpatialRelationInfo and the others are not, the UE may transmit the SRS resources without being configured with higher layer parameter SRS-SpatialRelationInfo with spatial domain transmission filters other than the spatial domain transmission filters applied to those SRS resources configured with higher layer parameter SRS-SpatialRelationInfo.

The UE can be configured with a higher layer parameter SRS-beamsweeping and a set-level parameter SRSSet-SpatialRelationInfo for one SRS resource set configured with higher layer parameter SRS-SetUse is set to "BeamManagement." When higher layer parameter SRS-beamsweeping set to "TxBeamSweep," the UE may transmit different SRS resources with different spatial domain transmission filters and those spatial domain transmission filters may be generated using the SRSSet-SpatialRelationInfo as a reference. When higher layer parameter SRS-beamsweeping set to "FixedBeam," the UE may transmit different SRS resources with one same spatial domain transmission filters and the spatial domain transmission filter may be same to the spatial domain filter as indicated by SRSSet-SpatialRelationInfo.

The Tx beam for one SRS resource can be determined by either of two ways: configured by the serving gNB or determined by UE itself. The gNB can configure the Tx beam for one SRS resource through configuring a parameter SpatialRelationInfo to that SRS resource and the parameter spatialRelationInfo contains one ID of CSI-RS resource, SS/PBCH block or a SRS resource. The UE can requested to use the same Tx beam (or called spatial domain transmission filter) as the beam used to transmit or receiver the reference signal identified by the RS ID contained in the parameter spatialRelationInfo.

In one embodiment, when beam failure of PDCCH happens, the UE can assume some "default" beam on SRS resource after the UE receives the gNB's response to the UE's beam failure recovery request. This design is to ensure the transmission of SRS and related PUSCH transmission can still use good beam link when it may be found that the beams used for PDCCH have failed.

In one embodiment, after the UE successfully detects the gNB's response to UE's beam failure recovery request, for a first SRS resource that is configured with parameter spatialRelationInfo, the UE can be requested to assume the spatialRelationInfo (i.e., the Tx beam information) of that a first SRS resource is overridden by Tx beam that is used to transmit the uplink RACH for the beam failure recovery request transmission. The UE can be requested to assume that until the UE is re-configured or re-indicated with a spatialRelationInfo for that a first SRS resource.

In one embodiment, after the UE successfully detects the gNB's response to UE's beam failure recovery request, for a first SRS resource that is configured for PUSCH transmission (i.e., a first SRS resource that is configured in SRS set for codebook-based transmission or non-codebook based transmission, in other words, a first SRS resource that is in SRS resource set configured with higher layer parameter usage set to "codebook" or "nonCodebook"), the UE can be requested to assume the spatialRelationInfo (i.e., the Tx beam information) of that a first SRS resource is overridden by Tx beam that is used to transmit the uplink RACH for the beam failure recovery request transmission. The UE can be requested to assume that until the UE is re-configured or re-indicated with a spatialRelationInfo for that a first SRS resource.

In one embodiment, after the UE successfully detects the gNB's response to UE's beam failure recovery request, for a first SRS resource that is configured for PUSCH transmission (i.e., a first SRS resource that is configured in SRS set for codebook-based transmission or non-codebook based transmission, in other words, a first SRS resource that is in SRS resource set configured with higher layer parameter usage set to "codebook" or "nonCodebook") and is configured with parameter spatialRelationInfo, the UE can be requested to assume the spatialRelationInfo (i.e., the Tx beam information) of that a first SRS resource is overridden by Tx beam that is used to transmit the uplink RACH for the beam failure recovery request transmission. The UE can be requested to assume that until the UE is re-configured or re-indicated with a spatialRelationInfo for that a first SRS resource.

In one embodiment, after the UE successfully detects the gNB's response to UE's beam failure recovery request, for a first SRS resource that is configured for DL CSI acquisition (i.e., a first SRS resource that is in SRS resource set configured with higher layer parameter usage set to "antennaSwitching") and is configured with parameter spatialRelationInfo, the UE can be requested to assume the spatialRelationInfo (i.e., the Tx beam information) of that a first SRS resource is overridden by Tx beam that is used to transmit the uplink RACH for the beam failure recovery request transmission. The UE can be requested to assume that until the UE is re-configured or re-indicated with a spatialRelationInfo for that a first SRS resource.

It may be required to determine the timing for the UE to apply overriding Tx beam (i.e., a default spatialRelationInfo to override the configured spatialRelationInfo) on those SRS resources, i.e., when the UE may begin to assume that overridden spatialRelationInfo.

In one embodiment, the UE can be requested to assume that overridden spatialRelationInfo on SRS resources starting from K symbols after the last symbol where DCI format with CRC scrambled by C-RNTI or MCS-C-RNTI detected in search space configured for beam failure recovery (i.e., the search space provided by higher layer parameter recoverySearchSpaceId), where K can be pre-configured/pre-defined or by UE capability reporting.

In one embodiment, the UE can be requested to assume that overridden spatialRelationInfo on SRS resources starting from the first symbol of a PUSCH transmission scheduled by the first successfully detected DCI format 0_1 that is detected in search space provided by higher layer parameter recoverySearchSpaceId.

In one scheme, the UE can be requested to assume that overridden spatialRelationInfo on SRS resources starting from the first symbol of a PUSCH transmission scheduled by the first successfully detected DCI format 0_1 that is detected in any search space configured to the UE and that DCI format 0_1 is not earlier than the detected gNB's response to the beam failure recovery request, i.e., a DCI format with CRC scrambled with C-RNTI or MCS-C-RNTI detected in PDCCH in search space provided by higher layer parameter recoverySearchSpaceId in slot n+4 or later after the UE sends beam failure recovery request in contention-free based RACH transmission in slot n.

In one embodiment, after the UE receive gNB's response to RACH-based beam failure recovery request successfully, the UE can be requested to assume that overridden spatialRelationInfo on a first SRS resources starting from the one or the combination of one or more of the following time (if a first SRS resource meet the condition described above for overridden spatialRelationInfo).

In one example, the first symbol of the first PUSCH transmission scheduled by a successfully detected DCI format 0_1 that is received no earlier than when the DCI format that is treated as gNB's response to RACH-based beam failure recovery request is received.

In another example, if a first SRS resource is aperiodic, the first symbol of triggered SRS transmission for a first SRS resource, which is triggered by a DCI format that is received no earlier than when the DCI format that is treated as gNB's response to RACH-based beam failure recovery request is received.

In yet another example, if a first SRS resource is periodic, the first symbol of SRS transmission for a first SRS resource and not earlier than K1 symbols after when the DCI format that is treated as gNB's response to RACH-based beam failure recovery request is received.

In yet another example, if a first SRS resource is a semi-persistent SRS resources, the first symbol of SRS transmission for a first SRS resource and not earlier than K1 symbols after when the DCI format that is treated as gNB's response to RACH-based beam failure recovery request is received.

In yet another example, it can be combination of the following timing options. In one example, the timing can be the minimum value of some of the above. In one example, the timing can be the maximal value of some of the above.

In one embodiment, one UE can be configured with one SRS resource and the UE can be configured with one downlink RS resource or uplink RS resource as the Tx beam indication RS for transmission of the one SRS resource. When the UE transmit the SRS resource, the UE can be requested to determine the Tx beam based on the latest transmission instance of the configured Tx beam indication RS before some time moment. The technical reason for the embodiment is the UE need some time to measure the Tx beam indication RS to obtain the Tx beamformer and then apply to the transmission of the SRS resource.

In one embodiment, a UE can be configured with a SRS resource a and the SRS resource can be configured with a higher layer parameter SRS-SpatialRelationInfo that provide the spatial Relation source for this SRS resource. The SRS-SpatialRelationInfo can be set to a CSI-RS resource, a SS/PBCH block or a SRS resource. When the UE transmit the a SRS resource a at slot n, the UE may transmit this SRS resource with the same Tx beam as the Rx beam used to receive the most recent transmission of CSI-RS resource or SS/PBCH block configured in SRS-SpatialRelationInfo prior to the slot n+$k_1$ if the higher layer parameter SRS-SpatialRelationInfo for this SRS resource a is set to CSI-RS or SS/PBCH block. Examples of the value of $k_1$ can be 0, 1, 2, 3, 4, . . . .

When the UE transmit the a SRS resource a at slot n, the UE may transmit this SRS resource a with the same Tx beam as the Tx beam used to transmit the most recent transmission of SRS resource configured in SRS-SpatialRelationInfo prior to the slot n+$k_2$ if the higher layer parameter SRS-SpatialRelationInfo for this SRS resource a is set to SRS. Examples of the value of $k_2$ can be −1, 0, 1, 2, 3, 4, . . . . Here if $k_2$=−1 is chosen, the UE can transmit this SRS resource a at slot n with the same Tx beam as the Tx beam used to transmit the most recent transmission of SRS resource configured as spatial relation source no later than slot n, i.e., the most recent transmission of SRS resource configured as spatial relation source priori to slot n+1.

In one example, the value of $k_1$ and $k_2$ can be different. The technical reason is the UE would need different time duration length to calculate the Tx beam from DL RS transmission (CSI-RS or SS/PBCH) and from another SRS transmission. Generally the UE would need less time to calculate Tx beam from another SRS than from a DL RS. Therefore, in one example $k_2$<$k_1$ can be chosen. For example, $k_2$=0 and $k_1$=4 are chosen In one embodiment, one UE can be configured with one PUCCH resource and the UE can be configured with one downlink RS resource or uplink RS resource as the Tx beam indication RS for transmission of the one PUCCH resource. When the UE transmit one the one PUCCH resource, the UE can be requested to determine the Tx beam based on the latest transmission instance of the configured Tx beam indication RS before some time moment. The technical reason for the embodiment is the UE need some time to measure the Tx beam indication RS to obtain the Tx beamformer and then apply to the transmission on the PUCCH resource and the UE may also keep use the latest Tx beam on the PUCCH.

In one embodiment, a UE can be configured with a PUCCH resource #b and the PUCCH resource can be configured with a higher layer parameter PUCCH-Spatial-RelationInfo that provide the spatial Relation source for the transmission on this PUCCH resource #b. The spatial relation source RS indicated by PUCCH-SpatialRelationInfo can be a CSI-RS resource, a SS/PBCH block or a SRS resource. When the UE transmit on the PUCCH resource #b at slot n, the UE may use the same Tx beam as the Rx beam used to receive the most recent transmission of CSI-RS resource or SS/PBCH block configured as spatial relation source prior to the slot n+1. The example of the value of $l_1$ can be 0, 1, 2, 3, 4, . . . .

When the UE transmit on the PUCCH resource #b at slot n, the UE may use the same Tx beam as the Tx beam used to transmit the most recent transmission of SRS resource configured as spatial relation source prior to the slot n+$l_2$. The examples of the value of $l_2$ can be −1, 0, 1, 2, 3, 4, . . . . Here if $l_2$=−1 is chosen, the UE can transmit on PUCH resource #b at slot n with the same Tx beam as the Tx beam used to transmit the most recent transmission of SRS resource configured as spatial relation source no later than slot n.

In one example, the value of $l_1$ and $l_2$ for PUCCH can be different. The technical reason is the UE would need different time duration length to calculate the Tx beam from DL RS transmission (CSI-RS or SS/PBCH) and from one SRS transmission. Generally the UE would need less time to calculate Tx beam from SRS than from a DL RS. Therefore, in one example, $l_2$<$l_1$ is chosen. For example, $l_2$=0 and $l_1$=4 are chosen.

In some embodiment, the UE can be requested to operate a beam link failure recovery procedure (or can be called as link reconfiguration). The UE can be configured to monitor one or more beam failure RS (reference signal) resources. If some condition is met, the UE can declare beam failure. The UE can also be configured to select one or more candidate beams from a set of configured RS resources. Then the UE can send request message to the gNB to notify the gNB that the beam failure event happens and then monitor the response from the gNB.

In one embodiment, the UE can be configured with timer $T_0$. When the timer $T_0$ expires, the UE can be requested to refrain sending beam failure request to the gNB. The timer can be configured as follows: the UE can be requested to start the timer $T_0$ when the beam failure event is detected; the UE can be requested to stop the timer $T_0$ when one or more new candidate beams are found; and the UE can be requested to stop the timer $T_0$ when the first beam failure recovery request (or called link reconfiguration request) is sent.

In one embodiment, the UE can be configured with a set beam failure RS set $q_0$, in which one or multiple CSI-RS resources and/or SS/PBCH blocks are configured. When the BLER estimated from all the RS contained in RS set $q_0$ is above the beam failure detection threshold, the UE can claim the BLER as a beam failure instance or can be called beam link failure instance. The UE can be requested to measure and report the beam failure instance to higher layer periodically with periodicity $\tau_{BF}$.

The value of periodicity $\tau_{BF}$ can be determined as follows: periodicity $\tau_{BF}$ can be the largest value of the periodicities of all beam failure RS configured in RS set $q_0$; periodicity $\tau_{BF}$ can be the average value of the periodicities of all beam failure RS configured in RS set $q_0$; periodicity $\tau_{BF}$ can be upper bounded by a fixed value, e.g., 5 ms. In one example, the periodicity $\tau_{BF}$ may be upper bounded by 1 ms. In one example, the periodicity $\tau_{BF}$ may be upper bounded by 2 ms. In one example, the periodicity $\tau_{BF}$ may be upper bounded by 5 ms. In one example, the periodicity $\tau_{BF}$ may be upper bounded by 10 ms. In one example, the periodicity $\tau_{BF}$ may be upper bounded by 4 ms. In one example, the periodicity $\tau_{BF}$ may be upper bounded by 20 ms. In one example, the periodicity $\tau_{BF}$ may be upper bounded by 8 ms.

The UE can be requested to report the beam failure instance periodically in slots n0+n*$\tau_{BF}$, where n0 is the starting slot offset for the UE the report periodic beam failure instance and $\tau_{BF}$ is the reporting periodicity in terms of slots and n=0, 1, 2, 3 . . . .

In one scheme, The physical layer in the UE may provide an indication to higher layers periodically with periodicity $\tau_{BF}$ when the radio link quality for all corresponding resource configurations in the set $\bar{q}_0$ that the UE uses to assess the radio link quality is worse than the threshold $Q_{out,LR}$. The UE may determine the $\tau_{BF}$ to be the largest value of periodicities of all resource configurations in the set $\bar{q}_0$ and also no larger than upper bound $\tau_{Bound}$. The value of $\tau_{Bound}$ can be 1/2/4/5/8/10/20/50 ms.

In one embodiment, a UE can be requested to determine the periodicity for reporting beam failure instance to higher layer based on one or more than one of the following parameters: the largest periodicity of CSI-RS resources or SS/PBCH block in set $q_0$, which the set of beam failure RS; the smallest periodicity of CSI-RS resources or SS/PBCH block in set $q_0$, which the set of beam failure RS; the threshold for the number of consecutive beam failure instances that is used to declare beam failure. In spec, this threshold is configured by high layer parameter BeamFailureInstanceMaxCount; a maximal number of consecutive transmission of CSI-RS resource and/or a SS/PBCH block that happen during those consecutive beam failure instance. This value can be predefined, specified or configured; and a upper bound of the reporting periodicity.

In one embodiment, a UE can be a set $q_0$ with one or more CSI-RS resources or/and SS/PBCH blocks and the largest periodicity of those reference signal resource in set $q_0$ is $T_1$. The UE can be configured with the threshold for the number of consecutive beam failure instance to declare beam failure, i.e., BeamFailureInstanceMaxCount, to be value $N_0$. Then the UE can be requested to calculate the periodicity of reporting beam failure instance, $T_{report}$, as given by:

$$T_{report} = \frac{M \times T_1}{N_0}$$

where M can a predefined or pre-specified value, the value of M can be 1, 2, 3, 4, 5, 6, 7, 8, 9 10, . . . .

Technically, the aforementioned embodiment can ensure that when beam failure is declared, all the RS (CSI-RS, SS/PBCH block) in beam failure RS set $q_0$ have at least M failed transmission instances. That can achieve a good tradeoff between the timing of declaring beam failure and the reliability of declaring beam failure. Ideally, the beam failure may be detected quickly but on the other hand, false alarm may be avoided as much as possible. Other alternative to calculate $T_{report}$ can be:

$$T_{report} = \left\lceil \frac{M \times T_1}{N_0} \right\rceil; \text{ and/or } T_{report} = \left\lfloor \frac{M \times T_1}{N_0} \right\rfloor.$$

In one example, the periodicity of RS is measured by milliseconds and the determined periodicity of reporting beam failure instance can be determined as one of the followings:

$$T_{report} = \frac{M \times T_1}{N_0}; T_{report} = \left\lceil \frac{M \times T_1}{N_0} \right\rceil; \text{ and/or } T_{report} = \left\lfloor \frac{M \times T_1}{N_0} \right\rfloor.$$

In one example, the periodicity of RS is measured by slots, i.e., the largest periodicity of RS in set $q_0$ is $T_1$ slots. The determined periodicity of reporting beam failure instance can be determined as one of the followings:

$$T_{report} = \frac{M \times T_1 \times L}{N_0}; T_{report} = \left\lceil \frac{M \times T_1 \times L}{N_0} \right\rceil; \text{ and/or } T_{report} = \left\lfloor \frac{M \times T_1 \times L}{N_0} \right\rfloor$$

where L is the slot length configured to that UE.

In one example, the periodicity of RS is measured by number of slots and the determined periodicity of reporting beam failure instance can be determined as one of the followings:

$$T_{report} = \frac{M \times T_1}{N_0}; T_{report} = \left\lceil \frac{M \times T_1}{N_0} \right\rceil; \text{ and/or } T_{report} = \left\lfloor \frac{M \times T_1}{N_0} \right\rfloor.$$

In one embodiment, a UE can be requested to calculate the periodicity of reporting beam failure instance, $T_{report}$, as $$T_{report} = \frac{M \times T_1}{N_0}$$

where a UE can be a set $q_0$ with one or more CSI-RS resources or/and SS/PBCH blocks and the largest periodicity of those reference signal resource in set $q_0$ is $T_1$. The UE can be configured with the threshold for the number of consecutive beam failure instance to declare beam failure, i.e., BeamFailureInstanceMaxCount, to be value $N_0$. The value of M can be a function of No that is configured by higher layer.

The UE can be requested to choose the value of M according to the value of configured $N_0$. The mapping rule used to choose value of M according to the value of configured $N_0$ can be predefined or specified in spec. In one example, when $N_0=1$, the UE can be requested to choose M=1 and when $N_0>=2$, the UE can be requested to choose M=one value larger than 1, for example, 2, 3, 4, 5, . . . (that can be specified in specification). In another example, the mapping between the value of M and the value of $N_0$ can be. The UE can be requested to choose the value of M based on the configured $N_0$ and TABLE 4.

TABLE 4

| The Value of $N_0$ and M | |
|---|---|
| The value of $N_0$ | The value of M |
| 1 | 1 |
| 2 | 2 |
| 3 | 2 |
| 4 | 4 |
| 5 | 4 |

TABLE 4-continued

The Value of $N_0$ and M

| The value of $N_0$ | The value of M |
|---|---|
| 6 | 8 |
| 8 | 8 |
| 10 | 16 |

In one embodiment, a UE can be requested to not select any RS in beam failure detection RS as a new candidate beam. In one example, a UE can be configured with a set of RS resources (CSI-RS resources, SS/PBCH blocks) as beam failure RS and a set of RS resources (CSI-RS resources, SS/PBCH blocks) as new beam identification RS. After a beam failure is declared, the UE can be requested not select any RS resource in the set of new beam RS resource which is also in the set of beam failure RS resources as a new candidate beam.

In one embodiment, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines $\bar{q}_0$ to include SS/PBCH blocks and periodic CSI-RS configurations with same values for higher layer parameter TCI-StatesPDCCH as for control resource sets that the UE is configured for monitoring PDCCH.

The UE may provide to higher layers information identifying a periodic CSI-RS configuration index or SS/PBCH block index $q_{new}$ from the set $\bar{q}_1$, which is not in set the set $\bar{q}_0$ The CSI-RS resource or SS/PBCH block identified by the $q_{new}$ provided by UE to higher layers may not in the set $\bar{q}_0$. The CSI-RS resource or SS/PBCH block identified by the $q_{new}$ provided by UE to higher layers may not be part of the set $\bar{q}_0$. The UE may not provide to higher layers information identifying a periodic CSI-RS configuration index or SS/PBCH block index $q_{new}$ from the set $\bar{q}_1$, which is also in the set $\bar{q}_0$. The UE may not be requested to transmit beam failure recovery request preamble on a uplink channel resource that is associated with a CSI-RS resource or SS/PBCH block contained in $\bar{q}_0$.

In one embodiment, the UE may not expect to be configured with sets $\bar{q}_0$ and $\bar{q}_1$ that have overlap on one or more than on CSI-RS resources and/or SS/PBCH blocks. The UE may not be configured with sets $\bar{q}_0$ and $\bar{q}_1$ that have overlap on one or more than on CSI-RS resources and/or SS/PBCH blocks. In one scheme, the UE can be configured with $\bar{q}_0$ for beam failure detection RS and $\bar{q}_1$ for new beam identification RS and the sets $\bar{q}_0$ and $\bar{q}_1$ may not have overlap one or more than on CSI-RS resources and/or SS/PBCH blocks.

In one embodiment, the UE can be configured with one or multiple CSI-RS resources and/or one or multiple SS/PBCH blocks as beam failure RS. The UE can be configured to monitor those beam failure RS and measure the hypothetical BLERs of those beam failure RSs to detect the beam failure event. The hypothetical BLER is supposed to be the estimated BLER and estimated link quality on downlink control channel PDCCH. The beam failure RS and PDCCH can have different transmit power level. Therefore, the UE may take into account the power offset between beam failure RS and PDCCH when hypothetical BLER is calculated based on beam failure RS.

In one embodiment, each CSI-RS resource can be configured with one Pc_SS that is the ratio of SS/PBCH block Tx power to this CSI-RS resource. The PDCCH channel can be configured with one Pc_PDCCH that is the ratio of SS/PBCH block Tx power to the PDCCH channel. Then when calculating the hypothetical BLER based on one CSI-RS resource in beam failure RS set $\bar{q}_0$, the UE may scale a CSI-RS resource transmission power with a value provided by Pc_PDCCH configured to PDCCH and Pc_SS configured to this CSI-RS resource. In one example the UE may scale the transmission power of a CSI-RS with Pc_SS-Pc_PDCCH to measure the hypothetical BLER based on that CSI-RS resource. When calculating hypothetical BLER based on one SS/PBCH block in in beam failure RS set $\bar{q}_0$, the UE may scale a SS/PBCH transmission power with a value provided by Pc_PDCCH configured for PDCCH.

In one embodiment, all the CSI-RS resources can be configured with one same power offset Pc_SS that the ratio of SS/PBCH block Tx power to all the CSI-RS resources. And parameter pc_PDCCH is used to be configured the power offset between all the CSI-RS resources and all the PDCCH channels. Then when calculating the hypothetical BLER based on one CSI-RS resource in beam failure RS set $\bar{q}_0$, the UE may scale a CSI-RS resource transmission power with a value provided by Pc_PDCCH. When calculating hypothetical BLER based on one SS/PBCH block in in beam failure RS set $\bar{q}_0$ the UE may scale a SS/PBCH transmission power with a value provided by Pc_SS and Pc_PDCCH configured for PDCCH.

In one embodiment, the UE can be configured with one or multiple CSI-RS resources and/or one or multiple SS/PBCH blocks as new candidate beam RS. The UE can be requested to select the CSI-RS resources and/or SS/PBCH blocks from the set of new candidate beam RS based on the RSRP measurement. For those CSI-RS resources and/or SS/PBCH blocks with RSRP>some new beam threshold, it can be used as new beam for the UE to determine uplink transmission resource for sending beam failure recovery request (or radio reconfiguration request). The UE can be requested to take into account the power offset between CSI-RS resources and SS/PBCH blocks when measuring the RSRP and comparing the RSRP with the new beam threshold.

In one embodiment, a UE can be configured with a new candidate beam threshold ρ, for SS/PBCH block signal. For a SS/PBCH block configured in new candidate beam RS set, the UE can be requested to compare the RSRP of one SS/PBCH block with the configured threshold ρ. For a CSI-RS resource configured in new candidate beam RS set, each CSI-RS resource can be configured with the Tx beam ratio, Pc_SS, between SS/PBCH block and CSI-RS resource. The UE can be requested to compare the RSRP of one CSI-RS resource after scaling the RSRP with a value provided by Pc_SS with the configured threshold ρ.

In one embodiment, the UE can be configured to not use any 2-port CSI-RS resource as one beam failure RS. When one PDCCH channel is configured with one 2-port CSI-RS resource as the source for spatial QCL, the UE can be requested to not use that 2-port CSI-RS resource to detect the beam failure instance. In NR both 1-port and 2-port CSI-RS resources can be used for beam management and can be used as the spatial QCL source for downlink control channel. However, 2-port CSI-RS resource is not proper for BLER estimation.

In one embodiment, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If the UE is not provided with higher layer parameter Beam-Failure-Detection-RS-ResourceConfig, the UE determines $\bar{q}_0$ to include SS/PBCH blocks and periodic CSI-RS configurations with same values for higher layer parameter TCI-StatesPDCCH as for control resource sets that the UE is configured for monitoring PDCCH. 2-port CSI-RS resource may not be included in set $\bar{q}_0$. If one UE-specific PDCCH is configured with a TCI state associated with a 2-port CSI-RS resource as spatial QCL assumption source, the UE may not include this 2-port CSI-RS resource in set $\bar{q}_0$.

In some embodiments, a UE can be configured to monitor the old control resource sets (or called old CORESETS) with some defined rule during the beam failure recovery procedure. The UE is configured to monitor the link quality on one or multiple control resource sets, which can be called old control resource sets. If the beam links of all monitored control resource sets are detected, the UE can start the beam failure recovery procedure. To detect the gNB response to beam failure recovery request, the UE can be configured to monitor a dedicatedly configured control resource set.

In one embodiment, a UE can be requested to monitor old control sets after sending beam failure recovery request and before the gNB's response is received.

In one embodiment, a UE can be requested to stop monitoring old control sets after receiving the gNB response for the beam failure recovery request. The UE can be requested resume monitoring one old control set when a new TCI state is configured or indicated for that old control set.

After sending PRACH transmission for beam failure recovery request, the UE would begin to monitor search space for beam failure recovery to detect the gNB's response. If the UE receives gNB's response successfully in search space for beam failure recovery, the UE would continue to monitor PDCCH n search space for beam failure recovery until the UE receives a MAC CE activation for a TCI state or higher layer parameter TCIStatesPDCCH-ToAddlist and/or TCIStatesPDCCH-ToReleaseList, which are used to activate new TCI state or configure/re-configure TCI states for PDCCH.

Therefore, during the time period when the UE is requested to monitor PDCCH in search space for beam failure recovery, the UE can also monitor PDCCH in "normal" search spaces, which are the search spaces that are configured for the UE for normal communication. In that case, the monitoring PDCCH in multiple search space might be beyond the UE capability. If the number of PDCCH blind decoding is larger than the UE capability, the UE can choose to drop the decoding of some PDCCH in some search space. In one scheme, the UE can be requested to treat the PDCCH detection in search space for beam failure recovery (i.e., a search space provided by higher layer parameter recovery-SearchSpaceId) as the higher priority than all other search spaces and the UE may not drop the PDCCH detection in search space for beam failure recovery (i.e., a search space provided by higher layer parameter recoverySearchSpaceId).

It might happen that a UE is requested to monitor PDCCH in two search space in overlapped OFDM symbols. There are a few different alternatives to deal with this case.

In one alternative, when a UE may monitor PDCCH in search space for beam failure recovery (i.e., a search space provided by higher layer parameter recoverySearchSpaceId) and a first search space which have one or more overlapped OFDM symbols in one slot, the UE may assume the same antenna port quasi-colocation parameters with parameters with index $q_{new}$ for PDCCH monitoring in both search space for beam failure recovery (i.e., a search space provided by higher layer parameter recoverySearchSpaceId) and a first search space.

In another alternative, when a UE may monitor PDCCH in search space for beam failure recovery (i.e., a search space provided by higher layer parameter recoverySearchSpaceId) and a first search space which have one or more overlapped OFDM symbol(s) in one slot, the UE can skip the PDCCH detection in the a first search space if the spatial QCL parameter of search space for beam failure recovery is different from the spatial QCL parameter configured for the a first search space. In other words, the UE does not detect PDCCH in the a first search space if the RS for QCL type D configured for DM-RS reception in a first search space is not same to the RS $q_{new}$ that is the new beam identified by the UE during beam failure recovery.

In other words, the UE does not detect PDCCH in the a first search space if the RS for QCL type D configured for DM-RS reception in a first search space is not spatial QCLed with the RS $q_{new}$ that is the new beam identified by the UE during beam failure recovery. However the UE may detect PDCCH in the search space for beam failure recovery (the search space provided by higher layer parameter recovery-SearchSpaceId).

In some embodiments, a UE can be configured with the association between RACH resources for beam failure recovery request transmission and a candidate beam RSs. In one example, a UE can be configured with a set of RACH resource for beam failure recovery request transmission and a set of candidate beam RS, q1. The UE can measure the RS in set q1 and report one or more RS IDs from set q1 to higher layer and the higher layer can select one from q1 as candidate beam $q_{new}$ for beam failure recovery procedure. The higher layer can notify the UE to transmit beam failure recovery request on one RACH resource. The UE may derive $q_{new}$ from the configured association between UL resource for RACH and candidate beam RS and then the UE can assume to use as the spatial QCL source to receive the PDCCH in the control resource set dedicated configured for beam failure recovery request response.

In one embodiment, a UE is configured with one control resource set by higher layer parameter Beam-failure-Recovery-Response-CORESET. The UE may receive from higher layers, by parameter Beam-failure-recovery-request-RACH-Resource, a configuration for a PRACH transmission. After 4 slots from the slot of the PRACH transmission, the UE monitors PDCCH for a DCI format with CRC scrambled by C-RNTI, within a window configured by higher layer parameter Beam-failure-recovery-request-window, and receives PDSCH according to an antenna port quasi co-location associated with periodic CSI-RS configuration or SS/PBCH block with index $q_{new}$ in set $\bar{q}_1$, in the control resource set configured by higher layer parameter Beam-failure-Recovery-Response-CORESET.

The UE determines the index $q_{new}$ based on a mapping between the PRACH preamble index and the SS/PBCH block index provided by higher layer parameter SSB-PRACH-CFRA-association or based on a mapping between the PRACH preamble index and a periodic CSI-RS configuration index provided by higher layer parameter CSI-RS-PRACH-association.

The UE determines the index $q_{new}$ based on a mapping between the index of RACH resource configured for beam failure recovery request and the SS/PBCH block index provided by higher layer parameter or based on a mapping between the index of RACH resource configured for beam failure recovery request transmission and a periodic CSI-RS configuration index provided by higher layer parameter CSI-RS-PRACH-association.

The UE may derives $q_{new}$ in set $\bar{q}_1$ from a link between UL resource for PRACH for link reconfiguration request and CSI-RS configuration index or SS/PBCH block in set $\bar{q}_1$.

In some embodiments, the UE can be configured with one or more RS IDs as beam failure RSs and the UE can be requested to monitor those configured RS resources to detect the beam failure instance and beam failure. The UE can be configured with the mapping between configured beam failure RS resources and control channel PDCCH. The reason for configuring the mapping is to allow the UE to know which beam failure RS resources correspond to which PDCCH so that the UE can use proper reception scheme to measure that beam failure RS resource.

In one embodiment, a UE can be configured with a set of $\bar{q}_0$ of CSI-RS resources for beam failure detections. There can be one or more than one CSI-RS resources configured in set $\bar{q}_0$. For one CSI-RS resource j in set $\bar{q}_0$, the UE can be configured with the mapping between CSI-RS resource j to a control resource set #i. With this configuration, the UE can be requested to measure CSI-RS resource j to monitor the beam failure of Tx beam used to transmit PDCCH of control resource set #i. The UE can be requested to use the QCL assumption (including delay spread, Doppler spread, Doppler shift, average delay and spatial Rx parameters, if applicable) indicated by the TCI state configured to control resource set #i to measure the CSI-RS resource j.

In one embodiment, for a CSI-RS resource in set $\bar{q}_0$, the UE can be requested to measure this CSI-RS resource for beam failure detection based on the QCL assumption (including delay spread, Doppler spread, Doppler shift, average delay and spatial Rx parameters, if applicable) indicated by the TCI states configured to the control resource set mapped to (or associated with) this CSI-RS resource configured in set $\bar{q}_0$.

In one embodiment, if one control resource set does not have associated CSI-RS resource configured in the set of $\bar{q}_0$, the UE can be requested to find a periodic CSI-RS resource or SS/PBCH block based on the TCI state configured to this control resource set and then include the found periodic CSI-RS resource or SS/PBCH block in the set of $\bar{q}_0$. In one example, a UE can be configured with two control resource set #a and #b. And the UE can be configured with a set of $\bar{q}_0$ with one CSI-RS resource #m in set $\bar{q}_0$. The CSI-RS resource #m can be configured to be mapped/associated with control resource set #a. But there is no CSI-RS resource mapped/associated with control resource set #b. The UE can be configured to find one periodic CSI-RS resource or SS/PBCH according to the TCI state configured to control resource set #b and then include the found periodic CSI-RS resource or SS/PBCH block into the set of $\bar{q}_0$.

The UE can be requested to find one periodic CSI-RS resource or SS/PBCH block according to the DL RS ID for QCL type D (i.e., spatial QCL, spatial Rx parameters) configured in the TCI state configured to the control resource set #b. If the DL RS ID for QCL type D in the TCI state for control resource set #b is a periodic CSI-RS resource or a SS/PBCH block, the UE can include this periodic CSI-RS resource or SS/PBCH block in set $\bar{q}_0$ as the beam failure detection RS for control resource set #b. If there is no CSI-RS resource in set $\bar{q}_0$ is configured to be mapped to control resource set #b and the DL RS ID for QCL type D (i.e., spatial QCL, spatial Rx parameters0 configured in the TCI state for control resource set #b is an aperiodic CSI-RS resource or semi-persistent CSI-RS resource, the UE can assume that he is not needed to monitor the beam failure detection for control resource set #b.

In one embodiment, the UE can be requested to only monitor particular DCI formats in search space configured for monitoring gNB response to beam failure recovery request. In one scheme, the UE can be requested to only monitor PDCCH for particular DCI formats in search space configured with control resource set configured by higher layer parameter Beam-failure-Recovery-Response-CORESET In one scheme, the UE can be requested to only monitor PDCCH for DCI format 0_0 and 1_0 (i.e., the fallback DCI formats) in search space configured with control resource set configured by higher layer parameter Beam-failure-Recovery-Response-CORESET.

The technical reason for the provided embodiment is because the UE only uses the beam failure recovery CORESET to receive the gNB response for a short time period. The traffic transmitted by beam failure recovery CORESET is mainly used to re-build the beam link on normal PDCCH. Therefore, it is not necessary to support full functions of DCI formats and it can reduce the complexity of UE. In one scheme, the UE can expect that in the search space configured with control resource set configured by higher layer parameter Beam-failure-Recovery-Response-CORESET, the UE is configured to monitor PDCCH for DCI format 0_0 and DCI format 1_0.

In one embodiment, a UE can be indicated with the beam failure detection RS through a MAC-CE message. The benefit for this design is that the Tx beam for PDCCH can be switched through L2 MAC-CE signaling but in rel 15, the beam failure detection RS can only be configured through RRC. The consequence is: the Tx beam for PDCCH can be switched much faster than the beam failure detection RS can be updated and then the beam failure would be failed.

In one embodiment, the gNB can signal one MAC-CE message to signal one or more CSI-RS resource IDs or SS/PBCH block indexes as the beam failure detection RS for the UE to monitor the beam failure event. When a UE receives a beam failure detection RS MAC-CE, the UE may begin to monitor the CSI-RS resources or SS/PBCH blocks indicated in that MAC-CE for the beam failure event instances.

In one embodiment, a UE can be configured with a set of N RS IDs as the new candidate beams and also configured with the association between RS IDs and PRACH resources. Each RS ID among those N RS IDs is associated with one PRACH resource (for example, the PRACH resource can be a preamble and a RACH occasion). And then the gNB can use L2 (MAC-CE) message to update those N RS IDs. When the UE receives one MAC-CE to indicate a set of new N RS IDs, the UE may update the mapping between those N RS IDs and the associated PRACH resource. This design is useful to reduce the RRC configuration overhead. Initially, a small number of PRACH resources and also the associated RS IDs are configured. When the UE moves within one cell, the PRACH resources do not need to be reconfigured but only need to reconfigure those associated RS IDs because the best Tx beams for the UE are changed due to the UE mobility.

In one embodiment, a UE can be configured with a list of N {RS ID, PRACH resource occasion, PRACH preamble} for the beam failure recovery operation. The UE can be configured: {RS ID 1, PRACH resource occasion1, PRACH preamble 1}; {RS ID 2, PRACH resource occasion2, PRACH preamble 2}; . . . ; and {RS ID N, PRACH resource occasion N, PRACH preamble N}.

When the UE select RS ID i as the selected new candidate beam, the UE can be requested to send the associated preamble i on the associated PRACH resource occasion i which are associated with the selected RS ID i. Then the UE can be indicated with a set of RS ID through a MAC-CE message to update the list of RS IDs in the above configuration.

In one example, a UE can be configured with N=4 of {RS ID, PRACH resource occasion, PRACH preamble}: {RS ID a, PRACH resource occasion 1, PRACH preamble 1}, {RS ID b, PRACH resource occasion 2, PRACH preamble 2}, {PRACH resource occasion 3, PRACH preamble 3}, and {RS ID d, PRACH resource occasion 3, PRACH preamble 3}.

Then later one, the gNB can use MAC-CE to signal another 4 RS IDs {RS ID x, RS ID y, RS ID z, RS ID w} as the new set of candidate beams. Then the UE may update the association between RS ID and PRACH resource to: RS ID x is associated with PRACH resource occasion 1, PRACH preamble 1; RS ID y is associated with PRACH resource occasion 2, PRACH preamble 2; RS ID z is associated with PRACH resource occasion 3, PRACH preamble 3; and RS ID w is associated with PRACH resource occasion 4, PRACH preamble 4.

In one alternative, the MAC-CE can be used to update one subset of those N RS IDs. In one alternative, the MAC-CE can be used to update all the N RS IDs.

In one alternative, the gNB can use RRC to configure N sets of {PRACH resource occasion, PRACH preamble} for beam failure recovery request to a UE and then use MAC-CE to dynamically indicate one RS ID for each set of {PRACH resource occasion, PRACH preamble} for that UE.

In one alternative, the gNB can configure N sets of {PRACH resource occasion, PRACH preamble} for beam failure recovery request to a UE and for each set of {PRACH resource occasion, PRACH preamble}, the gNB can also configure multiple RS IDs as the candidate associated RS IDs to be associated with that set of {PRACH resource occasion, PRACH preamble}. After RRC configuration, the gNB can use MAC-CE message to select one of those configured RS ID for a set of {PRACH resource occasion, PRACH preamble}. Then the UE can measure those activated RS IDs and select one from them based on for example, the best RSRP or best SINR, and then transmit beam failure recovery request on the associated PRACH resource occasion with the associated PRACH preamble.

In the aforementioned example, the UE can be configured in higher layer with the following information for beam failure recovery: {PRACH resource occasion1, PRACH preamble 1, RS ID11, RS ID 12, . . . , RS ID $1M_1$}; {PRACH resource occasion2, PRACH preamble 2, RS ID 21, RS ID 22, . . . , RS ID $2M_2$}; . . . ; and {PRACH resource occasion N, PRACH preamble N, RS ID N1, RS ID N2, . . . , RS ID $NM_N$}.

Then the gNB can use MAC-CE message to select one from the configured RS IDs for each of {PRACH resource occasion i, PRACH preamble i}. And the gNB can use MAC-CE message to switch the selection of RS IDs for each of {PRACH resource occasion i, PRACH preamble i}. In one example, the gNB can use MAC-CE message to indicate up to N RS IDs {RS ID indicator a1, RS ID indicator a2, . . . , RS ID indicator aN}, where RS ID indicator a1 is used to indicate one RS ID from {RS ID11, RS ID 12, . . . , RS ID $1M_1$} and RS ID indicator a2 is used to indicate one RS ID from {RS ID21, RS ID 22, . . . , RS ID $2M_2$} and . . . , RS ID indicator aN is used to indicate one RS ID from {RS IDN1, RS ID N2, . . . , RS ID $NM_N$}.

With receiving that MAC-CE message, the UE may: assume the association between {PRACH resource occasion1, PRACH preamble 1} with RS ID indicated by RS ID indicator a1, the association between {PRACH resource occasion 2, PRACH preamble 2} with RS ID indicated by RS ID indicator a2, . . . , the association between {PRACH resource occasion N, PRACH preamble N} with RS ID indicated by RS ID indicator aN; the UE may measure the RSs identified by the RS IDs indicated by {RS ID indicator a1, RS ID indicator a2, . . . , RS ID indicator aN} and select one of them as the new identified Tx beam for beam failure recovery. Here the selected RS ID can be denoted as qNew; and then the UE can transmit the preamble associated with selected qNew on the RACH occasion associated with the selected qNew.

In some embodiments, a UE can be configured with a search space to receive gNB's response for a beam failure recovery request. After the UE sends a beam failure request recovery message to the gNB through some uplink channel, the UE can begin to monitor PDCCH in the search space configured for monitoring gNB's response to beam failure recovery request.

In one embodiment, when the UE monitors the PDCCH in the search space configured for monitoring gNB's response to beam failure recovery request, the UE may ignore TCI state configured/indicated to the control resource set that is associated with the search space configured for monitoring gNB's response (if TCI state is configured or indicated for that control resource set).

In one embodiment, a UE can be configured with a search space A and the UE can be configured to monitor PDCCH in the search space A for the gNB's response to a beam failure recovery request. The search space A can be configured to be associated with a control resource set B. After the UE sends a beam failure recovery request in a uplink channel to the gNB, the UE can be requested to begin detect PDCCH in the search space A and the UE may assume the DM-RS associated with the PDCCH detection to be QCLed with the reference signal ID that is indicated through the transmission of the corresponding beam failure recovery request message. If TCI state is configured or indicated to the control resource set B that is associated with the search space A, the UE may ignore the TCI state in the detection of PDCCH in search space A.

Note, if the control resource set A is also associated with another search space C that is not configured for the PDCCH detection for the gNB's response to a beam failure recovery request, the UE may assume the DMRS of PDCCH detection in search space C to be QCLed (including spatial Rx parameters at least) with the TCI state configured/indicated to control resource set A. Therefore, a scheme for the UE to determine the QCL assumption for receive DM-RS for PDCCH detection in a search space is determined based on whether the search space is configured for the UE to detection PDCCH for gNB's response to beam failure recovery request or not.

In a search space configured as "beam failure recovery search space" or called as "search space—beam failure recovery" or called as "search space—BFR" where the UE can be requested to detect gNB's response to a beam failure recovery request, the UE may assume the DM-RS associated with the PDCCH detection in this search space to be QCLed (at least including spatial Rx parameters) with the candidate beam RS ID signaled in corresponding beam failure recovery request message.

If a search space not configured as "beam failure recovery search space" or called as "search space—beam failure recovery" where the UE is not configured to detect gNB's response to a beam failure recovery request, the UE may assume the DM-RS associated with the PDCCH detection in this search space to be QCLed (at least including spatial Rx parameters) with the RS(s) in the TCI state configured or indicated to the control resource set associated with this search space.

In the configuration of search space A, the UE can be configured with one or more of the following parameters: associated control resource set ID; the periodicity for monitoring PDCCH; the slot offset for starting position of monitoring PDCCH; and the starting OFDM index(es) of control resource set in one slot.

In one embodiment, the UE may monitor PDCCH in the search space A that is configured for gNB's response for beam failure recovery request only after the UE sends one beam failure recovery request on uplink. The UE can expect not to monitor PDCCH for DCI format(s) in the search space A that is configured for gNB's response for beam failure recovery request before the UE sends one beam failure recovery request on uplink. The UE may stop monitoring PDCCH in the search space A that is configured for gNB's response for beam failure recovery request after one or more than one control resource sets are configured/reconfigured/indicated with TCI state for QCL assumption.

Two search spaces might have OFDM symbol overlap in some slots. When two search space have OFDM symbol overlap in one slot, the UE can be requested to use the TCI state configured to the control resource set associated with one of these two search space to receive the DM-RS associated with PDCCH detection in both search space in that slot. In one scheme, at slot n, a UE can be configured with two search spaces A1 and A2. These two search spaces A1 and A2 have OFDM symbol overlap at slot n. The UE can be requested to assume the DM-RS associated with PDCCH detection in both search spaces A1 and A2 to be QCLed with the RS(s) in TCI states configured to control resource set associated with one of these two search space A1 and A2.

The QCL assumption can be: the TCI states configured to control resource set with lowest ID among control resource set(s) associated with search space A1 and A2; the TCI states configured to control resource set associated with search space with lowest search space ID among search space A1 and A2; the TCI states configured to control resource set with earliest starting OFDM symbol at slot n; the TCI states configured to control resource set associated search space with earliest starting OFDM symbol among search space A1 and A2 at slot n; if one of the search spaces A1 and A2 is configured to be beam failure search space, the UE can be requested to use the $q_{new}$ that is signaled in beam failure recovery request message as QCL assumption to detect PDCCH in both search spaces A1 and A2.

In one example, search space A1 is configured as beam failure recovery search space. In such example, when beam failure is not detected, before the UE sends a beam failure recovery request, at slot n, the UE does not need to monitor PDCCH in search space A1. In such example, when beam failure is detected and after the UE sends a beam failure recovery request, the UE may monitor PDCCH in both search space A1 and A2 at slot n. In this case, since search space A1 and A2 have OFDM symbol overlap in slot n, the UE can be requested to assume the DM-RS associated with PDCCH detection in both search spaces A1 and A2 at slot n to be QCLed with the identified new candidate beam RS ID that is signaled in the corresponding beam failure recovery request message.

A UE can be configured with one or multiple carriers. When the UE is configured with multiple carriers, the UE is configured with one primary carrier (called PCell) and one or multiple secondary carriers (called SCell). A UE can be configured to monitor the beam quality of PDCCH on one SCell and if beam failure on that SCell is detected, then the UE can send beam failure recovery request for that SCell to the gNB. The purpose of beam failure recovery request for SCell is to indicate the gNB that the beams of PDCCH on that SCell are failed and the gNB might take some action to switch the beams for PDCCH on that SCell to some other good beams.

In one embodiment, a UE can report the beam failure of one SCell through some higher layer message (for example an MAC-CE message) on uplink of PCell when the beam failure on that SCell is declared.

One or more of the following information elements can be included in that higher layer message (for example a MAC-CE message): the ID of the SCell (secondary serving cell ID) where the beam failure is declared; the ID of the bandwidth part (BWP) in which beam failure is declared; the ID(s) of control resource set whose beam is failed. For example, there can be multiple control resource sets configured in one BWP (bandwidth part) of one serving cell. The UE can be requested to monitor the beam quality of those multiple control resource sets. The UE can report which one(s) of those control resource sets have failed beam; and the information of one new beam that is identified by the UE. This information can be the ID of one RS (for example, one CSI-RS resource or one SS/PBCH block index).

Figure 12A:
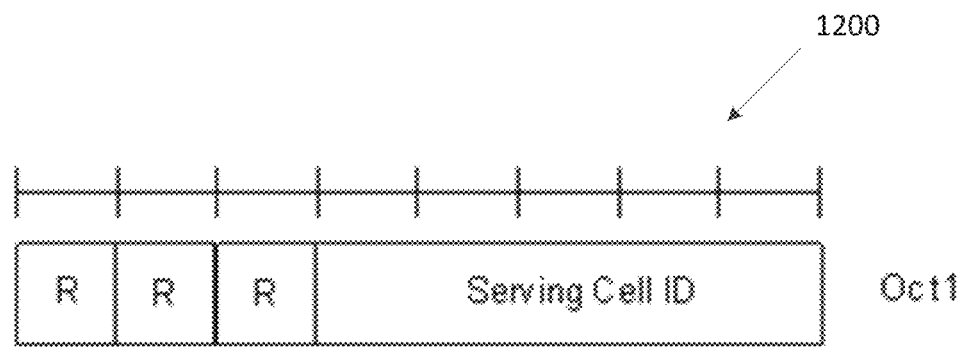
FIG. 12A illustrates a MAC-CE message according to embodiments of the present disclosure.

FIG. 12A illustrates a MAC-CE message 1200 according to embodiments of the present disclosure. The embodiment of the MAC-CE message 1200 illustrated in FIG. 12A is for illustration only. FIG. 12A does not limit the scope of this disclosure to any particular implementation.

In one embodiment, an example of the MAC-CE message is shown in FIG. 12A. In the MAC-CE message, the UE can report one serving cell ID and the reported serving cell ID is the ID of SCell where the UE declares beam failure.

Figure 12B:
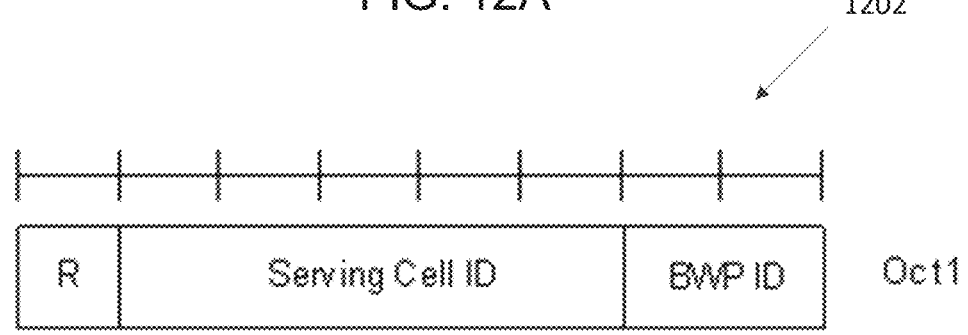
FIG. 12B illustrates another MAC-CE message according to embodiments of the present disclosure.

FIG. 12B illustrates another MAC-CE message 1202 according to embodiments of the present disclosure. The embodiment of the MAC-CE message 1202 illustrated in FIG. 12B is for illustration only. FIG. 12B does not limit the scope of this disclosure to any particular implementation.

In one embodiment, an example of the MAC-CE message is shown in FIG. 12B. In the MAC-CE message, the UE can report one serving cell ID and one BWP ID. The reported serving cell ID is the ID of SCell where the UE declares beam failure and the BWP ID is the active bandwidth part in the reported SCell where the UE declares beam failure.

Figure 12C:
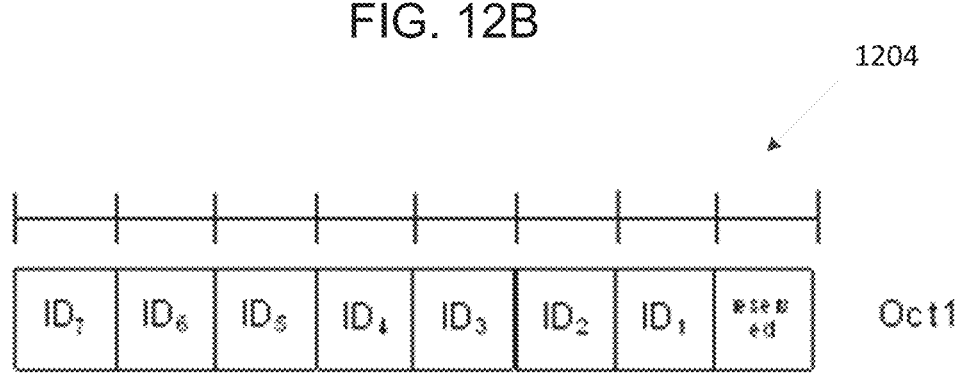
FIG. 12C illustrates yet another MAC-CE message according to embodiments of the present disclosure.

FIG. 12C illustrates yet another MAC-CE message according to embodiments of the present disclosure. The embodiment of the MAC-CE message 1204 illustrated in FIG. 12C is for illustration only. FIG. 12C does not limit the scope of this disclosure to any particular implementation.

In one embodiment, an example of the MAC-CE message is shown in FIG. 12C. In the MAC-CE message, the UE can report the beam failure of one or more SCell by indicating the value of bits for each SCell. In the example of FIG. 12C, 7 bits are reported for 7 SCell and each bit is used to represent one SCell. The value of each bit of $ID_1 \sim ID_7$ can represent whether beam failure happens in the corresponding SCell. In one example, the value of one bit=1 can indicate that the corresponding SCell has beam failure.

In one embodiment, a UE is not expected to be configured with a set of new beam identification reference signal for beam failure recovery on one SCell. It means that the UE only needs to detect beam failure on SCell but not need to find new candidate beams. The condition for the UE to send beam failure recovery request of one SCell to gNB is when the UE detects beam failure on that SCell. This scheme can reduce the gNB configuration overhead and also the UE complexity. In one scheme, a UE is not expected to be configured with a set $\bar{q}_1$ of periodic CSI-RS resource configuration indexes and/or SS/PBCH block indexes by higher layer parameter candidateBeamRSList for radio link quality measurements on one SCell.

In some embodiment, a UE can determine if he need to do beam failure recovery operation for one SCell based on whether beam failure reference signals are configured or not for that SCell. If the UE is not configured with beam failure reference signals for one SCell by the gNB, then the UE does not operate beam failure recovery for that SCell. If the UE is configured with beam failure reference signals for one SCell by the gNB, then the UE may assume he can operate beam failure recovery for that SCell.

In one embodiment, a UE can determine if he is requested to operate beam failure recovery for one SCell based on whether a set $\bar{q}_0$ of periodic CSI-RS resource configuration indexes by higher layer parameter failureDetectionResources is configured to him or not. If a set $\bar{q}_0$ of periodic CSI-RS resource configuration indexes by higher layer parameter failureDetectionResources is not configured for one SCell, the UE can assume he is not requested to operate beam failure recovery for that SCell. If a set $\bar{q}_0$ of periodic CSI-RS resource configuration indexes by higher layer parameter failureDetectionResources is configured for one SCell, the UE can assume he can operate beam failure recovery for that SCell In one embodiment, the UE can determine the scheme for sending beam failure recovery request according whether the UE is configured with new candidate beam reference signals. If the UE is configured with new candidate beam reference signals, the UE can assume that the UE can use the RACH channel in PCell uplink to send the beam failure recovery request. If the UE is not configured with new candidate beam reference signals, the UE can assume to use MAC-CE message in PCell uplink to send the beam failure recovery request.

In one embodiment, the UE can be requested to determine the scheme for sending beam failure recovery request based on the configuration of a set $\bar{q}_1$ of periodic CSI-RS resource configuration indexes and/or SS/PBCH block indexes by higher layer parameter candidateBeamRSList. If the UE is not configured with a set $\bar{q}_1$ of periodic CSI-RS resource configuration indexes and/or SS/PBCH block indexes by higher layer parameter candidateBeamRSList for one SCell, the UE can assume he may use MAC-CE message on PCell uplink to send beam failure recovery request for that SCell. If the UE is configured with a set $\bar{q}_1$ of periodic CSI-RS resource configuration indexes and/or SS/PBCH block indexes by higher layer parameter candidateBeamRSList for one SCell, the UE can assume he may use RACH channel on PCell uplink to send beam failure recovery request for that SCell.

The aforementioned embodiment is useful to cover all the possible deployment scenarios. In 5G NR, there can be two different deployment scenarios for carrier aggregation. Case #1 is PCell and SCell are in same band, for example both are in one mmWave band. Case #2 is PCell is in FR1 (frequency range 1) and SCell is in mmWave band. For Case #1, RACH-based beam failure request transmission on PCell uplink can be applicable because both PCell and SCell are multi-beam system and therefore, RACH channel on PCell is also multi-beam based design. For case #2, MAC-CE based scheme is more applicable because the RACH channel on PCell uplink is not multi-beam based and the PCell uplink would be still ok when beam failure happens on SCell. Therefore, the provided scheme can allow system to accommodate both cases.

If the UE is configured with a SCG (Secondary cell group), the UE can apply the procedures and schemes described in this invention for both MCG (master cell group) and SCG. If it is for SCell in SCG, the UE can apply the procedure and schemes described in this invention to PSCell wherever PCell is used in the schemes.

In one embodiment, a UE can report the beam failure of one SCell through a PUCCH channel configured in primary cell when the beam failure on that SCell is declared. The UE can report one or more of the following information elements in the message transmitted in the configured PUCCH channel: the ID of the SCell (secondary serving cell ID) where the beam failure is declared; the ID of the bandwidth part (BWP) in which beam failure is declared; the ID(s) of control resource set whose beam is failed. For example, there can be multiple control resource sets configured in one BWP (bandwidth part) of one serving cell. The UE can be requested to monitor the beam quality of those multiple control resource sets. The UE can report which one(s) of those control resource sets have failed beam; and the information of one new beam that is identified by the UE. This information can be the ID of one RS (for example, one CSI-RS resource or one SS/PBCH block index).

Note, if a UE is configured with SCG (secondary cell group), the UE can report the beam failure event of one secondary cell (SCell) in a SCG in a PUCCH channel configured in the uplink of PSCell. If the UE is configured with a PUCCH-SCell (i.e., the primary cell of the secondary PUCCH group), the UE can report the beam failure event of one SCell in the secondary PUCCH group in a PUCCH channel configured in the uplink of PUCCH-SCell of the secondary PUCCH group.

In one embodiment, a UE can be configured with a PUCCH resource on PCell or primary cell in secondary PUCCH group for the UE to transmit the information of beam failure of one SCells. The UE can be configured with the following information: a resource ID for PUCCH resource used for transmitting beam failure recovery request; a periodicity in symbols or in slots; a slot offset; and PUCCH format. In one example, the PUCCH format used for beam failure recovery request can be PUCCH format 2, 3 or 4.

The above configured information can be used by the UE to determine the time-frequency resource for PUCCH transmission for one beam failure recovery. When the UE declares beam failure on one or more SCells, the UE can send beam failure recovery request for Scell in next available PUCCH transmission chance.

In the UCI (uplink control information) message transmitted in PUCCH configured for SCell beam failure recovery, the UE can report one or more of the following information: the beam failure event happens in one Scell, and which is that Scell; and the new identified gNB Tx beam for beam failure recovery for that failed SCell.

After the UE sends beam failure recovery request UCI in PUCCH at slot n, the UE can expect to receive a DCI with CRC scrambled by C-RNTI or MCS-C-RNTI from PDCCH monitored in a beam failure recovery search space in the carrier where the beam failure recovery request is sent starting from slot n+L1 to slot n+L2. That means the UE may monitor the PDCCH in a search space configured for beam failure recovery in the CC where PUCCH for beam failure recovery of Scell is configured for the gNB's response to the beam failure recovery request of Scell.

If a UE sends beam failure recovery request UCI in PUCCH configured in PCell, then the UE may monitor PDCCH in search space of beam failure recovery configured in PCell for a DCI with CRC scrambled by C-RNTI or MCS-C-RNTI. If a UE sends beam failure recovery request UCI in PUCCH configured in PUCCH-SCell then the UE may monitor PDCCH in search space of beam failure recovery configured in the CC that is configured as PUCCH-SCell.

In one alternative scheme, after the UE sends beam failure recovery request UCI in a PUCCH at slot n, the UE may monitor PDCCH in search space of beam failure recovery configured in a SCell where the UE include the beam failure event of that Scell for the gNB's response for beam failure recovery request for this Scell. In one example, a UE can send beam failure recovery request UCI in a PUCCH at slot n and in the UCI, the UE reports the beam failure of Scells a1, a2 and a3. Then the UE may monitor PDCCH in search space of beam failure recovery configured in Scell a1 for DCI with CRC scrambled by C-RNTI or MCS-C-RNTI for the gNB's response to beam failure recovery request for Scell a1.

Then the UE may monitor PDCCH in search space of beam failure recovery configured in Scell a2 for DCI with CRC scrambled by C-RNTI or MCS-C-RNTI for the gNB's response to beam failure recovery request for Scell a2. Then the UE may monitor PDCCH in search space of beam failure recovery configured in Scell a3 for DCI with CRC scrambled by C-RNTI or MCS-C-RNTI for the gNB's response to beam failure recovery request for Scell a3.

In one embodiment, the UE can report N1 bits in beam failure recovery request UCI to report which Scell(s) have beam failure to the serving gNB. In one example, each bit in those N1 bits can be associated with one Scell and the value of one bit can indicate whether beam failure happens or not in the associated Scell. For example, bit value=1 can indicate the associated Scell has beam failure and bit value=0 can indicate the associated Scell has no beam failure.

In one embodiment, the UE can report N2 bits in beam failure recovery request UCI to report (1) which Scell(s) have beam failure (2) and one RS ID as the new candidate beam to the serving gNB. The UCI bits can be partitioned into two part: part 1 has N2_1 bits to indicate which Scell(s) have beam failure and part 2 has N2_2 to indicate one RS ID as new candidate beam. In part 1, each bit can be used to indicate the beam failure of an associated Scell.

In one embodiment, for the beam failure recovery of one Scell, the condition for a UE to send beam failure recovery request to the serving gNB is beam failure is detected on one Scell and the UE can be requested not to do new beam detection.

In one embodiment, a UE may determine the scheme for reporting beam failure recovery request for a Scell based on the configuration of PUCCH for beam failure recovery request. If a UE is configured with PUCCH resource for reporting beam failure recovery request of a Scell, the UE hall reporting beam failure recovery request for one Scell in the configured PUCCH resource. If a UE is not configured with PUCCH resource for reporting beam failure recovery request of Scell, the UE may use MAC-CE message to report the beam failure event and/or associated information (for example the ID of newly identified Tx beam) to the serving gNB.

In one embodiment, a scheme of reporting beam failure recovery request is determined for a Scell based on whether the Scell has uplink band or not. For a first Scell with uplink band, a UE may be configured with PRACH resource in that uplink band for the UE to transmit beam failure recovery request of a first Scell. For a second Scell without uplink band (i.e., a second Scell is a downlink-only carrier), a UE may use the PUCCH configured for beam failure recovery request to transmit the beam failure recovery request message for a second Scell.

In one embodiment, a scheme of reporting beam failure recovery request is determined for a Scell based on whether the Scell has uplink band or not. For a first Scell with uplink band, a UE may be configured with PRACH resource in that uplink band for the UE to transmit beam failure recovery request of a first Scell. For a second Scell without uplink band (i.e., a second Scell is a downlink-only carrier), a UE may use a MAC-CE message to transmit the beam failure recovery request message for a second Scell.

In one embodiment, a UE can be configured with a mapping between N≥1 CSI-RS resources or SS/PBCH block indexes and N≥1 PRACH resources for the beam failure recovery request transmission for a first SCell. Each PRACH resources configured for beam failure recovery request ion for a first SCell can be configured in the uplink of a first SCell or uplink of any other Scell or PCell. The UE can be configured with the following information for the beam failure recovery request transmission for a first SCell.

In one example, a first ID of CSI-RS resource or SS/PBCH or SRS resource, the PRACH preamble index associated with a first ID of CSI-RS resource, the ID of Scell where the PRACH resource for the transmitting the PRACH preamble associated with a first ID of CSI-RS resource or SS/PBCH or SRS resource. Optionally, the UE can also be configured with a PRACH resource occasion associated with a first ID of CSI-RS resource/SS/PBCH block/SRS resource and the ID of SCell or PCell where this PRACH resource occasion is configured.

In another example, a second ID of CSI-RS resource or SS/PBCH or SRS resource, the PRACH preamble index associated with a second ID of CSI-RS resource, the ID of Scell where the PRACH resource for the transmitting the PRACH preamble associated with a second ID of CSI-RS resource or SS/PBCH or SRS resource. Optionally, the UE can also be configured with a PRACH resource occasion associated with a second ID of CSI-RS resource/SS/PBCH block/SRS resource and the ID of SCell or PCell where this PRACH resource occasion is configured.

After the UE sends beam failure recovery request for a first SCell, the UE can be requested to monitor a search-space configured for beam failure recovery in a first Scell to monitor the gNB's response. The gNB's response can be defined as DCI scrambled with C-RNTI or MCS-C-RNTI detected from a search-space configured for beam failure recovery in a first Scell.

TABLE 5

The configuration in RRC

In one example, the configuration in RRC for the above design can be:
```
BeamFailureRecoveryConfig ::=        SEQUENCE {
  rootSequenceIndex-BFR              INTEGER (0..137)
            OPTIONAL, -- Need M
  rach-ConfigBFR                     RACH-ConfigGeneric
            OPTIONAL, -- Need M
  rsrp-ThresholdSSB                  RSRP-Range
            OPTIONAL, -- Need M
  candidateBeamRSList                SEQUENCE (SIZE(1..maxNrofCandidateBeams))
OF PRACH-ResourceDedicatedBFR        OPTIONAL, -- Need M
  ssb-perRACH-Occasion               ENUMERATED {oneEighth, oneFourth, oneHalf,
one, two, four, eight, sixteen}      OPTIONAL, -- Need M
  ra-ssb-OccasionMaskIndex           INTEGER (0..15)
            OPTIONAL,       -- Need M
  recoverySearchSpaceId              SearchSpaceId
            OPTIONAL, -- Cond CF-BFR
  ra-Prioritization                  RA-Prioritization
            OPTIONAL, -- Need R
  beamFailureRecoveryTimer           ENUMERATED {ms10, ms20, ms40, ms60, ms80,
ms100, ms150, ms2001       OPTIONAL, -- Need M
  ...
}
PRACH-ResourceDedicatedBFR ::=   CHOICE {
  ssb                              BFR-SSB-Resource,
  csi-RS                           BFR-CSIRS-Resource
}
BFR-SSB-Resource ::=       SEQUENCE {
  cell                     ServCellIndex
    bwp-Id                 BWP-Id
    ssb                    SSB-Index,
    ra-PreambleIndex       INTEGER (0..63),
  ...
}
BFR-CSIRS-Resource ::=     SEQUENCE {
  cell                     ServCellIndex
    bwp-Id                 BWP-Id
  csi-RS                   NZP-CSI-RS-ResourceId,
    ra-OccasionList        SEQUENCE (SIZE(1..maxRA-OccasionsPerCSIRS)) OF
INTEGER (0..maxRA-Occasions-1) OPTIONAL, -- Need R
    ra-PreambleIndex       INTEGER (0..63)
            OPTIONAL, -- Need R
  ...
}
```

Where the added parameters are cell and bwp-Id that are used to indicate where the RACH resource associated with the CSI-RS or SSB are allocated. Parameter cell is the carrier where the PRACH resource is located and bwp-Id is the UL bwp which the PRACH resource is located.

In one embodiment, a UE can be requested to report the beam failure of a SCell by transmitting a configured RACH preamble on RACH channel on PCell. In this scheme, a UE-A can be configured with a preamble a for the beam failure of a first SCell. And the UE-A can be configured with a set of RS IDs for the UE-A to detect beam failure of a first SCell. The beam failure of a first SCell can be declared if the number of consecutive beam failure instance of a first SCell reaches a configured threshold.

When the beam failure event of a first SCell is declared, the UE-A can send the configured preamble a on RACH channel configured on PCell and then monitor the RACH response on PCell for the transmission of preamble a. Please note here the key design for beam failure of Scell is: (1) the UE-A reports the beam failure event (or called beam failure recovery request for a SCell) of a first Scell when the beam failure of a first Scell is declared. The UE-A does not need identify one new candidate Tx beam as one of the condition for the UE to report beam failure recovery request for a first Scell; and (2) the beam failure of a first Scell can be implicitly reported to the gNB through the transmission of RACH preamble a.

At the gNB side, when the gNB receives RACH preamble a from the UE-A, the serving gNB can know that the beam failure of a first Scell happens and then the gNB can send MAC-CE message on PCell or any Scell other than a first Scell to switch the beam of PDCCH on a first Scell. An example of the configuration is shown in below TABLE 6.

TABLE 6

BeamFailureRecoveryConfg.

```
BeamFailureRecoveryConfig ::=
SEQUENCE {
candidatePreambleSCellList         SEQUENCE (SIZE(1..maxNrofCells-1))  OF
PRACH-preambleScellBFR
}
PRACH-preambleScellBFR ::=      CHOICE {
```

TABLE 6-continued

BeamFailureRecoveryConfg.

cell                ServCellIndex,
ra-PreambleIndex    INTEGER (0..63)
}

Where the parameter BeamFailureRecoveryConfig configure the parameters for beam failure of Scells. In each parameter candidatePreambleSCellList, the preamble for the beam failure of a SCell is configured. As shown in the table, in each parameter candidatePreambleSCellList, the ID of one Scell can be configured and an associated preamble for beam failure of Scell is also configured.

Figure 13:
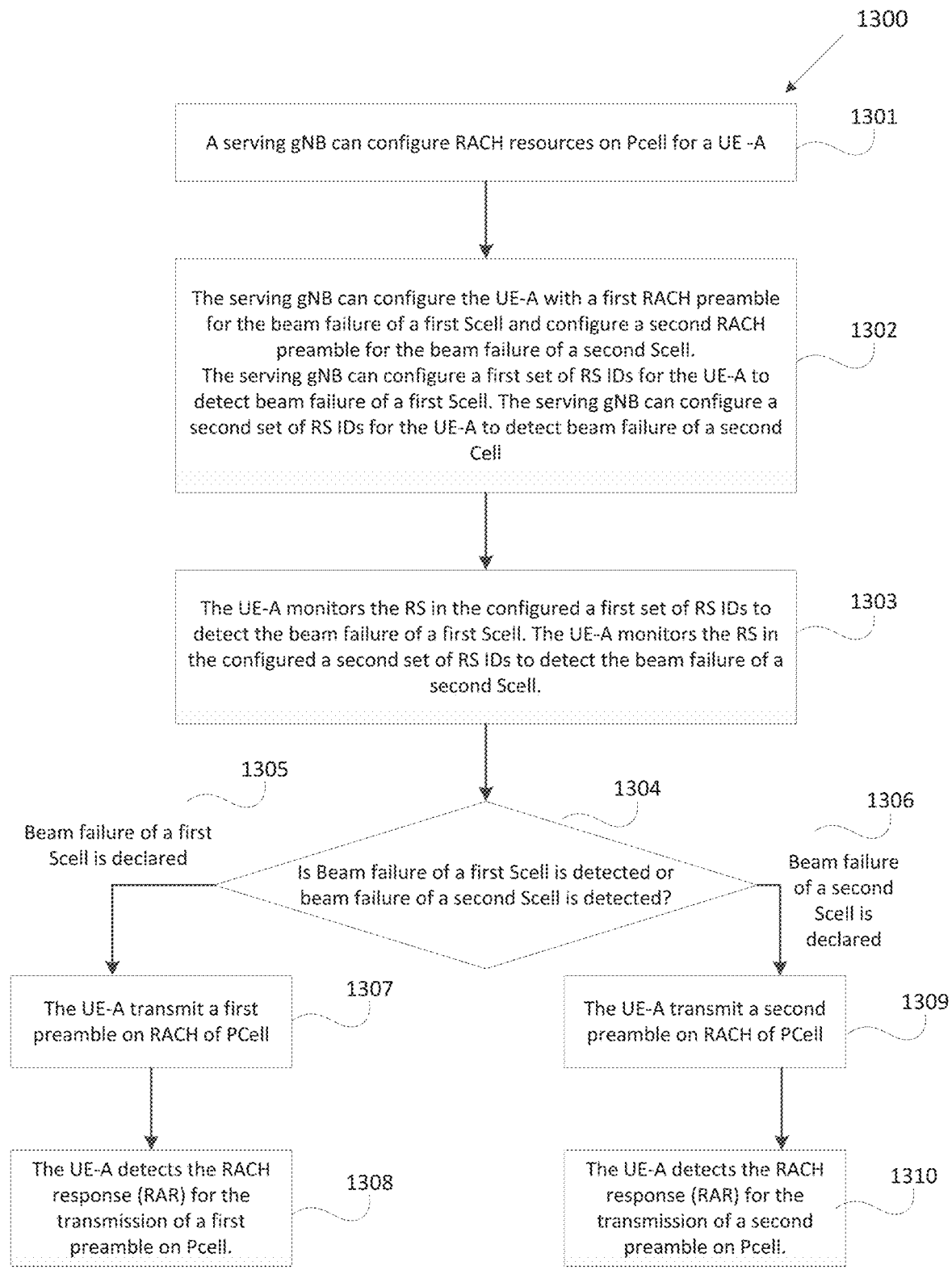
FIG. 13 illustrates a flowchart of a method for beam failure of SCell according to embodiments of the present disclosure.

FIG. 13 illustrates a flow chart of a method 1300 for beam failure of SCell according to embodiments of the present disclosure. The embodiment of the method 1300 illustrated in FIG. 13 is for illustration only. FIG. 13 does not limit the scope of this disclosure to any particular implementation.

As shown in FIG. 13, the serving gNB can configure RACH channel and resources on PCell uplink for a UE-A in 1301. Then for beam failure reporting and recovery of Scell, the serving gNB can configure a first preamble for the UE-A to report the beam failure recovery request for a first Scell and the serving gNB can configure a second preamble for the UE-A to report the beam failure recovery request for a second Scell in 1302. To detect the beam failure of a first Scell, the UE-A can be configured with a first set of RS IDs in 1302.

To detect the beam failure of a second Scell, the UE-A can be configured with a second set of RS IDs in 1302. Then the UE-A can begin to monitor the configured RSs for detecting beam failure of a first Scell and a second Scell. As shown in FIG. 13, in 1303, the UE-A monitors the reference signal resources contained in a first set of RS IDs to detect the beam failure of a first Scell and in 1303, the UE-A monitors the reference signal resources contained in a second set of RS IDs to detect the beam failure of a second Scell.

Then in 1304, the UE-A determine whether beam failure of a first Scell happens and whether beam failure of a second Scell happens. For each Scell, the beam failure can be declared if the number of consecutive beam failure instance of that Sell reaches one threshold. If the beam failure of first Scell is declared in 1305, the UE-A may transmit a first RACH preamble on RACH resource where a first RACH preamble is configured as the preamble for the beam failure of a first Scell. Then in 1308, the UE-A can expect to detect the RACH response for the transmission of a first preamble. If the beam failure of second Scell is declared in 1306, the UE-A may transmit a second RACH preamble on RACH resource where a second RACH preamble is configured as the preamble for the beam failure of a second Scell. Then in 1310, the UE-A can expect to detect the RACH response for the transmission of a second preamble.

In one embodiment, after a UE sends beam failure recovery request to a serving gNB, the UE can assume to use a Tx beam that corresponds to the new Tx beam qnew that is identified by UE and is used the serving gNB to send gNB response to the beam failure recovery request for the UE to transmit the PUCCH channel.

A UE can be provided, for a serving cell, with a set $q_0$ of periodic CSI-RS resource configuration indexes by higher layer parameter failureDetectionResources and with a set $\bar{q}_1$ of periodic CSI-RS resource configuration indexes and/or SS/PBCH block indexes by higher layer parameter candidateBeamRSList for radio link quality measurements on the serving cell. If the UE is not provided with higher layer parameter failureDetectionResources, the UE determines the set $\bar{q}_0$ to include SS/PBCH block indexes and periodic CSI-RS resource configuration indexes with same values as the RS indexes in the RS sets indicated by the TCI states for respective control resource sets that the UE uses for monitoring PDCCH. The UE expects the set $\bar{q}_0$ to include up to two RS indexes and, if there are two RS indexes, the set $\bar{q}_0$ includes only RS indexes with QCL-TypeD configuration for the corresponding TCI states. The UE expects single port RS in the set $\bar{q}_0$.

In one embodiment, a UE can be configured with one or more PUCCH resources and for each PUCCH resource, the UE can be configured/indicated with one reference signal ID as the spatial relation reference. For the transmission on each PUCCH resource, the UE can be requested to derive the spatial domain transmission filter (i.e., Tx beamformer) according to the configured/indicated spatial relation reference. After the UE sends a preamble on RACH resource configured for beam failure recovery request (or called link recovery), for a first PUCCH resource, the UE can be requested to do one or more of the following operations.

In one example, if the activated spatial relation reference RS ID of a first PUCCH resource is same to one RS ID in the set of $\bar{q}_0$ that is configured for the UE to detect the beam failure on PDCCH, then after the UE detects a DCI format with CRC scrambled by C-RNTI in PDCCH in a search space configured for beam failure recovery, the UE may transmit a first PUCCH with a spatial domain transmission filter same to the filter used to receive $q_{new}$ until the UE receives an activation or reconfiguration of higher layer parameter PUCCH-SpatialrelationInfo for a first PUCCH resource.

In another example, if the activated spatial relation reference RS ID of a first PUCCH resource is same to one RS ID in the set of $\bar{q}_0$ that is configured for the UE to detect the beam failure on PDCCH, then after the UE detects a DCI format with CRC scrambled by C-RNTI in PDCCH in a search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In another example, if the activated spatial relation reference RS ID of a first PUCCH resource is spatial QCLed with one RS ID contained in the set of $\bar{q}_0$ that is configured for the UE to detect the beam failure on PDCCH, then after the UE detects a DCI format with CRC scrambled by C-RNTI in PDCCH in a search space configured for beam failure recovery, the UE may transmit a first PUCCH with a spatial domain transmission filter same to the filter used to receive $q_{new}$ until the UE receives an activation or reconfiguration of higher layer parameter PUCCH-SpatialrelationInfo for a first PUCCH resource.

In yet another example, if the activated spatial relation reference RS ID of a first PUCCH resource is spatial QCLed with one RS ID contained in the set of $\bar{q}_0$ that is configured for the UE to detect the beam failure on PDCCH, then after the UE detects a DCI format with CRC scrambled by C-RNTI in PDCCH in a search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, if a first PUCCH resource is configured with PUCCH format to be PUCCH format 0, (for example that is provided by higher layer parameter format in RRC), then after the UE detects a DCI format with CRC scrambled by C-RNTI in PDCCH in the search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, if a first PUCCH resource is configured with PUCCH format to be PUCCH format 1 (for example, that is provided by higher layer parameter format in RRC), then after the UE detects a DCI format with CRC scrambled by C-RNTI in PDCCH in the search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, if a first PUCCH resource is configured with PUCCH format to be PUCCH format 0 or format 1 (for example that can be provided through higher layer parameter format in RRC), then after the UE detects a DCI format with CRC scrambled by C-RNTI in PDCCH in the search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, if a UE transmits HARQ-ACK information bits with positive or negative SR (HARQ-ACK/SR bits) in s first PUCCH resources, then after the UE detects a DCI format with CRC scrambled by C-RNTI in PDCCH in the search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, if a UE transmits HARQ-ACK information bits in s first PUCCH resources, then after the UE detects a DCI format with CRC scrambled by C-RNTI in PDCCH in the search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, if a UE transmit HARQ-ACK/SR bits containing HARQ-ACK information bits in a first PUCCH resource for the PDSCH scheduled by a DCI transmitted in PDCCH in the search space configured for beam failure recovery, then after the UE detects a DCI format with CRC scrambled by C-RNTI in PDCCH in a search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, if a UE transmit HARQ-ACK information bits in a first PUCCH resource for the PDSCH scheduled by a DCI transmitted in PDCCH in a search space configured for beam failure recovery, then after the UE detects a DCI format with CRC scrambled by C-RNTI in PDCCH in the search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

In yet another example, for a first PUCCH resource, after the UE detects a DCI format with CRC scrambled by C-RNTI in PDCCH in the search space configured for beam failure recovery, the UE may transmit a first PUCCH with a spatial domain transmission filter same to the filter used to transmit the msg1 in corresponding RACH procedure until the UE receives an activation or reconfiguration of higher layer parameter PUCCH-SpatialrelationInfo for a first PUCCH resource.

Please note the aforementioned embodiments describe the design that the UE may apply a "default" beam on PUCCH transmission during beam failure recovery procedures. In one scheme, the UE can be requested to apply the "default" beam on PUCCH transmission as described by one or more of the above schemes sometime after the UE successfully decodes the gNB's response to a contention-free based RACH based beam failure recovery request.

In one example, the UE transmits RACH preamble for beam failure recovery request at slot n and then the UE begins to monitor PDCCH in a search space configured for beam failure recovery starting from slot n+4, i.e., the search space provided by higher payer parameter recoverySearchSpaceId. When the UE detects a DCI format with CRC scrambled by C-RNTI or MCS-C-RNTI at slot m, the UE can be requested to apply the "default" beam on PUCCH transmission as described by one or more of the above schemes according one or more of the following timing design.

In one example, the UE can be requested to start applying the designed "default" beam on PUCCH transmission starting from K symbols after the last symbol of PDCCH in a search space provided by higher layer parameter recoverySearchSpaceId and where the DCI format with CRC scrambled by C-RNTI or MCS-C-RNTI is detected. The value of K can be pre-defined/pre-configured. The value of K can be based on UE capability reporting.

In another example, the UE can be requested to apply the designed "default" beam on PUCCH transmission starting from the first symbol where the PUCCH transmission is transmitted, which carries the HARQ-ACK/NACK feedback for the first PDSCH transmission scheduled by a DCI format with CRC scrambled by C-RNTI or MCS-C-RNTI, where the DCI format is detected from PDCCH in search space for beam failure recovery request (i.e., the search space provided by higher layer parameter recoverySearchSpaceId). In other word, the starting time that UE can be requested to apply the designed default beam on PUCCH transmission is the first symbol where PUCCH carrying HARQ-ACK/NACK for PDSCH scheduled by the DCI format considered as gNB's response for UE's beam failure recovery request.

In yet another example, the UE can be requested to assume the designed "default" beam on PUCCH resources starting from the first symbol of a PUSCH transmission that is scheduled by DCI format 0_0 with CRC scrambled by C-RNTI or MCS-C-RNTI detected in PDCCH in search space for beam failure recovery (i.e., the search space provided by recoverySearchSpaceId).

In yet another example, the UE can be requested to assume the designed "default" beam on PUCCH resources starting from the first symbol of a PUCCH transmission that carries the HARQ-ACK/NACK feedback for PDSCH scheduled by DCI format detected in the search space provided by recoverySearchSpaceId or the first symbol of a PUSCH transmission that is scheduled by DCI format 0_0 detected in the search space provided by recoverySearchSpaceId, whichever comes first.

In one embodiment, the UE detects a first DCI format scrambled with C-RNTI or MCS-C-RNTI in the search space provided by recoverySearchSpaceId at slot $n_1$ (i.e., a first DCI format is the gNB's response to the beam failure recovery request sent by the UE), the UE can be requested to assume the designed "default beam" on PUCCH resources starting from the first symbol of a PUCCH transmission that carries the HARQ-ACK/NACK feedback for a PDSCH scheduled by DCI format detected from any configured search space, which is not earlier than a first DCI format, or the first symbol of a PUSCH transmission that is scheduled by DCI format 0_0 in any search space, which is not earlier than a first DCI format.

In one embodiment, the UE detects a first DCI format scrambled with C-RNTI or MCS-C-RNTI in the search space provided by recoverySearchSpaceId at slot $n_1$ (i.e., a first DCI format is the gNB's response to the beam failure recovery request sent by the UE) and the UE can be requested to assume the designed "default" beam on PUCCH resources starting from the first symbol of the first PUCCH transmission or the first PUSCH transmission scheduled by DCI format 0_0, which is triggered by one DCI that is detected no earlier than a first DCI format.

In one embodiment, after K symbols from a last symbol of a detected DCI format with CRC scrambled by C-RNTI or MCS-C-RNTI in a search space set provided by recoverySearchSpaceId and until the UE receives an activation or reconfiguration of PUCCH-Spatialrelationinfo for PUCCH resource(s), the UE transmits PUCCH using the same spatial filter as for the PRACH transmission, where the timing K symbols can be determined by one or more of the above schemes.

In one example, the K value can be the HARQ-ACK timing indicated by that detected DCI format if that DCI format schedules a PDSCH transmission and the K value can be the slot offset $K_2$, the start and length indicator SLIV, or directly the start symbol S that is indicated by the Time domain resource assignment field value m of the DCI if that DCI format is 0_0.

The above design can ensure the UE is able to switch to proper Tx beam for a PUCCH resource whose Tx beam is failed too when downlink beam failure is declared. But for the PUCCH resource whose Tx beam is not associated with any PDCC Tx beam, the failure of downlink PDCCH Tx beam does not imply the beam failure of that PUCCH. Therefore, the UE can continue use the Tx beam indicated/configured by the serving gNB.

When the downlink PDCCH beam fails, the uplink beam might fail too. Thus during the beam failure recovery, it may be asked that the UE to update the Tx beam for uplink PUSCH transmission to be a default beam which is known by both UE and the gNB so that proper uplink transmission can be achieved.

In one embodiment, after a UE sends beam failure recovery request PRACH transmission and the UE has received the gNB's response to the beam failure recovery request PRACH transmission successfully, the UE can begin to assume to use the same Tx beam for that PRACH transmission on the PUSCH transmission scheduled by DCI format 0_1 and also the SRS resources that are configured as the resources that correspond to the code point of SRI (SRS resource indicator) in DCI format 0_1. The UE can assume that until the spatial relation of those SRS resources are re-configured by the gNB.

An SRS resource can be configured parameter spatialRelationInfo or not. If a SRS resource is configured with spatialRelationInfo, the Tx beam for that SRS resource may be derived from the configured parameter spatialRelationInfo. If a SRS resource is not configured with spatialRelationInfo, the UE may derive Tx beam for that SRS resource from other schemes.

In one embodiment, after a UE receives the gNB's response to the beam failure recovery request PRACH transmission successfully, the UE can begin to assume to use the same Tx beam for the PRACH transmission on one or more of the following uplink transmission. In other words, the UE can begin to assume to transmit one or more of the following uplink transmission with the spatial domain transmission filter same to the one used for the PRACH transmission for which the UE has detected gNB' response correctly, i.e., the UE detects DCI format scrambled with C-RNTI or MCS-C-RNTI in the search space for beam failure recovery correctly.

The SRS resource that is configured with parameter spatialRelationInfo; The UE can assume that until that SRS resource is re-configured or re-activated.

The SRS resource that is configured in a SRS resource set with parameter usage set to "Codebook" or "nonCodebook" and this SRS resource is configured with parameter spatialRelationInfo. The UE can assume that until that SRS resource is re-configured or re-activated.

For codebook based transmission, A PUSCH transmission that is scheduled by a DCI format 0_1 and the codepoint of SRI field in a DCI format 0_1 points to a SRS resource that is configured with spatialRelationInfo. The UE can assume that until that SRS resource is configured or re-activated.

For non-codebook based transmission, a PUSCH transmission that is scheduled by a DCI format 0_1 and one or more of those SRS resource(s) that are indicated by the codepoint of SRI filed in that DCI format 0_1 is configured with parameter spatialRelationInfo. The UE may assume that until those SRS resource are re-configured or re-activated.

For non-codebook based transmission, a PUSCH transmission that is scheduled by a DCI format 0_1 and the SRS resource set with parameter usage set to "nonCodebook" is configured with associatedCSI-RS. The UE can assume that until the SRS resource in that SRS set is re-configured or re-activated.

A SRS resource can be used as the Tx beam indication source for other uplink transmission, for example PUCCH resource, other SRS resource and PUSCH transmission. A SRS resource can be configured with parameter spatialRelationInfo that provides the Tx beam information for that SRS resource. And the SRS resource might not be configured with the parameter spatialRelationInfo, in which case, the UE can determine the Tx beam for that SRS resource transmission by itself.

For a first PUCCH resource with configured PUCCHspatialRelationinfo parameter set to be a second SRS resource, the UE can be requested to transmit on the a first PUCCH resource with the spatial domain transmission filter same to the spatial domain transmission filter that is applied to the most recent transmission of a second SRS resource.

For a first SRS resource with configured spatialRelationInfo parameter set to be a second SRS resource, the UE can be requested to transmit that a first SRS resource with the spatial domain transmission filter same to the spatial domain transmission filter that is applied to the most recent transmission of a second SRS resource.

Figure 14:
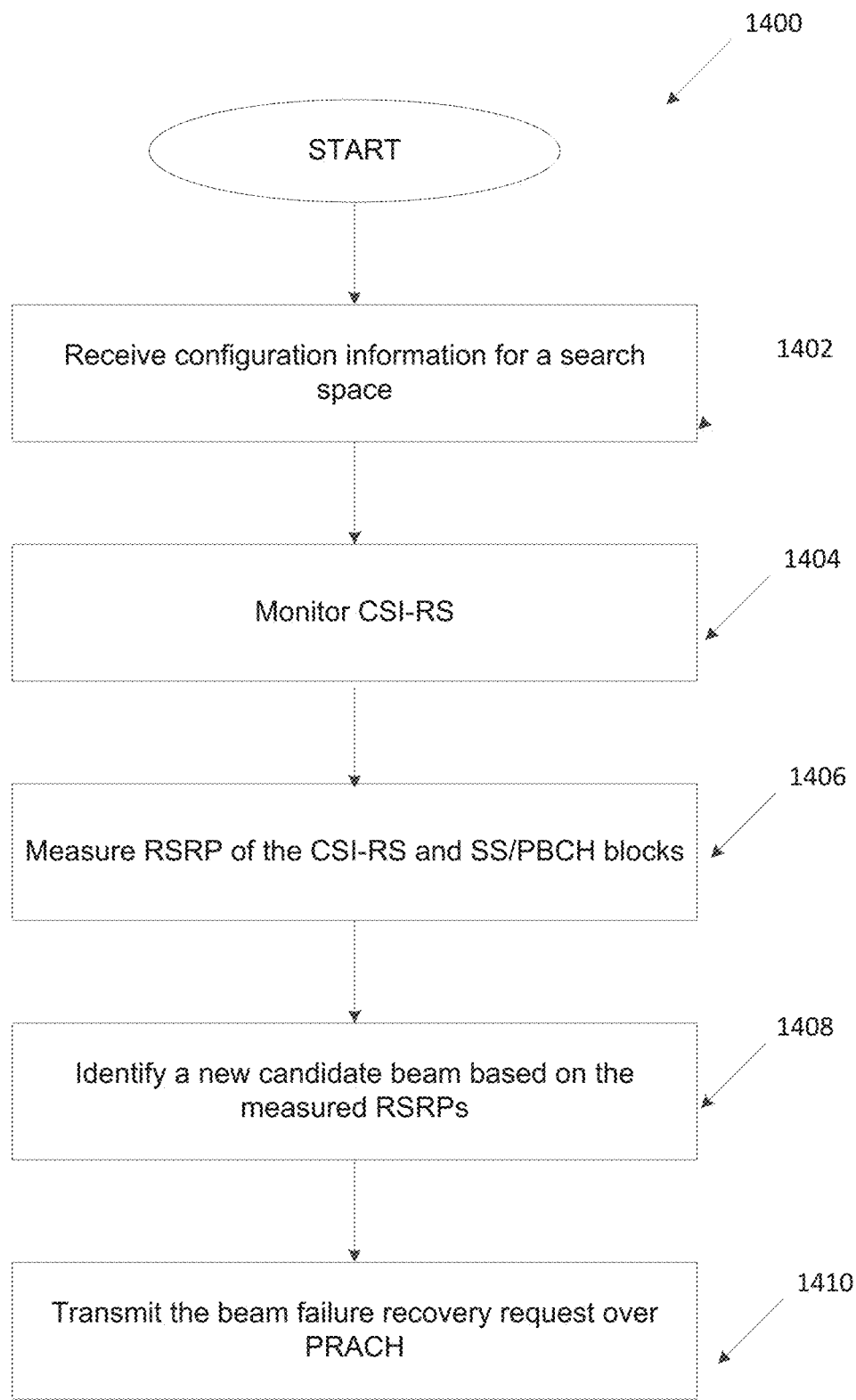
FIG. 14 illustrates a flowchart of a method for a user equipment (UE) according to embodiments of the present disclosure.

FIG. 14 illustrates a flow chart of a method 1400 for a user equipment (UE) according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 of the UE begins at step 1402. At step 1402, the UE receives, from a base station (BS), configuration information for a search space in which to receive a response to a beam failure recovery request. In one embodiment, the UE at step 1402 further receives, from the BS, the response over the search space that is dedicated for a beam failure recovery, and transmits, to the BS, a physical uplink control channel (PUCCH) with a default transmit (Tx) beam.

At step 1404, the UE monitors at least a channel state information reference signal (CSI-RS) included in a first set of reference signals to detect a beam failure event based on a threshold. In one embodiment, the UE at step 1404 determines the beam failure event when a number of consecutive beam failure instances is greater than or equal to the threshold. In such embodiment, the threshold is configured by a higher layer signaling, or pre-configured.

In another embodiment, the UE at step 1404 periodically generates the beam failure instances and count the number of consecutive beam failure instances based on monitoring the CSI-RS in the first set of reference signals. In such embodiment, a generation periodicity of beam failure instances is determined with a smallest periodicity among a set of periodicities of the CSI-RS included in the first set of reference signals.

In one embodiment, the UE at step 1404 compares the measured RSRP of the SS/PBCH block in the second set of reference signals with an RSRP threshold configured for a new beam identification.

In another embodiment, the UE at step 1404 scales the measured RSRP of each CSI-RS in the second set of reference signals based on a power offset configured for the CSI-RS with respect to the SS/PBCH block; and In yet another embodiment, the UE at step 1404 compares the scaled RSRP of each CSI-RS in the second set of reference signals with the RSRP threshold configured for the new beam identification.

In yet another embodiment, the UE at step 1404 applies, when transmitting over a PUCCH, a spatial domain transmission filter that corresponds to a filter applied to a PRACH transmission used for the beam failure recovery request, starting from K symbols after a last symbol of physical downlink control channel (PDCCH) in the search space.

In yet another embodiment, the UE at step 1404 detects a downlink channel information (DCI) format with a cyclic redundancy check (CRC) scrambled by at least one of a cell-radio network temporary identification (C-RNTI) or a modulation coding scheme-cell-RNTI (MCS-C-RNTI).

In yet another embodiment, the UE at step 1404 selects at least one of the CSI-RS or the SS/PBCH block from a set of candidate beam RS based on the measured RSRP.

The UE at step 1406 measures at least one of reference signal received power (RSRP) of the CSI-RS or an RSRP of synchronization signal/physical broadcasting channel (SS/PBCH) block in a second set of reference signals when the beam failure event is detected.

At step 1408, the UE identifies a new candidate beam based on the measured RSRPs. Finally, the UE at step 1410 transmits, to the BS, the beam failure recovery request over a physical random access channel (PRACH) based on detection of the beam failure event.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
    a transceiver configured to receive, from a base station (BS), configuration information for a search space in which to receive a response to a beam failure recovery request; and
    a processor operably connected to the transceiver, the processor configured to:
        monitor at least a channel state information reference signal (CSI-RS) included in a first set of reference signals to detect a beam failure event based on a threshold;
        measure at least one of a reference signal received power (RSRP) of a CSI-RS or an RSRP of a synchronization signal/physical broadcast channel (SS/PBCH) block in a second set of reference signals when the beam failure event is detected; and
        identify a new candidate beam based on the measured RSRP,
    wherein the transceiver is further configured to:
        transmit the beam failure recovery request over a physical random access channel (PRACH) based on detection of the beam failure event;
        receive a physical downlink control channel (PDCCH) in the search space, wherein the PDCCH provides a downlink channel information (DCI) format with a cyclic redundancy check (CRC) scrambled by at least one of a cell-radio network temporary identification (C-RNTI) or a modulation coding scheme-cell-RNTI (MCS-C-RNTI); and
        transmit a physical uplink control channel (PUCCH) using a same spatial domain filter as for the PRACH transmission, starting K symbols after a last symbol of the PDCCH reception.

2. The UE of claim 1, wherein the transceiver is further configured to:
receive the response over the search space that is dedicated for a beam failure recovery; and
transmit PUCCH with a default transmit (Tx) beam.

3. The UE of claim 1, wherein the processor is further configured to determine the beam failure event when a number of consecutive beam failure instances is greater than or equal to the threshold, and wherein the threshold is configured by a higher layer signaling, or pre-configured.

4. The UE of claim 3, wherein the processor is further configured to periodically generate beam failure instances and count the number of consecutive beam failure instances based on monitoring the CSI-RS in the first set of reference signals, and
wherein a generation periodicity of the beam failure instances is determined based on a smallest periodicity among a set of periodicities of the CSI-RS included in the first set of reference signals.

5. The UE of claim 1, wherein the processor is further configured to:
compare the measured RSRP of the SS/PBCH block in the second set of reference signals with an RSRP threshold configured for a new beam identification;
scale the measured RSRP of the CSI-RS in the second set of reference signals based on a power offset configured for the CSI-RS with respect to the SS/PBCH block; and
compare the scaled RSRP of the CSI-RS in the second set of reference signals with the RSRP threshold configured for the new beam identification.

6. The UE of claim 1, wherein the processor is further configured to select at least one of the CSI-RS or the SS/PBCH block from a set of candidate beam RS based on the measured RSRP.

7. A base station (BS) in a wireless communication system, the BS comprising:
a processor configured to determine at least a channel state information reference signal (CSI-RS) included in a first set of reference signals that is used for detecting a beam failure event, by a user equipment (UE), based on a threshold; and
a transceiver operably connected to the processor, the transceiver configured to:
transmit configuration information for a search space in which to transmit a response to a beam failure recovery request;
receive the beam failure recovery request over a physical random access channel (PRACH) based on detection of the beam failure event;
transmit a physical downlink control channel (PDCCH) in the search space, wherein the PDCCH provides a downlink channel information (DCI) format with a cyclic redundancy check (CRC) scrambled by at least one of a cell-radio network temporary identification (C-RNTI) or a modulation coding scheme-cell-RNTI (MCS-C-RNTI); and
receive a physical uplink control channel (PUCCH) using a same spatial domain filter as applied for the PRACH, starting K symbols after a last symbol of the PDCCH transmission;
wherein at least one of a reference signal received power (RSRP) of a CSI-RS or an RSRP of a synchronization signal/physical broadcast channel (SS/PBCH) block in a second set of reference signals is measured at the UE when a beam failure event is detected, and wherein a new candidate beam is identified, by the UE, based on the measured RSRP.

8. The BS of claim 7, wherein the transceiver is further configured to:
transmit, to the UE, the response over the search space that is dedicated for a beam failure recovery; and
receive, from the UE, a PUCCH with assuming that the UE is configured with a default transmit (Tx) beam.

9. The BS of claim 7, wherein:
the threshold is compared with a number of consecutive beam failure instances to detect the beam failure event; and
the threshold is configured by a higher layer signaling, or pre-configured.

10. The BS of claim 9, wherein:
beam failure instances are periodically generated by the UE based on monitoring the CSI-RS in the first set of reference signals and the number of consecutive beam failure instances is counted by the UE; and
a generation periodicity of the beam failure instances is determined based on a smallest periodicity among a set of periodicities of the CSI-RS included in the first set of reference signals.

11. The BS of claim 7, wherein:
the measured RSRP of the SS/PBCH block in the second set of reference signals is compared, by the UE, with an RSRP threshold configured for a new beam identification;
the measured RSRP of the CSI-RS in the second set of reference signals is scaled, by the UE, based on a power offset configured for the CSI-RS with respect to the SS/PBCH block; and
the scaled RSRP of the CSI-RS in the second set of reference signals is compared, by the UE, with the RSRP threshold configured for the new beam identification.

12. The BS of claim 7, wherein at least one of the CSI-RS or the SS/PBCH block is selected, by the UE, from the second set of reference signals based on the measured RSRP.

13. A method of a user equipment (UE) for beam reporting in a wireless communication system, the method comprising:
receiving configuration information for a search space in which to receive a response to a beam failure recovery request;
monitoring at least a channel state information reference signal (CSI-RS) included in a first set of reference signals to detect a beam failure event based on a threshold;
measuring at least one of a reference signal received power (RSRP) of a CSI-RS or an RSRP of a synchronization signal/physical broadcast channel (SS/PBCH) block in a second set of reference signals when the beam failure event is detected;
identifying a new candidate beam based on the measured RSRP;
transmitting the beam failure recovery request over a physical random access channel (PRACH) based on detection of the beam failure event;

receiving a physical downlink control channel (PDCCH) in the search space, wherein the PDCCH provides a downlink channel information (DCI) format with a cyclic redundancy check (CRC) scrambled by at least one of a cell-radio network temporary identification (C-RNTI) or a modulation coding scheme-cell-RNTI (MCS-C-RNTI); and transmit a physical uplink control channel (PUCCH) using a same spatial domain filter as for the PRACH transmission, starting K symbols after a last symbol of the PDCCH reception.

14. The method of claim 13, further comprising:
receiving the response over the search space that is dedicated for a beam failure recovery; and
transmitting a PUCCH with a default transmit (Tx) beam.

15. The method of claim 13, further comprising determining the beam failure event when a number of consecutive beam failure instances is greater than or equal to the threshold, wherein the threshold is configured by a higher layer signaling, or pre-configured.

16. The method of claim 15, wherein beam failure instances is periodically generated based on monitoring the CSI-RS in the first set of reference signals and the number of consecutive beam failure instances is counted, and
wherein a generation periodicity of beam failure instances is determined based on a smallest periodicity among a set of periodicities of the CSI-RS included in the first set of reference signals.

17. The method of claim 13, further comprising:
comparing the measured RSRP of the SS/PBCH block in the second set of reference signals with an RSRP threshold configured for a new beam identification;
scaling the measured RSRP of the CSI-RS in the second set of reference signals based on a power offset configured for the CSI-RS with respect to the SS/PBCH block; and
comparing the scaled RSRP of the CSI-RS in the second set of reference signals with the RSRP threshold configured for the new beam identification.

18. The method of claim 13, further comprising:
selecting at least one of the CSI-RS or the SS/PBCH block from a set of candidate beam RS based on the measured RSRP.

* * * * *